United States Patent
Sarpy, Sr. et al.

(10) Patent No.: US 12,033,231 B1
(45) Date of Patent: Jul. 9, 2024

(54) SYSTEM FOR FACILITATING THE EXECUTION OF LAW ENFORCEMENT DUTIES

(71) Applicant: Subject Packet Solutions, LLC, Columbus, OH (US)

(72) Inventors: Russel William Sarpy, Sr., Mansfield, LA (US); Robert Lee Fortune, Jr., Bossier City, LA (US)

(73) Assignee: Subject Packet Solutions, LLC, Columbus, OH (US)

( * ) Notice: Subject to any disclaimer, the term of this patent is extended or adjusted under 35 U.S.C. 154(b) by 129 days.

(21) Appl. No.: 17/892,426

(22) Filed: Aug. 22, 2022

Related U.S. Application Data

(63) Continuation-in-part of application No. 17/001,493, filed on Aug. 24, 2020, now Pat. No. 11,423,502.
(Continued)

(51) Int. Cl.
*G06Q 50/50* (2024.01)
*G06F 16/24* (2019.01)
(Continued)

(52) U.S. Cl.
CPC .......... *G06Q 50/265* (2013.01); *G06F 16/24* (2019.01); *G06Q 10/00* (2013.01); *G06Q 50/26* (2013.01);
(Continued)

(58) Field of Classification Search
None
See application file for complete search history.

(56) References Cited

U.S. PATENT DOCUMENTS 6,963,292 B1 * 11/2005 White .................. G08B 25/12
340/963
7,003,516 B2 * 2/2006 Dehlinger ............ G06F 40/216
707/999.005

(Continued)

OTHER PUBLICATIONS

Printout of webpage from www-03.ibm.com describing the features of the i2 COPLINK software produced by International Business Machines (IBM), dated Jun. 26, 2013 or before, relevant pages of the publication: 1-2.
(Continued)

*Primary Examiner* — Fekadeselassie Girma
(74) *Attorney, Agent, or Firm* — The Law Office of Patrick F. O'Reilly III, LLC

(57) ABSTRACT

A system for facilitating the execution of law enforcement duties is disclosed. More particularly, according to one aspect of the invention, an electronic system is configured to facilitate the performance of law enforcement duties by quasi-instantaneously providing actionable intelligence to its users, such as front-line law enforcement officers, in response to a real-time query (e.g., accessing witness, medical, military personnel, law enforcement personnel, and government personnel information). According to another aspect of the invention, a system implements a set of automated status classifications for subjects with suspected or confirmed involvement in criminal and/or terrorist activities. The status classifications specifically and concisely establish the subject's involvement in criminal and/or terrorist activities.

14 Claims, 36 Drawing Sheets

Related U.S. Application Data which is a continuation-in-part of application No. 16/430,233, filed on Jun. 3, 2019, now Pat. No. 10,755,371, which is a continuation-in-part of application No. 15/670,313, filed on Aug. 7, 2017, now Pat. No. 10,311,537, which is a continuation of application No. 14/977,075, filed on Dec. 21, 2015, now Pat. No. 9,727,939, which is a continuation of application No. 14/252,734, filed on Apr. 14, 2014, now Pat. No. 9,218,634, which is a continuation-in-part of application No. 13/872,150, filed on Apr. 28, 2013, now Pat. No. 8,742,934.

(60) Provisional application No. 61/639,938, filed on Apr. 29, 2012.

(51) Int. Cl.

| | | |
|---|---|---|
| *G06F 16/28* | (2019.01) | |
| *G06F 16/93* | (2019.01) | |
| *G06Q 10/00* | (2023.01) | |
| *G06Q 50/18* | (2012.01) | |
| *G06Q 50/26* | (2024.01) | |
| *H04W 4/90* | (2018.01) | |

(52) U.S. Cl.
CPC ............ *H04W 4/90* (2018.02); *G06F 16/284* (2019.01); *G06F 16/93* (2019.01); *G06Q 50/18* (2013.01)

(56) References Cited

U.S. PATENT DOCUMENTS

| | | | |
|---|---|---|---|
| 7,475,807 B2* | 1/2009 | Halpin | G07F 19/202 235/383 |
| 8,742,934 B1 | 6/2014 | Sarpy, Sr. et al. | |
| 8,924,872 B1 | 12/2014 | Bogomolov | |
| 9,218,634 B1 | 12/2015 | Sarpy, Sr. et al. | |
| 9,412,100 B1* | 8/2016 | Shearer | G06Q 20/108 |
| 9,619,851 B1 | 4/2017 | McIntyre | |
| 9,727,939 B1 | 8/2017 | Sarpy, Sr. et al. | |
| 10,311,537 B1* | 6/2019 | Sarpy, Sr. | G06Q 50/265 |
| 10,474,678 B1* | 11/2019 | Sarpy, Sr. | G06Q 50/26 |
| 10,755,371 B1 | 8/2020 | Sarpy, Sr. et al. | |
| 11,423,502 B1 | 8/2022 | Sarpy, Sr. et al. | |
| 11,636,158 B1 | 4/2023 | Sarpy, Sr. et al. | |
| 11,676,235 B1 | 6/2023 | Sarpy, Sr. et al. | |
| 2001/0044795 A1 | 11/2001 | Cohen et al. | |
| 2003/0037034 A1 | 2/2003 | Daniels et al. | |
| 2004/0222283 A1* | 11/2004 | Mastie | G06Q 20/1085 235/379 |
| 2004/0225681 A1 | 11/2004 | Chaney et al. | |
| 2005/0055357 A1 | 3/2005 | Campbell | |
| 2005/0216555 A1* | 9/2005 | English | G06Q 50/18 709/204 |
| 2006/0184575 A1 | 8/2006 | Singleton | |
| 2006/0206942 A1 | 9/2006 | Sweet | |
| 2007/0038497 A1 | 2/2007 | Britti et al. | |
| 2007/0174397 A1 | 7/2007 | David | |
| 2008/0130957 A1 | 6/2008 | Small | |
| 2008/0173832 A1* | 7/2008 | Chien | G07D 7/121 250/556 |
| 2009/0089361 A1 | 4/2009 | Womack et al. | |
| 2009/0094081 A1* | 4/2009 | Wittern, III | G07F 9/08 705/65 |
| 2009/0150300 A1* | 6/2009 | Cherry, Jr. | G06Q 40/02 705/80 |
| 2009/0150804 A1 | 6/2009 | Bokor et al. | |
| 2009/0164798 A1* | 6/2009 | Gupta | G07C 9/38 713/186 |
| 2010/0030587 A1 | 2/2010 | Holland | |
| 2010/0078475 A1 | 4/2010 | Lin | |
| 2010/0289627 A1* | 11/2010 | McAllister | H04L 9/3226 340/10.42 |
| 2010/0305992 A1* | 12/2010 | Michalzuk | G06Q 10/087 705/28 |
| 2011/0082731 A1* | 4/2011 | Kepecs | G06Q 30/02 235/487 |
| 2012/0130937 A1* | 5/2012 | Leon, Jr. | G06Q 10/0635 707/769 |
| 2012/0173570 A1 | 7/2012 | Golden | |
| 2012/0209780 A1 | 8/2012 | Hancock | |
| 2014/0247933 A1 | 9/2014 | Soundar | |
| 2015/0039483 A1 | 2/2015 | Santarlas | |
| 2015/0215790 A1 | 7/2015 | Davari et al. | |
| 2016/0012445 A1* | 1/2016 | Villa-Real | G06Q 20/4016 705/44 |
| 2016/0307284 A1 | 10/2016 | Parsons | |

OTHER PUBLICATIONS

Printout of webpage from www-03.ibm.com describing the optional capabilities of the i2 COPLINK software produced by International Business Machines (IBM), dated Jun. 26, 2013 or before, relevant pages of the publication: 1-5.

Printout of webpage from www.i2group.com describing the i2 COPLINK software produced by International Business Machines (IBM), dated Apr. 10, 2012, relevant page(s) of the publication: 1.

Brochure describing the i2 COPLINK software produced by International Business Machines (IBM), dated Nov. 2012, relevant pages of the publication: 2-7.

Printout of webpage from www.ejusticesolutions.com describing the EJustice Online RMS: Law Enforcement Record Management Systems, dated Jan. 3, 2012, relevant pages of the publication: 1-2.

Printout of webpage from www.interact911.com describing the InterAct Public Safety Records Management System, dated Apr. 18, 2011, relevant pages of the publication: 1-3.

Brochure describing InterAct Public Safety Records Management System (Law Enforcement Data Sharing), dated Jun. 26, 2013 or before, relevant pages of the publication: 1-2.

Brochure describing InterAct Public Safety Records Management System (Overview of System), dated Jun. 26, 2013 or before, relevant pages of the publication: 1-2.

Printout of webpage from www.fbi.gov describing the N-DEx: Law Enforcement National Data Exchange (Brochure), dated Feb. 11, 2012, relevant pages of the publication: 1-3.

Printout of webpage from www.fbi.gov describing the N-DEx: Law Enforcement National Data Exchange (Overview of System), dated Feb. 11, 2012, relevant pages of the publication: 1-2.

Printout of webpage from www.fbi.gov describing the N-DEx: Law Enforcement National Data Exchange (Questions and Answers), dated Feb. 11, 2012, relevant pages of the publication: 1-12.

Brochure describing the N-DEx: Law Enforcement National Data Exchange, dated Jun. 26, 2013 or before, relevant pages of the publication: 1-2.

First office action on the merits (Non-Final Rejection) in U.S. Appl. No. 13/872,150, dated Aug. 12, 2013.

Notice of Allowance in U.S. Appl. No. 13/872,150, dated Jan. 14, 2014.

Notice of Allowance in U.S. Appl. No. 14/252,734, dated Aug. 7, 2015.

First office action on the merits (Non-Final Rejection) in U.S. Appl. No. 14/977,075, dated Nov. 30, 2016.

Notice of Allowance in U.S. Appl. No. 14/977,075, dated Apr. 7, 2017.

First office action on the merits (Non-Final Rejection) in U.S. Appl. No. 15/670,313, dated Apr. 26, 2018.

Second office action on the merits (Final Rejection) in U.S. Appl. No. 15/670,313, dated Nov. 28, 2018.

First office action on the merits (Non-Final Rejection) in U.S. Appl. No. 15/172,050, dated Jun. 8, 2018.

Second office action on the merits (Final Rejection) in U.S. Appl. No. 15/172,050, dated Jan. 15, 2019.

Notice of Allowance in U.S. Appl. No. 15/172,050, dated Aug. 29, 2019.

Notice of Allowance in U.S. Appl. No. 15/670,313, dated Mar. 18, 2019.

(56) References Cited

OTHER PUBLICATIONS

First office action on the merits (Non-Final Rejection) in U.S. Appl. No. 15/894,808, dated Oct. 17, 2019.
Second office action on the merits (Final Rejection) in U.S. Appl. No. 15/894,808, dated Oct. 14, 2020.
Third office action on the merits (Non-Final Rejection) in U.S. Appl. No. 15/894,808, dated Aug. 26, 2021.
Fourth office action on the merits (Final Rejection) in U.S. Appl. No. 15/894,808, dated May 6, 2022.
Chen et al., Coplink Managing Law Enforcement Data and Knowledge, Jan. 2003/vol. 46, No. 1, Communications of the ACM, pp. 1-7, (Year: 2003).
Katz et al., Needs Assessment on Information Sharing Among West Valley Police Agencies, Center for Violence Prevention and Community Safety, Arizona State University, pp. 1-84, (Year: 2006).
Atabakhsh, H. & Zeng, Daniel Dajun & Schroeder, J. & Petersen, T. & Casey, D. & Chen, M. & Xiang, Y. & Daspit, D. & Nandiraju, S. & Fu, S., (2002), COPLINK: visualization and collaboration for law enforcement, pp. 1-7, (Year: 2002).
Notice of Allowance in U.S. Appl. No. 17/001,493, dated Oct. 25, 2021.
Notice of Allowance in U.S. Appl. No. 17/001,493, dated Apr. 18, 2022.
COPLINK Accelerating Law Enforcement, Detect User Guide, COPLINK® All rights reserved. Knowledge Computing Corporation © 2000-2010, pp. 1-125, (Year: 2010).
First office action on the merits (Non-Final Rejection) in U.S. Appl. No. 17/016,598, dated May 10, 2022.
Notice of Allowance in U.S. Appl. No. 17/016,598, dated Jan. 10, 2023.
Notice of Allowance in U.S. Appl. No. 18/208,296, dated Jan. 5, 2024.

* cited by examiner

SYSTEM FOR FACILITATING THE EXECUTION OF LAW ENFORCEMENT DUTIES

CROSS-REFERENCE TO RELATED APPLICATIONS

The present application is a continuation-in-part of U.S. application Ser. No. 17/001,493, entitled "System for Facilitating the Execution of Law Enforcement Duties", filed on Aug. 24, 2020; which is a continuation-in-part of U.S. application Ser. No. 16/430,233, entitled "System for Facilitating the Execution of Law Enforcement Duties", filed on Jun. 3, 2019, U.S. Pat. No. 10,755,371; which is a continuation-in-part of U.S. application Ser. No. 15/670,313, entitled "System for Facilitating the Execution of Law Enforcement Duties", filed on Aug. 7, 2017, U.S. Pat. No. 10,311,537; which is a continuation of U.S. application Ser. No. 14/977,075, entitled "System for Facilitating the Execution of Law Enforcement Duties", filed on Dec. 21, 2015, now U.S. Pat. No. 9,727,939; which is a continuation of U.S. application Ser. No. 14/252,734, entitled "A System and Method for Facilitating the Execution of Law Enforcement Duties", filed on Apr. 14, 2014, now U.S. Pat. No. 9,218,634; which is a continuation-in-part of U.S. Nonprovisional patent application Ser. No. 13/872,150, entitled "A System and Method for Facilitating the Execution of Law Enforcement Duties and Enhancing Anti-Terrorism and Counter-Terrorism Capabilities", filed Apr. 28, 2013, now U.S. Pat. No. 8,742,934; which claims the benefit of U.S. Provisional Patent Application No. 61/639,938, entitled "A System and Method for Facilitating the Execution of Law Enforcement Duties and Enhancing Anti-Terrorism and Counter-Terrorism Capabilities", filed on Apr. 29, 2012, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a system and method for facilitating the execution of law enforcement duties and enhancing anti-terrorism and counter-terrorism capabilities. More particularly, the invention relates to an electronic system and associated method that is adapted to facilitate the performance of law enforcement duties by quasi-instantaneously providing actionable intelligence to front-line law enforcement officers in response to a real-time query.

2. Background Description

The successful enforcement of local, state, and federal criminal statutes greatly rely upon the effectiveness with which law enforcement agencies carry out their mission to protect the public by preventing, investigating, and solving crimes and preventing terrorists attacks. The degree of effectiveness achieved by law enforcement in this endeavor is dependent upon numerous critical factors, one of the most critical being its ability to collect, document, analyze, disseminate, and utilize the massive amounts of criminal intelligence information developed by law enforcement daily. The events of Sep. 11, 2001, hastened the development of numerous data management systems and processes that succeeded in improving the quality and availability of criminal intelligence information; however, these systems have been typically designed to distribute information to selected groups of system users within a local or regional footprint. Of particular significance is the fact that these new and disparate systems failed to create a national data management system which quasi-instantaneously and in real-time provides (1) criminal intelligence information in an actionable form, (2) on a national scale, (3) to all law enforcement agencies, to include local, state, tribal, and federal; most notably the front-line officer. Consistent success in the modern criminal environment dominated by constantly changing and improving technology requires that law enforcement make more effective and efficient use of its criminal intelligence information; information that must not only be accurate, reliable, and accessible, but also be available in an actionable form to all law enforcement officers both quasi-instantaneously and directly.

Considering the complex and often unpredictable nature of crime, the execution of law enforcement duties is a difficult and dangerous task. Routinely during the course of their daily mission to fight crime, law enforcement officers must make expeditious decisions not only to ensure the safety of the public and the officers themselves, but also to ensure the preservation of evidence; decisions which necessarily must also strictly adhere to the rules of criminal procedure. One tool that would immediately and dramatically improve a law enforcement officer's ability to perform these duties more effectively and efficiently—all while increasing officer safety—would be direct, quasi-instantaneous access to a national criminal intelligence database (a.k.a. an information sharing system) containing reliable, concise, actionable intelligence about a particular subject, or suspected criminal property. In jurisdictions throughout the United States, valuable criminal intelligence information exists and, in many cases, is being maintained in some form of data or records management system; criminal intelligence information that in many circumstances would, if provided to front-line officers directly, quasi-instantaneously, and in an actionable form, provide them with sufficient information to satisfy the requisite legal standards to support a desired enforcement action. Unfortunately, as discussed above, the current data and records management systems and processes for collecting, storing, accessing, and distributing the aforementioned criminal intelligence information are not designed to provide this information in an actionable form to an officer in the field quasi-instantaneously, in real-time, on a national scale. Resultantly, these systems not only fail to make efficient use of the criminal intelligence information already developed and maintained by law enforcement, they also fail to effectively facilitate critically important law enforcement procedures commonly utilized by front-line officers such as investigative detentions, interviews, searches, and seizures.

Yet another deficiency of the current data and records management systems available to law enforcement are the limitations and inherent weaknesses of reports-based systems. The current systems create large, scalable databases comprised of law enforcement reports which are stored within these databases and can thereafter be searched in response to a law enforcement query. When matches are identified in a reports-based database, the querying user is presented with the opportunity to review the contents of any reports determined by the system to match the search criteria. A reports-based database system creates two significant problems when employed in the law enforcement environment which limit the capabilities and effectiveness of such systems, namely (1) the need for participating agencies to submit copies of their reports to these systems for viewing and potential use by other system participants and (2) the formation of a database containing too much information for the front-line officer to effectively analyze and use on-scene.

Concerning the first problem identified above, one of the primary concerns of a law enforcement agency considering whether to participate in a multi-agency reports-based database is its capability to maintain control of the use and dissemination of its agency reports and the information they contain. Such reports-based databases create serious information control and security issues for many agencies and therefore inspire a reluctance to contribute information to such systems. Security controls and protocols for reports-based systems can be designed to address this problem, but necessarily result in limiting access to the information and thereby diminishing the system's effectiveness. In some cases, agency policy or statutes governing the sharing of information with outside agencies may even prevent participation in such a system.

Concerning the second problem identified above, the use of a reports-based database by front-line officers necessitate an on-scene review of the reports contained in that database and a concurrent subjective analysis of that information. This review and analysis must be accomplished by those officers before the information the report(s) contains can be utilized. Because reports-based database systems contain all information detailed in the reports comprising such a database, they consequently contain too much information. Instead, what is needed is system and method designed to accomplish the sharing of only actionable criminal intelligence information, providing front-line officers with exactly the information they need to know about a given subject; information classified in such way that it doesn't require an officer to review one or more reports and draw a subjective conclusion about that subject, based on the information contained in the report(s), before proceeding with an investigation.

Current database and records management systems claim to provide actionable intelligence, but actually fall well short of that claim—providing a database full of reports is not the same as providing actionable intelligence. It is also important to note that actionable intelligence alone doesn't give an officer probable cause or reasonable suspicion, but it does serve to clarify and improve their perception of the subject, based on known and documented information, with whom or which they are dealing. Truly actionable intelligence enables officers to better articulate and support their analysis, decisions, actions and ultimately result in law enforcement conducting safer, better informed, better supported, and consequently, more effective investigations.

One of the most important law enforcement procedures available in the fight against crime is the seizure of criminal assets, also known as asset forfeiture. Asset forfeiture is the confiscation of assets, by local, state, and federal agencies which are either (1) the alleged proceeds of crime or (2) the alleged instrumentalities of crime. Criminal proceeds or profits refer to the money and/or property generated from criminal activity, whereas instrumentalities of crime refer to property that is used to facilitate the commission of a crime. Criminal proceeds and instrumentalities can be associated with a plethora of different crimes such as, but not limited to drug trafficking and terrorist activities.

There are two main types of forfeiture actions, namely criminal forfeiture actions and civil forfeiture actions. A criminal forfeiture action is an in personam action that is carried out in conjunction with the criminal prosecution of a defendant. In a criminal forfeiture action, the government is required to indict the property used or derived from the crime along with the defendant and is generally subject to the same "beyond a reasonable doubt" legal standard of proof that is required in criminal cases. In contrast, a civil forfeiture action is an in rem action that is carried out against the property being seized and the possessor of the property at the time of seizure—effectively a third party claimant. Initially, the government must have probable cause to seize the property and, thereafter, the possessor at the time of seizure, or the property's owner, may challenge the government's seizure. If the government demonstrates that the property is subject to forfeiture by a preponderance of the evidence in a subsequent judicial proceeding, the property can be forfeited. Because the burden of proof is substantially less in a civil forfeiture action, it is the type of forfeiture action that is most commonly favored by the government. Less than eighty percent (80%) of civil seizures are ever challenged in a legal proceeding.

In general, civil forfeiture can occur by means of one of the following three procedures: (1) summary forfeiture, (2) administrative forfeiture, or (3) judicial forfeiture. The property subject to a summary forfeiture proceeding is very limited in nature and normally involves a limited category of property specified under the Controlled Substances Act ("CSA"). In contrast, an administrative forfeiture proceeding can be commenced by a seizing agency against most property valued at $500,000 or less, as well as any amount of cash. The administrative action must be contested by the original owner in a timely manner or the original owner loses any legal claim to the property and the government acquires ownership thereof. A judicial forfeiture procedure occurs before a judge and is carried out in a manner analogous to that of a trial. If the value of the property exceeds $500,000, a claim of ownership is filed during an administrative procedure; if however, real property is involved, then a judicial forfeiture procedure is required.

All forms of asset forfeiture are very important mechanisms for combating crime in our society. The effective enforcement of asset forfeiture enactments directly attacks the economic basis of criminal enterprises, significantly diminishing their ability to profit from criminality and depleting the funds from their operations. Additionally, law enforcement agencies, many of which are desperately in need of economic resources, utilize the proceeds of asset forfeitures to hire additional police officers, fund overtime expenses, and to purchase vital equipment necessary to support their mission to prevent, investigate, solve and prosecute crime.

In order for asset forfeiture laws to be effectively utilized by today's law enforcement agencies, its front-line officers must have actionable intelligence, available to them quasi-instantaneously, so it can be utilized to produce or aid in the development of the probable cause required to seize criminal assets. As previously discussed, the systems currently in use by law enforcement are not capable of providing the criminal intelligence information they contain in an expeditious manner such that it can be consistently employed by front-line officers in the performance of their duties. Moreover, the current format of this criminal intelligence information is not actionable, further contributing to the dilution of its usefulness. Because the information contained in these systems is typically maintained in a format that is either of inadequate detail or too voluminous, a time consuming, subjective analysis of the information is often required before it can be considered actionable intelligence. As a consequence, valuable criminal intelligence information already collected, documented, and maintained by law enforcement is effectively unusable by the front-line officer for investigations conducted in the field; this consequence is particularly applicable to asset forfeiture-related investigations. This failure by law enforcement to maximize the use of available criminal intelligence information in support of its enforcement of existing asset forfeiture laws greatly diminishes the ability of the government to utilize these laws for their designed purpose—that being to facilitate the dismantling of criminal enterprises through the confiscation of criminal assets.

In recent years, asset forfeiture proceedings have become a very important countermeasure against terrorist activities. Terrorist organizations, like other criminal enterprises, require substantial economic resources to carry out their heinous acts of destruction. Successful asset forfeiture proceedings possess the ability to strip terrorist organizations of the economic resources they need to exist. In fact, the federal civil forfeiture statute (18 U.S.C. § 981) specifically authorizes the forfeiture of terrorist assets. In particular, section 981(a)(1)(G) authorizes the forfeiture of all assets, whether foreign or domestic, (i) "of any individual, entity, or organization engaged in planning or perpetrating any act of domestic or international terrorism against the United States, citizens or residents of the United States, or their property, and all assets, foreign or domestic, affording any person a source of influence over any such entity or organization; (ii) acquired or maintained by any person with the intent and for the purpose of supporting, planning, conducting, or concealing an act of domestic or international terrorism against the United States, citizens or residents of the United States, or their property; or (iii) derived from, involved in, or used or intended to be used to commit any act of domestic or international terrorism against the United States, citizens or residents of the United States, or their property" (emphasis added).

In order for the above cited provisions of the federal civil forfeiture statute to be used effectively in counter-terrorism investigations, and in particular, the time-sensitive environment of law enforcement interdiction actions, front-line officers must be capable of accurately and expeditiously identifying suspected or confirmed terrorists or their aiders and abettors and promptly establishing the requisite probable cause to seize their assets and/or instrumentalities. To do this, the criminal intelligence information needed in support of these investigations must necessarily be nationally available and accessible in real-time, quasi-instantaneously, in an actionable format. Furthermore, this information must be provided preferably before, if not concurrently with the front-line officer engaging a subject or prior to that officer disengaging from the subject. Therefore, any criminal intelligence information intended to be used in support of such investigations must be concise, providing only the most critical details in an actionable format, directly and quasi-instantaneously to the front-line officer. As with other criminal investigations, the limitations of the current data and records management systems and processes make it difficult for the front-line law enforcement officer to acquire the actionable intelligence needed for seizing the assets and instrumentalities of a terrorist. Consequently, existing systems result in a less effective use of asset forfeiture laws against terrorist organizations and fail to strip them of the economic resources they use to fund their heinous acts.

Finally, to effectively combat the threat posed to the public by criminal activity, and more importantly, the danger posed to the United States and its citizens by terrorist organizations, today's law enforcement agencies need a national data and records management system capable of providing front-line law enforcement officers with mobile, direct, real-time, quasi-instantaneous access to, and delivery of, actionable intelligence in support of their investigative, asset forfeiture, officer safety, and public safety responsibilities. In addition, what is needed is one or more methods, carried out by such a system, which employ a set of classification criteria for subjects that specifically and concisely characterizes a subject's involvement in an unlawful activity. Such a system, and methods carried out thereby, would greatly facilitate the execution of law enforcement duties, particularly those of the front-line officers who are attempting to identify and seize the assets of criminals and terrorists.

SUMMARY OF EMBODIMENTS OF THE INVENTION

Accordingly, the present invention is directed to a system and method for facilitating the execution of law enforcement duties and enhancing counter-terrorism defenses that substantially obviate one or more problems resulting from the limitations and deficiencies of the related art.

In the system and method hereinafter described, limited information contained in an agency's report is used to identify a subject (e.g. a person, vehicle, address, location, phone number, property, and currency) and to classify that subject's nature, be it criminal or non-criminal, prior to that information being entered into the database. Although the identification and classification of a subject can be supported by criminal intelligence, investigative information, and observation contained in that agency report, the report itself is not needed to populate the database. Instead, only the limited information about a subject, the nature of a subject's activity, the agency's report number, and the agency's contact information are needed to make that information effectively shareable. Such a succinct presentation of only the most pertinent information concerning a subject is what a front-line officer needs in the time constrained environment of law enforcement operations. For example, a front-line officer conducting a traffic stop has neither the time or the opportunity to read through a report(s) in a database and to develop subjective conclusions, based on the information the report(s) contains, concerning the subjects being encountered (e.g. the driver, any passengers, the vehicle, items property or currency located within the vehicle, etc.), either prior to or during the engagement with them. Rather, that officer only needs the identity of each subject and the nature of each subject's activity. Once a front-line officer has this basic, yet sharply focused, information, he can expeditiously continue his investigation armed with what can be truly characterized as "actionable intelligence."

In accordance with one embodiment of the present invention, there is provided a system for facilitating the execution of law enforcement duties, which includes a data processing and records management system ("CDMS") including one or more processors and data storage means operatively coupled by Ethernet or a cellular internet network, radio, short-range wireless, or satellite connection, hereafter available connectivity to at least one digital computer or mobile digital device, or to a network of digital computers and mobile digital devices (collectively referred to as the network of digital devices—"NDD"), with the CDMS and NDD being configured and arranged to: submit a subject query to the CDMS via the NDD from a first system user; receive, by the CDMS via the NDD, a subject query from a first system user that contains information identifying a subject; CDMS assigns a unique transaction number to the transaction; conduct a search by the CDMS for any subject packet(s) containing information that matches the information identifying the subject of the query by accessing a data records management system ("DRMS") of subject packets stored on the DRMS; determine whether a match exists between the subject queried and any one of the subject packets in the DRMS; when a match is found not to exist between the subject queried and any of the subject packets in the DRMS, generate and send a negative response from the CDMS via the NDD to the first system user; when a match is found to exist between the subject queried and at least one of the subject packets, further determine the status classification of the subject queried and generate and send a response from the CDMS via the NDD to the first system user—the content of the response being based upon the status classification of the matched subject packet(s) and its respective unique transaction number(s); generate and send a subject queried notification from the CDMS via the NDD to the second system user(s); receive, by the CDMS via the NDD, a subject queried response packet from the second system user; and generate and send that subject queried response packet from the CDMS via the NDD to the first system user.

In a further embodiment of this aspect of the present invention, the status classification comprises one of a suspected or confirmed status and the CDMS and NDD are further configured and arranged to: when the status classification is a suspected status, send from the CDMS via the NDD a suspected confirmation response to the first system user referencing the unique transaction number; when the status classification is a confirmed status, generate and send from the CDMS via the NDD a confirmed confirmation response to the first system user referencing the unique transaction number; when the status classification is a suspected status, generate and send from the CDMS via the NDD a suspected subject queried notification to the second system user(s) referencing the unique transaction number(s) for the matched subject packet(s)—the second system user(s) being the user(s) that originally submitted the matched subject packet(s) into the DRMS; when the status classification is a confirmed status, generate and send from the CDMS via the NDD a confirmed subject queried notification to the second system user(s) referencing the unique transactions number(s) for the matched subject packet(s); for either a suspected subject queried notification or a confirmed subject queried notification, receive, by the CDMS via the NDD, a completed subject queried response packet from the second system user; and generate and send that completed subject queried response packet from the CDMS via the NDD to the first system user.

In yet a further embodiment, when the first system user does not make a seizure of the subject's assets, the CDMS and NDD are further configured and arranged to: receive, by the CDMS via the NDD, an acknowledgement from the first system user confirming that the first system user received the confirmation response from the CDMS and a non-seizure notice confirming with CDMS that a seizure was not made; and generate and send from the CDMS via the NDD a non-seizure notice to the second system user(s).

In still a further embodiment, when the first system user makes a seizure of the subject's assets, the CDMS and NDD are further configured and arranged to: receive, by the CDMS via the NDD, an acknowledgement from the first system user confirming that the first system user received the confirmation response from the CDMS and a seizure notice confirming with CDMS that a seizure was made; generate and send from the CDMS via the NDD a seizure notice to the second system user(s) and to a third system user, so that the third system user can initiate an asset forfeiture proceeding; receive a status of asset forfeiture notification from the third system user; determine, by the CDMS, if the third system user is an automated participant or manual participant in the asset forfeiture proceeds disbursement process; generate and send from the CDMS via the NDD final asset forfeiture notification and disbursement notices to the first, second, and third system users; and receive by the CDMS via the NDD acknowledgement of disbursement completed notifications from the first, second, and third system users; if the third system user is an automated participant in the asset forfeiture proceeds distribution process, the CDMS schedules and facilitates the disbursement of the asset forfeiture proceeds to the first, second, and third system users via electronic funds transfer ("EFT") from the third system users' asset forfeiture fund ("AFF") account; generate and send from the CDMS via the NDD disbursement completed notifications to the first, second, and third system users; and receive by the CDMS via the NDD acknowledgement notifications from the first, second, and third system users.

In yet a further embodiment, the first system user is a querying law enforcement agency, the second system user is a source law enforcement agency, and the third system user is a prosecutor's office.

In still a further embodiment, the subject is one of: (i) a confirmed narcotics dealer, (ii) a confirmed terrorist, and (iii) a confirmed criminal subject of some type.

In accordance with another embodiment of the present invention, there is provided a method for facilitating the execution of law enforcement duties, which comprises the steps of: receiving, by the CDMS via the NDD, a subject query from a first system user that contains information identifying a subject; assigning by the CDMS, a unique transaction number to the subject query; conducting a search by the CDMS of the DRMS for subject packet(s) containing information that matches the information identifying the subject of the query by accessing the DRMS of subject packets stored on a data storage means; determining, by the CDMS, whether a match exists between the subject queried and any one of the subject packets in the DRMS; when a match is found not to exist between the subject and any of the subject packets in the DRMS, generating and sending from the CDMS via the NDD a negative response to the first system user; and when a match is found to exist between the subject queried and at least one of the subject packets in the DRMS, further determining the status classification of the subject packet(s) and generating and sending by the CDMS via the NDD a confirmation response to the first system user—the content of the confirmation response being based upon the status classification of the matched subject packet(s) and its unique transaction number(s); generating and sending a subject queried notification from the CDMS via the NDD to the second system user(s); receiving, by the CDMS via the NDD, a completed subject queried response packet from the second system user; and generating and sending that completed subject queried response packet from the CDMS via the NDD to the first system user.

In yet a further embodiment of this aspect of the present invention, the status classification comprises one of either suspected or confirmed, and the method further comprises the steps of: when the status classification is suspected, generating and sending a suspected confirmation response from the CDMS via the NDD to the first system user referencing the unique transaction number; when the status classification is confirmed generating and sending a confirmed confirmation response from the CDMS via the NDD to the first system user referencing the unique transaction number; when the status classification is suspected, generating and sending a suspected subject queried notification from the CDMS via the NDD to the second system user(s)—the second system user(s) being the user that originally submitted the matched subject packet(s) into the DRMS of the CDMS; when the status classification is confirmed, generating and sending a confirmed subject queried notification from the CDMS via the NDD to the second system user(s) referencing the unique transaction number(s) for the matched subject packet(s); for either a suspected subject queried notification or a confirmed subject queried notification, receiving, by the CDMS via the NDD, a completed subject queried response packet from the second system user; and generating and sending that completed subject queried response packet from the CDMS via the NDD to the first system user.

In still a further embodiment, when first system user does not make a seizure of the subject's assets, the method further comprises the steps of: receiving, by the CDMS via the NDD, an acknowledgement from the first system user confirming the first system user received the confirmation response from the CDMS and a non-seizure notice confirming with CDMS that a seizure was not made; and generating and sending from the CDMS via the NDD a non-seizure notice to the second system user(s).

In yet a further embodiment, when first system user makes a seizure of the subject's assets, the method further comprises the steps of: receiving, by the CDMS via the NDD, an acknowledgement from the first system user confirming that the first system user received the confirmation response from the CDMS and a seizure notice confirming with CDMS that a seizure was made; generating and sending from the CDMS via the NDD a seizure notice to the second system user(s) and to a third system user, so that the third system user can initiate an asset forfeiture proceeding; receiving, by the CDMS via the NDD, a status of asset forfeiture notification from the third system user; determining, by the CDMS, if the third system user is an automated participant or manual participant in the asset forfeiture proceeds disbursement process; generating and sending, from the CDMS via the NDD, final asset forfeiture notification and disbursement notices to the first, second, and third system users; and receiving, by the CDMS via the NDD acknowledgement of disbursement completed notifications from the first, second, and third system users; if, the third system user is an automated participant, the CDMS schedules and facilitates the disbursement of the asset forfeiture proceeds to the first, second, and third system users via EFT from the third system users' AFF account; generating and sending, from the CDMS via the NDD, disbursement completed notifications to the first, second, and third system users; and receiving, by the CDMS via the NDD, an acknowledgement notification from the first, second, and third system users. Alternatively, if the third system user is a manual participant in the asset forfeiture proceeds disbursement process, generating and sending from the CDMS via the NDD, final asset forfeiture notification and disbursement notices to the first, second, and third system users; receiving, by the CDMS via the NDD, final asset forfeiture notices from the first, second, and third system users; transferring, via EFT, to the first and second system users, by the third system user, the disbursements detailed in the disbursements notice; generating and sending to the CDMS via the NDD, a confirmation notice from the third system user; receiving, by the CDMS via the NDD, the confirmation of disbursement notice from the third system user; generating and sending, from the CDMS via the NDD, disbursement completed notices to the first, second, and third system users; receiving, from the CDMS via the NDD, the disbursement completed notices by the first, second, and third system users; generating and sending, to the CDMS via the NDD, the acknowledgment of disbursement completed notices from the first, second, and third system users; and receiving by the CDMS via the NDD, the acknowledgment of disbursement completed notices from the first, second, and third system users.

In still a further embodiment, the first system user is a querying law enforcement agency, the second system user is a source law enforcement agency, and the third system user is a prosecutor's office.

In yet a further embodiment, the subject is one of: (1) a confirmed narcotics dealer, (2) a confirmed terrorist, and (3) a confirmed criminal subject of some type.

In accordance with yet another embodiment of the present invention, there is provided a system for enhancing anti-terrorism and counter-terrorism capabilities by gathering, analyzing, and disseminating actionable intelligence essential to investigations and seizing terrorist's assets, which includes a data processing and records management system ("CDMS") including one or more processors and data storage means operatively coupled connected via available connectivity to the NDD with the CDMS and NDD being configured and arranged to: submit to the CDMS via the NDD, a subject query from a first system user; receive, by the CDMS via the NDD, a subject query from a first system user that contains information identifying a subject; conduct a search by the CDMS for any subject packet(s) containing information that matches the information identifying the subject of the query by accessing a data records management system ("DRMS") of subject packets stored on the CDMS; determine whether a match exists between the subject queried and any one of the subject packets in the DRMS; when a match is found not to exist between the subject queried and any of the subject packets in the DRMS, generate and send a negative response from the CDMS via the NDD, to the first system user; when a match is found to exist between the subject queried and at least one of the subject packets in the DRMS, further determine the status classification of the subject queried as a suspected or confirmed terrorist and generate and send a confirmation response from the CDMS via the NDD, to the first system user—the content of the response being based upon the status classification of the matched subject packet(s) and its unique transaction number(s); generate and send a terrorist subject queried notification via the NDD, from the CDMS to the second system user(s); receive, by the CDMS via the NDD, a completed terrorist subject queried response packet from the second system user; and generate and send that completed terrorist subject queried response packet from the CDMS via the NDD to the first system user.

In a further embodiment of this aspect of the present invention, the status classification comprises one of a suspected terrorist or confirmed terrorist and the CDMS and NDD are further configured and arranged to: assign a unique transaction number to the subject query; when the status classification is suspected terrorist, generate and send, from the CDMS via the NDD, a suspected terrorist confirmation response to the first system user referencing the unique transaction number; when the status classification is confirmed terrorist, generate and send from the CDMS via the NDD, a confirmed terrorist confirmation response to the first system user referencing the unique transaction number; when the status classification is suspected terrorist, generate and send from the CDMS via the NDD, a suspected terrorist subject queried notification to the second system user(s) referencing the unique transaction number(s) for the matched subject packet(s)—the second system user(s) being the user(s) that originally submitted the matched subject packet(s) into the DRMS; when the status classification is confirmed terrorist, generate and send from the CDMS via the NDD, a confirmed terrorist subject queried notification to the second system user(s) referencing the unique transaction number(s) for the matched subject packet(s); for either a suspected terrorist subject queried notification or a confirmed terrorist subject queried notification, receive, by the CDMS via the NDD, a completed terrorist subject queried response packet from the second system user; and generate and send that completed terrorist subject queried response packet from the CDMS via the NDD to the first system user.

In yet a further embodiment, when the first system user does not make a seizure of the terrorist subject's assets, the CDMS and NDD are further configured and arranged to: receive, by the CDMS via the NDD, an acknowledgement from the first system user confirming that the first system user received the confirmation response from the CDMS and a non-seizure notice confirming with CDMS that a seizure was not made; and generate and send from the CDMS via the NDD, a non-seizure notice to the second system user(s).

In still a further embodiment, when the first system user makes a seizure of the terrorist subject's assets, the CDMS and NDD are further configured and arranged to: receive, by the CDMS via the NDD, an acknowledgement from the first system user confirming that the first system user received the confirmation response from the CDMS and a seizure notice confirming with CDMS that a seizure was made; generate and send, from the CDMS via the NDD, a seizure notice to the second system user(s) and to a third system user, so that the third system user can initiate an asset forfeiture proceeding; receive a status of asset forfeiture notification from the third system user; determine if the third system user is an automated or manual participant in the asset forfeiture proceeds disbursement process; generate and send, from the CDMS via the NDD, final asset forfeiture notification and disbursement notices to the first, second, and third system users; and receive, by the CDMS via the NDD, acknowledgement of disbursement completed notifications from the first, second, and third system users; if the third system user is an automated participant, the CDMS schedules and facilitates the disbursement of the asset forfeiture proceeds to the first, second, and third system users via EFT from the third system users' AFF account; generate and send, from the CDMS via the NDD, disbursement completed notifications to the first, second, and third system users; and receive, by the CDMS via the NDD, an acknowledgement notification from the first, second, and third system users.

In yet a further embodiment, the first system user is a querying law enforcement agency, the second system user is a source law enforcement agency, and the third system user is a prosecutor's office.

In still a further embodiment, the subject is one of: (1) a suspected terrorist, (2) a confirmed terrorist, and (3) a terrorist subject of some type.

One or more embodiments of the present invention provides a system that implements a set of automated status classifications for subjects with suspected or confirmed involvement in terrorist activities. The status classifications specifically and concisely establish the subject's involvement in terrorist activities—(See 18 U.S.C. § 2331(1), § 2331(5), USA PATRIOT Act, International Money Laundering Abatement and Financial Anti-Terrorism Act of 2001—included in the USA PATRIOT Act, HSPD-2, Public Law 107-306, and IRTPA). Moreover, the preferred embodiments of this system facilitate the seizure of terrorist assets in accordance with section 981(a)(1)(G) of the federal civil forfeiture statute (18 U.S.C. § 981) by providing front-line law enforcement officers with an automated, efficient means by which they have quasi-instantaneous, direct access to actionable intelligence highly useful for preventing the unlawful use of force and violence against persons or property to intimidate or coerce a government, the civilian population, or any segment thereof, in furtherance of political or social objectives, identifying terrorists incidents, and establishing probable cause necessary to seize terrorist's assets. (See 28 C.F.R. Section 0.85). Accordingly, the present invention materially contributes to countering terrorism and enhances counter-terrorism defenses by providing front-line law enforcement personnel with an automated system that (1) implements a set of automated status classifications for characterizing a subject's involvement in terrorist activities, (2) operates as a quasi real-time electronic data processing and records management system and gateway to actionable terrorist intelligence that will prevent terrorists' activities, identify terrorist incidents, and facilitate the establishment of the probable cause necessary to effectuate seizure of terrorist assets, and (3) implements an automated and streamlined electronic process for asset forfeiture actions that ensure terrorist assets are efficiently and effectively seized. As a result of the present invention, the actionable intelligence necessary to prevent acts of terrorism will be made available quasi-instantaneously, on a national scale, to law enforcement officers, most importantly, front-line law enforcement officers. Further, this actionable intelligence will make terrorist subjects known to front-line law enforcement officers, thereby stripping terrorists of their most prized asset—anonymity. Finally, this actionable intelligence will allow for a more effective use of asset forfeiture proceedings against terrorists, thereby depleting terrorist organizations' economic resources and preventing them from funding or obtaining assets necessary to carry out their heinous acts of destruction.

In accordance with one embodiment of the present invention, there is provided a method for enhancing anti-terrorism and counter-terrorism capabilities by gathering, analyzing, and disseminating actionable intelligence essential to countering terrorism and seizing terrorist's assets, which comprises the steps of: receiving, by the CDMS via the NDD, a subject query from a first system user that contains information identifying a subject; conducting a search by the CDMS of the DRMS for a subject packet(s) containing information that matches the information identifying the subject of the query by accessing the DRMS of subject packets stored on a data storage means; determining, by utilizing the CDMS, whether a match exists between the subject queried and any one of the subject packets in the DRMS; when a match is found not to exist between the subject and any of the subject packets in the DRMS, generating and sending from the CDMS via the NDD, a negative response to the first system user; and when a match is found to exist between the subject queried and at least one of the subject packets in the DRMS, further determining the status classification of the subject queried as a suspected or confirmed terrorist; and generating and sending, by the CDMS via the NDD, a response to the first system user—the content of the response being based upon the status classification of the matched subject packet(s) and its unique transaction number(s); and generating and send a terrorist subject queried notification, via the NDD from the CDMS, to the second system user(s); receiving, by the CDMS via the NDD, a completed terrorist subject queried response packet from the second system user; and generating and sending that completed terrorist subject queried response packet from the CDMS via the NDD to the first system user.

In a further embodiment of this aspect of the present invention, the status classification comprises one of suspected terrorist or confirmed terrorist and the method further comprises the steps of: assigning, by the CDMS, a unique transaction number to the subject query when the status classification is suspected terrorist, generating and sending a suspected terrorist confirmation response from the CDMS via the NDD, to the first system user referencing the unique transaction number; when the status classification is confirmed terrorist, generating and sending a confirmed terrorist confirmation response from the CDMS via the NDD, to the first system user referencing the unique transaction number; when the status classification is suspected terrorist, generating and sending a suspected terrorist subject queried notification from the CDMS via the NDD, to the second system user(s)—the second system user(s) being the user that originally submitted the matched subject packet(s) into the DRMS of the CDMS; and when the status classification is a confirmed terrorist, generating and sending a confirmed terrorist subject queried notification from the CDMS via the NDD, to the second system user(s) referencing the unique transaction number(s) for the matched subject packet(s); for either a suspected terrorist subject queried notification or a confirmed terrorist subject queried notification, receiving, by the CDMS via the NDD, a completed terrorist subject queried response packet from the second system user; and generating and sending that completed terrorist subject queried response packet from the CDMS via the NDD to the first system user.

In yet a further embodiment, when the first system user does not make a seizure of the terrorist subject's assets, the method further comprises the steps of: receiving, by the CDMS via the NDD, an acknowledgement from the first system user confirming the first system user received the confirmation response from the CDMS and a non-seizure notice confirming with CDMS that a seizure was not made; and generating and sending, from the CDMS via the NDD, a non-seizure notice to the second system user(s).

In still a further embodiment, when the first system user makes a seizure of the terrorist subject's assets, the method further comprises the steps of: receiving, by the CDMS via the NDD, an acknowledgement from the first system user confirming that the first system user received the confirmation response from the CDMS and a seizure notice confirming with CDMS that a seizure was made; generating and sending, from the CDMS via the NDD, a seizure notice to the second system user(s) and to a third system user, so that the third system user can initiate an asset forfeiture proceeding; receiving, by the CDMS via the NDD, a status of asset forfeiture notification from the third system user; determining, by the CDMS, if the third system user is an automated participant or manual participant in the asset forfeiture proceeds disbursement process; generating and sending, from the CDMS via the NDD, final asset forfeiture notification and disbursement notices to the first, second, and third system users; and receiving, by the CDMS via the NDD, acknowledgement of disbursement completed notifications from the first, second, and third system users; if, the third system user is an automated participant in the asset forfeiture proceeds disbursement process, the CDMS schedules and facilitates the disbursement of the asset forfeiture proceeds to the first, second, and third system users via EFT from the third system users' AFF account; generating and sending, from the CDMS via the NDD, disbursement completed notifications to the first, second, and third system users; and receiving, by the CDMS via the NDD, an acknowledgement notification from the first, second, and third system users. Alternatively, if the third system user is a manual participant in the asset forfeiture proceeds disbursement process, generating and sending, from the CDMS via the NDD, final asset forfeiture notification and disbursement notices to the first, second, and third system users; receiving, by the CDMS via the NDD, final asset forfeiture notices from the first, second, and third system users; transferring via EFT to the first and second system users by the third system user the disbursements detailed in the disbursements notice; generating and sending, to the CDMS via the NDD, a confirmation notice from the third system user; receiving, by the CDMS via the NDD, the confirmation of disbursement notice from the third system user; generating and sending, from the CDMS via the NDD, disbursement completed notices to the first, second, and third system users; receiving, from the CDMS via the NDD, the disbursement completed notices by the first, second, and third system users; generating and sending, to the CDMS via the NDD, the acknowledgment of disbursement completed notices from the first, second, and third system users; and receiving, by the CDMS via the NDD, the acknowledgment of disbursement completed notices from the first, second, and third system users.

In yet a further embodiment, the first system user is a querying law enforcement agency, the second system user is a source law enforcement agency, and the third system user is a prosecutor's office.

In still a further embodiment, the subject is one of: (i) a suspected terrorist, (ii) a confirmed terrorist, and (iii) a terrorist subject of some type.

One or more embodiments of the present invention provide a method that comprises the steps for determining the status classification of terrorist subjects as either suspected or confirmed. This method of status classification determination specifically and concisely establishes a subject's involvement in terrorist activities—(See 18 U.S.C. § 2331 (1), § 2331(5), USA PATRIOT Act, International Money Laundering Abatement and Financial Anti-Terrorism Act of 2001—included in the USA PATRIOT Act, HSPD-2, Public Law 107-306, and IRTPA) Moreover, preferred embodiments of this method facilitate the seizing of terrorist assets in accordance with section 981(a)(1)(G) of the federal civil forfeiture statute (18 U.S.C. § 981) by providing front-line law enforcement officers with an automated, efficient means by which they have quasi-instantaneous, direct access to actionable intelligence highly useful for preventing the unlawful use of force and violence against persons or property to intimidate or coerce a government, the civilian population, or any segment thereof, in furtherance of political or social objectives, identifying terrorists incidents, and establishing probable cause necessary to seize terrorist's assets. (See 28 C.F.R. Section 0.85) Accordingly, the present method of the invention materially contributes to countering terrorism and enhances counter-terrorism defenses by providing front-line law enforcement personnel through the development and automation of both processes and methods: (1) a set of status classifications for determining and clarifying a subject's involvement in terrorist activities, (2) operating a quasi real-time electronic data processing and records management system and gateway to actionable terrorist intelligence preventing terrorists activities, identifying terrorists incidents, and facilitating the establishment of the probable cause necessary to effectuate the seizure of terrorist assets, and (3) implementing a streamlined electronic process and method for asset forfeiture actions ensuring terrorist assets are efficiently and effectively seized. As a result of the present invention, the actionable intelligence necessary to prevent acts of terrorism will be made accessible quasi-instantaneously to front-line law enforcement officers. Further, this method of providing actionable intelligence to front-line law enforcement officers will make terrorist subjects identifiable, thereby stripping terrorists of their most prized asset—anonymity. Finally, this method for providing actionable intelligence will allow law enforcement to perpetuate the more effective use of asset forfeiture proceedings against terrorists, thereby depleting the terrorist organizations' economic resources and preventing them from funding or obtaining assets necessary to carry out their heinous acts of destruction.

It is understood that the objects and summary, and the following detailed description of the present invention, are merely exemplary and explanatory in nature. As such, the objects and summary, and the following detailed description of the invention, should not be construed to limit the scope of the appended claims in any sense.

One object of one or more embodiments is to provide an automated system and method for facilitating the execution of law enforcement duties, which enables a national database to be quasi-instantaneously and directly accessible by a QLEA(s) via available connectivity to a network of digital devices ("NDD") configured and arranged to use a program or application loaded thereon or accessible therefrom.

Another object of one or more embodiments is to provide an automated system and method for facilitating the execution of law enforcement duties that establishes a set of classification criteria for subjects, which identifies the subject and specifically and concisely determines and identifies the subject's involvement in an unlawful activity.

Still another object of one or more embodiments is to provide an automated system and method for facilitating the execution of law enforcement duties that provides actionable intelligence from a national database to a QLEA or querying system user.

Yet another object of one or more embodiments is to provide an automated system and method for enhancing counter-terrorism defenses by gathering, analyzing, and disseminating actionable intelligence essential to counter-terrorism investigations and seizing terrorist's assets.

Still another object of one or more embodiments is to provide an automated system and method for enhancing counter-terrorism defenses by establishing a set of classification criteria for terrorist subjects which identifies a terrorist subject and specifically and concisely determines and identifies that subject's involvement in terrorist activity.

Yet another object of one or more embodiments is to provide an automated system and method for enhancing counter-terrorism defenses by providing actionable intelligence from a national database to a QLEA or querying system user.

Additional objects and advantages of the present invention will be apparent from the following detailed description, the accompanying drawings, and the appended claims.

BRIEF DESCRIPTION OF THE SEVERAL VIEWS OF THE DRAWINGS

The invention will now be described, by way of example, with reference to the accompanying drawings, in which.

Throughout the figures, the same components and process steps are always denoted using the same reference characters so that, as a general rule, they will only be described once.

DETAILED DESCRIPTION OF EMBODIMENTS OF THE INVENTION

Figure 1:
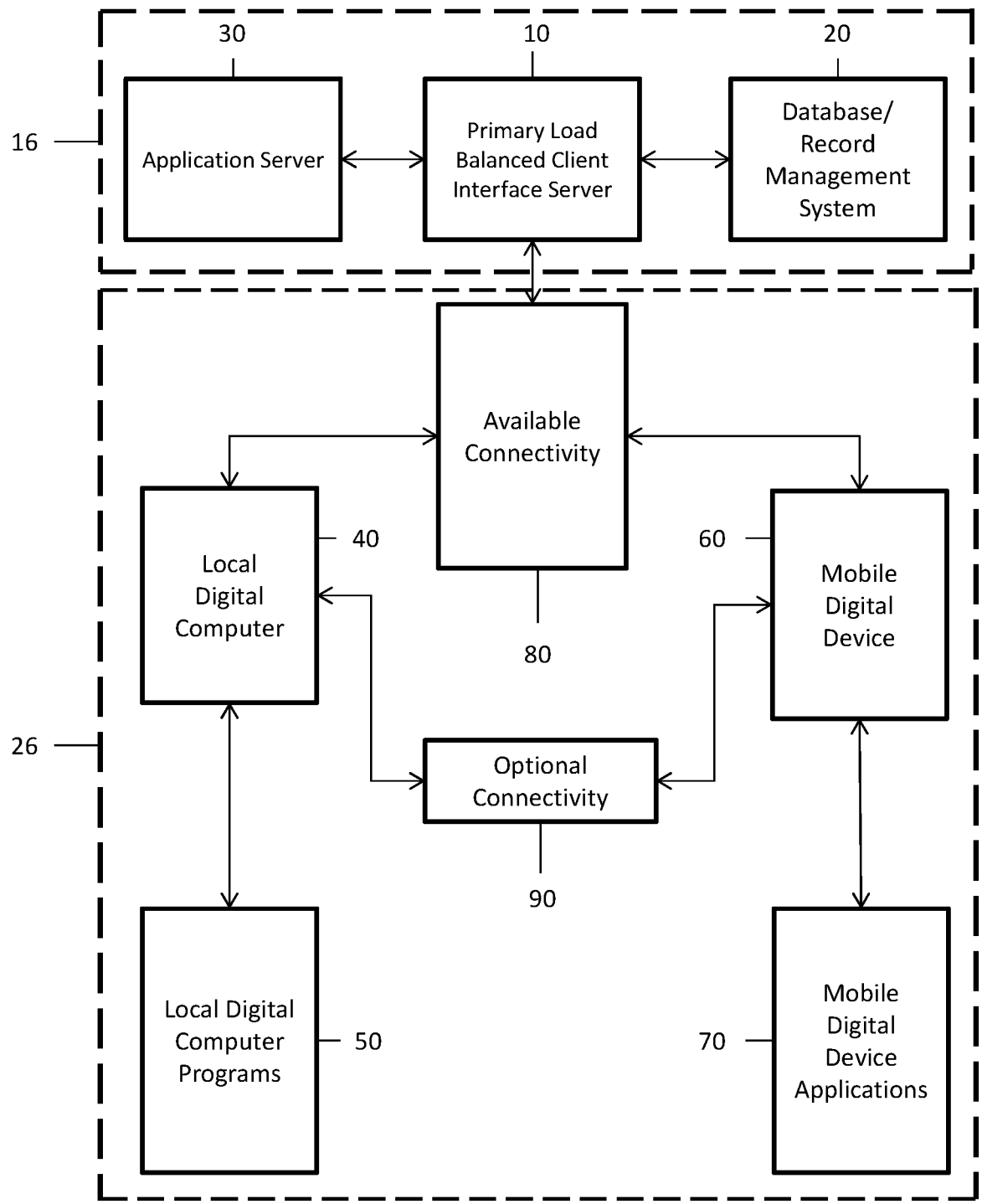
FIG. 1 is a block diagram of an exemplary system for facilitating the execution of law enforcement duties and enhancing anti-terrorism and counter-terrorism capabilities, according to an embodiment of the present invention.
Figure 2:
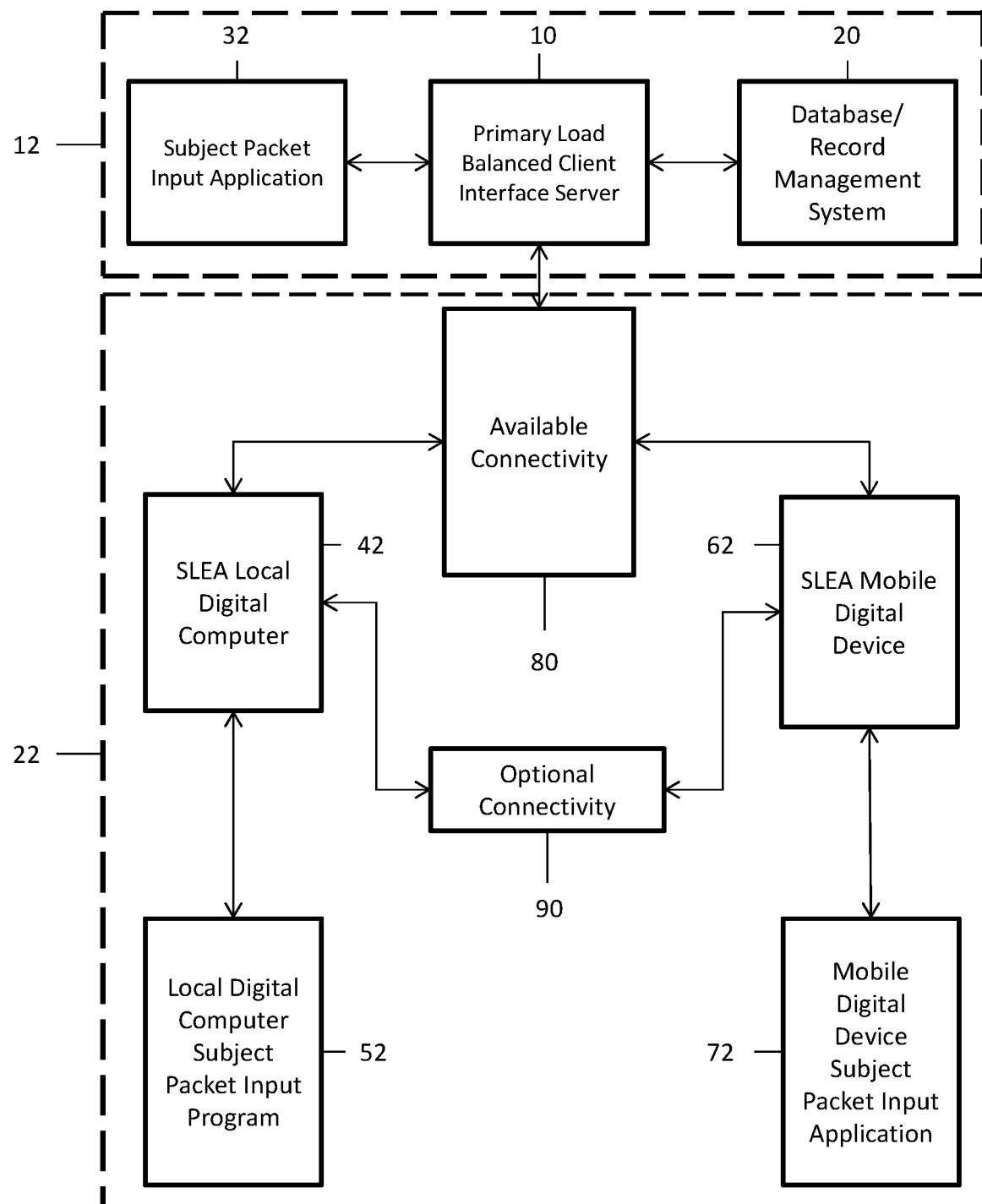
FIG. 2 is a block diagram of an exemplary system for facilitating the submission of subject packet information to the system by a SLEA through a subject packet input application or program using a local digital computer or mobile digital device networked together or connected, via available connectivity, to the primary load balanced client interface server of the CDMS. Each local digital computer or mobile digital device will be configured, arranged and loaded with the subject packet input application or program or be connected to the CDMS, via available connectivity, making the subject packet input application accessible to the SLEA. When available connectivity is unavailable, each local digital computer or mobile digital device will be configured, arranged and loaded with the subject packet input application or program capable of storing the SLEA's subject packet information submission within the local digital computer or mobile digital device until available connectivity is available; at that time, the SLEA may upload the subject packet submission to the CDMS. Finally, the DRMS of the CDMS will be configured and arranged to store all subject packets uploaded to it by SLEAs.

The present invention is described herein, in an exemplary manner, with reference to data processing system architecture and flowcharts that illustrate exemplary processes carried out by the central data management system ("CDMS"). In a preferred embodiment, functional blocks of the flowchart illustrations can be implemented by computer program instructions. As such, it is to be understood that the operations performed in subsequent functional blocks of the flowchart illustrations are typically carried out by the computer program instructions in response to operations performed in one or more preceding functional blocks of the flowchart illustrations. These computer program instructions may be loaded directly onto an internal data storage device of a data processing system (e.g., a hard drive of a computer). Alternatively, these computer program instructions could be stored on a portable computer-readable medium (e.g., a flash drive, a floppy disk, a compact disk, etc.), and then subsequently loaded onto a data processing system such that the instructions can be executed thereby. In other embodiments, these computer program instructions could be embodied in the hardware of the data processing system, rather than in the software thereof. Thus, as used herein, it is to be understood that, when a computer or data processing system is said to be configured and arranged to perform one or more steps or functions, this is equivalent to reciting that the computer or data processing system is specifically programmed or specially programmed to carry out the one or more steps or functions.

For the sake of brevity, conventional data processing system components, conventional data networking, and conventional software coding will not be described in detail herein. Also, it is to be understood that the connecting lines shown in the block diagram(s) included herein are intended to represent functional relationships and/or operational couplings between the various components. Similarly, connecting lines are also used between the elements of the flowcharts in order to illustrate functional relationships there between. In addition to that which is explicitly depicted, it is to be understood that many alternative or additional functional relationships and/or physical connections may be incorporated in a practical application of the system.

1. Terminology

As used herein, the term "actionable intelligence" refers to information of a defined quantity and quality "based upon an established legal standard" that is concise and provided electronically in response to a real-time query.

As used herein, the term "subject" broadly refers to any one of the following: a person, motor vehicle, equipment, marine vessel, aircraft, property, address, location, paper currency, telephone number, e-mail address, Internet protocol address ("IP"), or any other thing that can be described with specificity. In a non-limiting, exemplary embodiment, a subject is established in a data records management system ("DRMS") of a central data management system ("CDMS") by a second system user who submits a subject packet.

As used herein, the term "descriptive data" refers to information used to describe with specificity, or to identify, a subject. In a non-limiting, exemplary embodiment of the invention, descriptive data for a person is comprised of a person's name, sex, and race, and other known descriptive information obtained from official government or commercial documentation, such as date of birth, social security account number, driver's license number, state identification card number, state identification number ("SID"), Alien Registration Number, Non-Immigrant Visa Number, alias(es), Integrated Automated Fingerprint Identification System ("IAFIS") number, fingerprints, other biometric data, etc. While in a preferred embodiment, descriptive data for a motor vehicle or equipment comprises a license plate number or Vehicle Identification Number ("VIN"), serial number, or an electronic or radio signal/identifier (e.g. a "LoJack" signal), descriptive data for an aircraft comprises an aircraft registration number, serial number, or an electronic or radio signal/identifier (e.g. a "LoJack" signal), and descriptive data for a marine vessel comprises a vessel registration number, serial number, boat hull ID number, or an electronic or radio signal/identifier (e.g. a "LoJack" signal). The descriptive data for each of the aforementioned vehicles, aircraft, marine vessels, and equipment may also include the state, country, or other governing jurisdiction in which the registration or serial number was issued. In one embodiment, descriptive data for an address is comprised of a complete property address. Descriptive data for real, personal or other property can be submitted to the CDMS if the item can be specifically described using official government identification documentation or other available identifying documentation, commercial or private. Furthermore, in one embodiment of the invention, a photograph, video, or voice recording of a subject could be attached as descriptive data.

The term "subject packet" is used herein to describe a group of data preferably consisting of the following four components: (1) a subject, (2) descriptive data, (3) a status classification, and (4) the second system user's report number(s) documenting the information upon which the status classification is based.

The term "confirmation response" is used herein to refer to a response message sent from a central data management system ("CDMS") to the first system user notifying the user of the results found when a subject query is made of the data records management system ("DRMS"). In a non-limiting, exemplary embodiment, the response message is sent from the CDMS, via available connectivity, to the first system user's local digital computer or mobile digital device.

The terms "querying law enforcement agency" or "querying LEA" or "QLEA" are used herein to refer to the one or more individuals of a law enforcement agency who submit a subject query to the CDMS, via available connectivity, from a local digital computer or mobile digital device.

The terms "source law enforcement agency" or "source LEA" or "SLEA" are used herein to refer to the one or more individuals of a law enforcement agency who input data into the DRMS of the CDMS, via available connectivity, using a local digital computer or mobile digital device.

In an exemplary embodiment, the term "status classification" is used herein to refer to the stipulative definition component of a subject packet submitted to the CDMS by a second system user that establishes said subject packet as actionable intelligence. A status classification is comprised of two elements, the first element being either of the terms "Confirmed" or "Suspected", which are used to describe the quality and quantity of articulable evidence or facts known or possessed by a second system user about a particular subject, and the second element being any definable criminal activity or illegal condition associated with that particular subject (e.g. drug dealer, kidnapper, bank robber, drug transport vehicle, bait money, drug buy money, terrorist meeting location, money launderer, stolen property, etc.). The first element of a status classification is based on the legally recognized standards of "probable cause" or "reasonable suspicion." For example, a status classification of "Confirmed—Drug Dealer," indicates that, at a minimum, the second system user who submitted the subject packet has information and/or evidence equivalent to the legal standard of probable cause; that is to say, evidence in a quality and quantity of sufficient articulable facts, supported by circumstances sufficiently strong to justify a prudent and cautious person's belief, that the subject is a drug dealer. A status classification of "Suspected—Drug Dealer," indicates that, at a minimum, the second system user who submitted the subject packet has information and/or evidence equivalent to the legal standard of reasonable suspicion; that is to say, "specific and articulable facts," "taken together with rational inferences from those facts," such that a reasonable person could have reasonable cause to suspect that the subject is a drug dealer. The status classification, as defined in the CDMS, is not in and of itself to be considered by the first system user as probable cause or reasonable suspicion. Instead, the status classification provides a first system user with an objective minimum standard upon which to evaluate the quality and quantity of the second system user's information upon which the status classification is based.

2. Exemplary System

FIGS. 1-4 are schematic representations of an exemplary system 12, 14, 16, and 18 for facilitating the execution of law enforcement duties and enhancing anti-terrorism and counter-terrorism capabilities, according to an embodiment of the invention. At its core, the system 12, 14, 16, and 18 includes a central data management system ("CDMS"). In a preferred embodiment, as shown in FIG. 1, the CDMS 16 comprises a central data processing system that is in the form of a central digital computer or central server 10, ("primary server"), which has one or more processors and one or more data storage means. Alternatively, a preferred embodiment of the CDMS 16 comprises a central data processing system that is in the form of multiple digital computers or servers arranged in a multi-tier web application 10, each having one or more processors and one or more data storage means. In a preferred embodiment of the CDMS 16, the digital computers or servers may use virtualization software, such as VM Ware, Hyper-V or Xen, to more effectively utilize the digital computer or server resources while providing application software 30, storing system data 20, or serving as a webserver 10, database 20, record management system 20, or client interface server 10. Alternatively, in a preferred embodiment of the CDMS 16, the primary load balanced client interface server 10 may be operatively coupled by Ethernet or a cellular, Internet, network, radio, short-range wireless, or satellite connection (collectively "available connectivity") 80. The servers will generally be of the Intel, AMD, Sun, or mainframe variety and will utilize Linux, Windows, Solaris, z/OS, or AIX operating systems.

The primary load balanced client interface server 10 will serve as the entry point for all CDMS system users. CDMS software applications will be stored on the application server 30 while the database and/or records management system will be stored in the database/records management system 20. The primary load balanced client interface server 10, application server 30, and database/records management system 20 will all be operatively coupled together, via Ethernet or available connectivity. The primary load balanced client interface server 10 will handle initial CDMS system user interactions while the application server 30 will reside behind a firewall separating the primary load balanced client interface server 10 from the application server 30. The database/records management system 20 will reside behind a firewall separating the application server 30 from the database/records management system 20. This multi-tier configuration will allow security to be maximized by allowing the integration of multi-level firewalls.

In a preferred embodiment, the application server 30 will store the CDMS software applications used to accept, validate, match, and store all input data submitted by system users to the CDMS 16. Additionally, in a preferred embodiment, the application server 30 will store all applications and programs for the execution of a subject query, the archive feature, the investigative alert feature, the law enforcement agency report feature, the public/private video surveillance monitoring feature, the six-person photo array line-up feature, the fingerprint recording and/or query feature, the satellite downlink feature, the GPS officer tracking feature, the mobile tracking device monitoring feature, the license plate tracking and notification feature, the iris/retina recording and/or query feature, the facial recognition recording and/or query feature, the palm-print recording and/or query feature, the hand geometry recording and/or query feature, the voice recording and/or query feature, the administrative management feature, and the report and evidence exchange feature (collectively "available software applications").

The data, which includes a plurality of subject packets, investigative alerts, and the system archive, is compiled and maintained in the database and record management system 20 and would include data stored on one or more data storage devices (e.g., hard drive(s)) of the database and/or records management system 20. This preferred embodiment would have the database and record management system 20, configured, arranged, and replicated through operative coupling via Ethernet, to the primary load balanced client interface server 10, but may be connected by other available connectivity. This multi-tier configuration provides for maximum security of the database and/or records management systems 20 by allowing the integration of multi-level firewalls. In a preferred embodiment, the primary load balanced client interface server 10 would not function as an application server 30 for the CDMS system 16 or as the database/records management system 20. However, by storing or serving applications to CDMS system users 40 and 60, the primary load balanced client interface server 10 could serve CDMS applications or programs to include the subject packet input application 32, subject query application 34, investigative alert application 38, or archive record query application. The subject packet input application 32 enables a second system user (via 52 or 72) to input subject packet data into the CDMS 12 via the NDD 22. The subject query application 34 enables a first system user (via 54 or 74) to query the CDMS 14 via the NDD 24. The investigative alert application 38 enables a system user (via 58 or 78) to create or receive investigative alerts from the CDMS 18 via the NDD 28. The subject input data is prepared for uploading into the CDMS 12 by the subject packet input application 32 or 52. Subject packet data is queried by a first system user through a local digital computer or mobile digital device running 54 or 74, or queried by the subject query application 34. Investigative alerts are created or received by CDMS 18 system users through a local digital computer or mobile digital device 48 or 68 running the investigative alert application 58 or 78. A local digital computer 40 will be configured and arranged to include a central processing unit, running an available operating system compatible with the CDMS client interface or web-interface software, mouse, keyboard, monitor, among other optional hardware (collectively "local digital computer") 40. The second system user will input data into the subject packet input application 32, 52, or 72 through the use of multiple pieces of hardware connected, via wired or wireless connectivity, to a SLEA local digital computer 42 or SLEA mobile digital device 62 to include: (1) keyboard, (2) mouse, (3) passive stylus or digital pen. Alternatively, the second system user will input data into the CDMS 12 using availability connectivity and the subject packet input application 32, 52, or 72 through the use of an onscreen virtual keyboard. In one embodiment, the subject packet input application 32, 52, or 72 is loaded directly on the CDMS 12 such that a second system user is able to access the subject packet input application 32 by logging onto the primary load balanced client interface server 10 from the SLEA local digital computer 42 which is configured and arranged and operatively connected to the CDMS 12 via available connectivity 80. In other embodiments of the invention, the subject packet input program 52 is loaded onto a SLEA's local digital computer 42 and then the subject packet data entered by the SLEA is transmitted from the SLEA's local digital computer 42 to the primary load balanced client interface server 10 by available connectivity 80. The SLEA's local digital computer 42 is configured and arranged to communicate with the primary load balanced client interface server 10 through the utilization of client interface or web-interface software. As the name implies, a SLEA local digital computer 42 will usually be located on the premises of a SLEA.

Referring again to FIG. 1, it can be seen that the primary load balanced client interface server 10 is accessed by a system user via available connectivity 80 using either a local digital computer 40 or a mobile digital device 60. As used herein a "mobile digital device" 60 includes devices such as a personal digital assistant ("PDA"), mobile or smartphone, mobile internet device ("MID"), Ultra-Mobile PC ("UMPC"), Internet computer or tablet, or other short-range wireless, cellular, satellite, radio, or network enabled devices. As the name implies, a mobile digital device 60 can be deployed in any setting for use by a system user, so long as there is available connectivity 80. Referring again to FIG. 2, in a preferred embodiment, a SLEA who is accessing the primary load balanced client interface server 10 from a local digital computer 42 enters a subject packet into the DRMS 20 using available connectivity 80 and the subject packet application 32 loaded on the application server 30, whereas a SLEA who is accessing the primary load balanced client interface server 10 from a SLEA mobile digital device 62, enters subject packet data into the DRMS 20 using a mobile digital device subject packet input application 72 which is loaded on the SLEA mobile digital device 62 and connected to the CDMS 12 via available connectivity 80. In another embodiment, the SLEA mobile digital device 62 is configured and arranged to use the web browsing functionality of the SLEA mobile digital device 62 and available connectivity 80 to access the subject packet input application 32 loaded directly on the application server 10 such that a SLEA is able to access the subject packet input application 32 by logging onto the primary load balanced client interface server 10. In either of the preferred embodiments, the mobile digital device 62 will be configured and arranged to use applications allowing the mobile digital device 62 to communicate with the primary load balanced client interface server 10, which will then pass information to the application server 32—the brains of the system, an application server will facilitate communication with the database/record management system 20 to query or store data. The SLEA mobile digital devices 62 use mobile device operating systems such as Apple iOS, Google Android (Linux), Google Chrome OS, Hewlett-Packard webOS, RIM Black-Berry Tablet OS (ONX Neutrino), Intel/Nokia MeeGo (Linux), Nokia Maemo (Linux), Microsoft Windows CE for MID, Palm OS, BlackBerry OS, Symbian, RIM, iOS, iOS 4, Windows CE/Pocket PC OS, and Windows 7 among numerous other mobile device operating systems. The SLEA mobile digital device 62, configured and arranged with a mobile operating system and available connectivity 80, communicates with the primary load balanced client interface server 10 via client interface or web-interface software located on the primary load balanced client interface server 10. Additionally, a SLEA mobile digital device 62 can be configured and arranged to connect to a SLEA local digital computer 42 via a docking station or wired connection (collectively "optional connectivity") 90. A SLEA mobile digital device 62 is configured and arranged to accept data input through multi-touch interface, keypad, keyboard, passive stylus or electronic pen, Bluetooth connected input device, USB connected device, dock connected device, 3.5 mm input mini-jack among other wireless and wired input devices.

A local digital computer 40 will be configured and arranged to include a central processing unit, running an available operating system compatible with the CDMS client interface or web-interface software, mouse, keyboard, monitor, among other optional hardware (collectively "local digital computer") 40. The first system user will query the CDMS 14 using the subject query application or program 34, 54, or 74 through the use of multiple pieces of hardware connected, via wired or wireless connectivity, to a QLEA local digital computer 44 or QLEA mobile digital device 64 to include: (1) keyboard, (2) mouse, (3) passive stylus or digital pen. Alternatively, the first system user will query the CDMS 14 using the subject query application 34 through the use of an on-screen virtual keyboard. In one embodiment, the subject query application 34 is loaded directly on the CDMS 14 such that a first system user is able to access the subject query application 34 by logging onto the primary load balanced client interface server 10 from the QLEA local digital computer 44 which is configured and arranged and operatively connected to the CDMS 14 via available connectivity 80. In other embodiments of the invention, the subject query program 54 is loaded onto a QLEA's local digital computer 44 and then, the subject query entered by the QLEA is transmitted from the QLEA's local digital computer 44 to the primary load balanced client interface server 10 by available connectivity 80. The QLEAs will not always have the subject query application or program loaded on their local digital computer 44 or mobile digital device 64; therefore, the local digital computer 44 or mobile digital device 64 will communicate with the primary load balanced client interface server 10, which will communicate with the application server 30 to obtain the subject query application 34. The QLEA's local digital computer 44 is configured and arranged to communicate with the primary load balanced client interface server 10 through the utilization of client interface or web-interface software. As the name implies, a QLEA local digital computer 44 will usually be located on the premises of a QLEA.

Referring again to FIG. 1, it can be seen that the primary load balanced client interface server 10 is accessed by a system user via available connectivity 80 using either a local digital computer 40 or a mobile digital device 60. As used herein a "mobile digital device" 60 includes devices such as a personal digital assistant ("PDA"), mobile or smartphone, mobile internet device ("MID"), Ultra-Mobile PC ("UMPC"), Internet computer or tablet, or other short-range wireless, cellular, satellite, radio, or network enabled devices. As the name implies, a mobile digital device 60 can be deployed in any setting for use by a system user, so long as, there is available connectivity 80. Referring again to FIG. 3, in a preferred embodiment, a QLEA who is accessing the primary load balanced client interface server 10 from a local digital computer 44, enters a subject query into the CDMS 14 using available connectivity 80 and the subject query application 34 loaded on the application server 30, whereas a QLEA who is accessing the primary load balanced client interface server 10 from a QLEA mobile digital device 64 enters a subject query into the CDMS 14 using a mobile digital device subject query application 74 which is loaded on the QLEA mobile digital device 64 and connected to the CDMS 14 via available connectivity 80. In another embodiment, the QLEA mobile digital device 64 is configured and arranged to use the web browsing functionality of the QLEA mobile digital device 64 and available connectivity 80 to access the subject query application 34 loaded directly on the application server 30 such that a QLEA is able to access the subject query application 34 by logging onto the primary load balanced client interface server 10. The QLEA mobile digital devices 64 use mobile device operating systems such as Apple iOS, Google Android (Linux), Google Chrome OS, Hewlett-Packard webOS, RIM BlackBerry Tablet OS (ONX Neutrino), Intel/Nokia MeeGo (Linux), Nokia Maemo (Linux), Microsoft Windows CE for MID, Palm OS, BlackBerry OS, Symbian, RIM, iOS, iOS 4, Windows CE/Pocket PC OS, and Windows 7 or 8 among numerous other mobile device operating systems. The QLEA mobile digital device 64, configured and arranged with a mobile operating system and available connectivity 80, communicates with the primary load balanced client interface server 10 via client interface or web-interface software located on the primary server 10. Additionally, a QLEA mobile digital device 64 can be configured and arranged to connect to a QLEA local digital computer 44 via a docking station or wired connection (collectively "optional connectivity") 90. A QLEA mobile digital device 64 can accept data input through multi-touch interface, keypad, keyboard, passive stylus or electronic pen, Bluetooth connected input device, USB connected device, dock connected device, 3.5 mm input mini-jack among other wireless and wired input devices.

Figure 4:
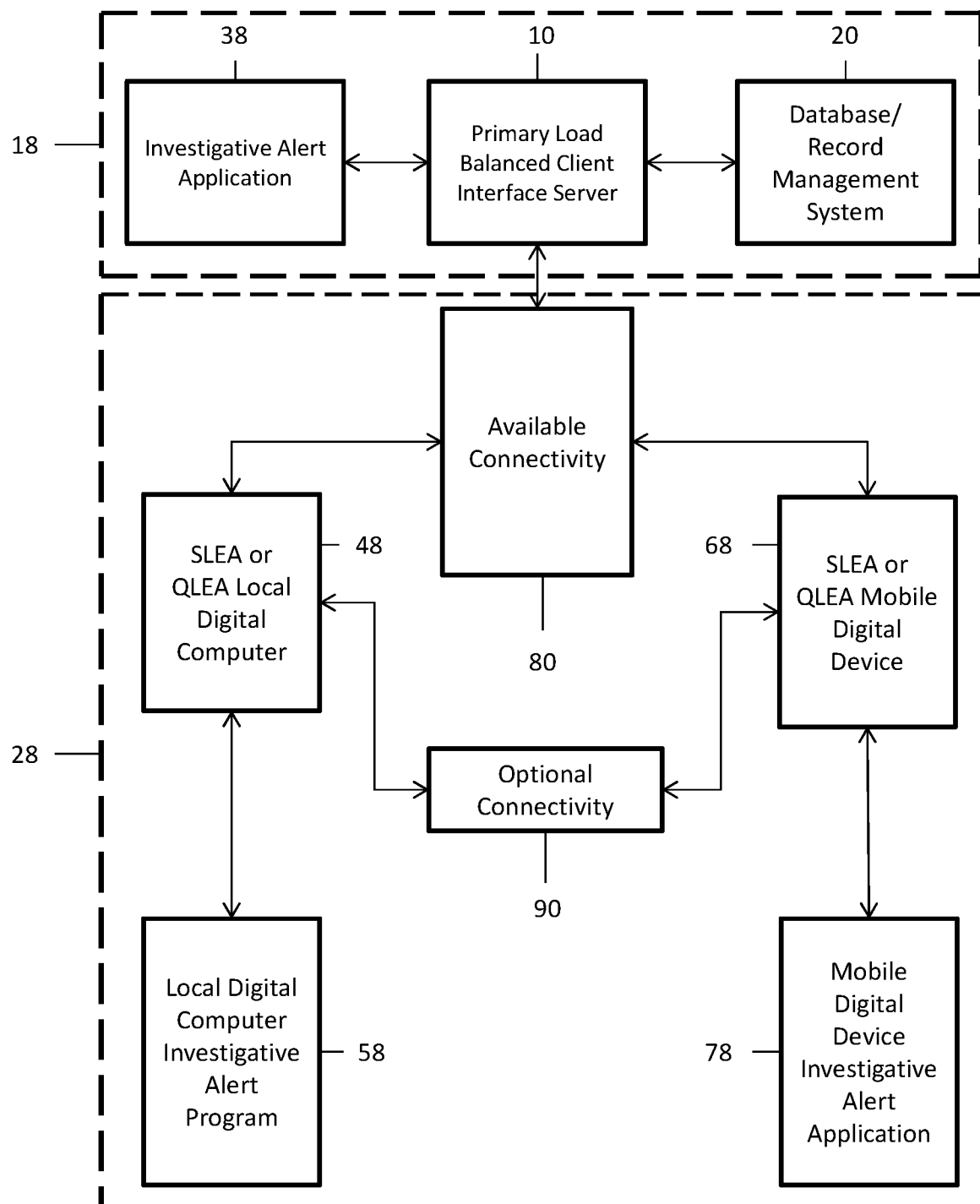
FIG. 4 is a block diagram of an exemplary system for creating an investigative alert and related processes by a system user through the investigative alert application or program using a local digital computer or mobile digital device networked or connected, via available connectivity, to the primary load balanced client interface server of the CDMS. Each local digital computer or mobile digital device will be configured, arranged and loaded with the investigative alert application or program or be connected to the CDMS, via available connectivity, making the investigative alert application or program accessible to the system users. When available connectivity is unavailable, each local digital computer or mobile digital device will be configured, arranged and loaded with the investigative alert application or program capable of storing the system user's investigative alert within the local digital computer or mobile digital device until available connectivity is available; at that time, the system user may submit the investigative alert to the CDMS. The DRMS of the CDMS will be configured and arranged to create, receive, and store every investigative alert submitted by a system user.

Turning to FIG. 4, a local digital computer 48 will usually be configured and arranged to include a central processing unit, running an available operating system compatible with the CDMS client interface or web-interface software, mouse, keyboard, monitor, among other optional hardware (collectively "local digital computer") 48. The system user will create or receive investigative alerts using the investigative alert application 38 through the use of multiple pieces of hardware connected, via wired or wireless connectivity, to a QLEA or SLEA local digital computer 48 or QLEA or SLEA mobile digital device 68 to include: (1) keyboard, (2) mouse, (3) passive stylus or digital pen. Alternatively, the system user will input data into the investigative alert application 38 through the use of an on-screen virtual keyboard. In one embodiment, the investigative alert application 38 is loaded directly on the application server 30 such that a system user is able to access the investigative alert application 38 by logging onto the primary load balanced client interface server 10 from the QLEA or SLEA local digital computer 48 which is configured and arranged and operatively connected to the CDMS 18 via available connectivity 80. In other embodiments of the invention, the investigative alert program 58 is loaded onto a QLEA's or SLEA's local digital computer 48 and then, the investigative alert entered by the system user is transmitted from the QLEA's or SLEA's local digital computer 48 to the primary load balanced client interface server 10 by available connectivity 80. The QLEA's or SLEA's local digital computer 48 is configured and arranged to communicate with the primary load balanced client interface server 10 through the utilization of client interface or web-interface software. As the name implies, a QLEA or SLEA local digital computer 48 will usually be located on the premises of a QLEA or SLEA.

Referring again to FIG. 1, it can be seen that the primary load balanced client interface server 10 is accessed by a system user via available connectivity 80 using either a local digital computer 40 or a mobile digital device 60. As used herein a "mobile digital device" 60 includes devices such as a personal digital assistant ("PDA"), mobile or smartphone, mobile internet device ("MID"), Ultra-Mobile PC ("UMPC"), Internet computer or tablet, or other short-range wireless, cellular, satellite, radio, or network enabled devices. As the name implies, a mobile digital device 60 can be deployed in any setting for use by a system user, so long as, there is available connectivity 80. Referring again to FIG. 4, in a preferred embodiment, a QLEA or SLEA who is accessing the primary load balanced client interface server 10 from a local digital computer 48 enters an investigative alert into the CDMS 18 using available connectivity 80 and the investigative alert application 38 loaded on the application server 30, whereas a QLEA or SLEA who is accessing the primary load balanced client interface server 10 from a QLEA or SLEA mobile digital device 68 enters an investigative alert in the CDMS 18 using a mobile digital device investigative alert application 78 which is loaded on the QLEA or SLEA mobile digital device 68 and connected to the CDMS 18 via available connectivity 80. In another embodiment, the QLEA or SLEA mobile digital device 68 is configured and arranged to use the web browsing functionality of the QLEA or SLEA mobile digital device 68 and available connectivity 80 to access the investigative alert application 38 loaded directly on the application server 30 such that a QLEA or SLEA is able to access the investigative alert application 38 by logging onto the primary load balanced client interface server 10. The QLEA or SLEA mobile digital devices 68 use mobile device operating systems such as Apple iOS, Google Android (Linux), Google Chrome OS, Hewlett-Packard webOS, RIM BlackBerry Tablet OS (ONX Neutrino), Intel/Nokia MeeGo (Linux), Nokia Maemo (Linux), Microsoft Windows CE for MID, Palm OS, BlackBerry OS, Symbian, RIM, iOS, iOS 4, Windows CE/Pocket PC OS, and Windows 7 or 8 among numerous other mobile device operating systems. The QLEA or SLEA mobile digital device 68, configured and arranged with a mobile operating system and available connectivity 80, communicates with the primary load balanced client interface server 10 via client interface or web-interface software located on the primary load balanced client interface server 10. Additionally, a QLEA or SLEA mobile digital device 68 can be configured and arranged to connect to a QLEA or SLEA local digital computer 48 via a docking station or wired connection (collectively "optional connectivity") 90. A QLEA or SLEA mobile digital device 68 can accept data input through multi-touch interface, keypad, keyboard, passive stylus or electronic pen, Bluetooth connected input device, USB connected device, dock connected device, 3.5 mm input mini-jack among other wireless and wired input devices.

3. Exemplary Data Query and Retrieval Processes

Figure 3:
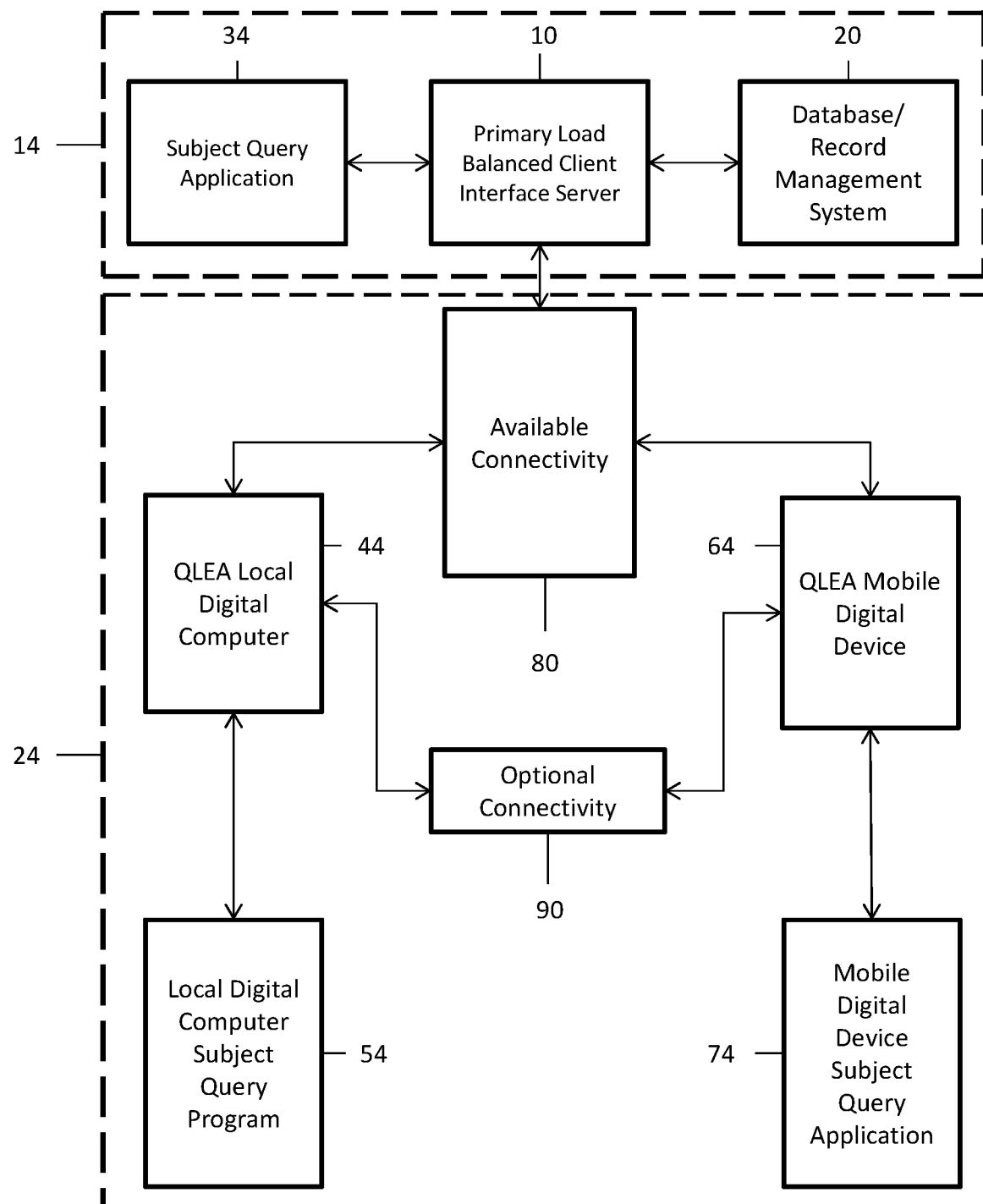
FIG. 3 is a block diagram of an exemplary system for facilitating a subject query by a QLEA through the subject query application or program using a local digital computer or mobile digital device networked together or connected, via available connectivity, to the primary load balanced client interface server of the CDMS. Each local digital computer or mobile digital device will be configured, arranged and loaded with the subject query application or be connected to the CDMS, via available connectivity, making the subject packet query application or program accessible to the system users. When available connectivity is unavailable, each local digital computer or mobile digital device will be configured, arranged and loaded with the subject packet query application or program capable of storing the QLEA's subject query within the local digital computer or mobile digital device until available connectivity is available; at that time, the QLEA may submit the subject query to the CDMS. The DRMS of the CDMS will be configured and arranged to create, receive, and store every subject query submitted by a QLEA.

In accordance with an embodiment of the invention, a flowchart illustrating exemplary subject query and retrieval processes carried out by the central data management system ("CDMS") 14 via the NDD 24 (as shown in FIG. 3) is detailed in FIGS. 5-13 and FIG. 36. For the sake of clarity, the subject query and retrieval processes of the CDMS 14 will be described in relation to different scenarios that are possible when an exemplary QLEA submits a subject query via the NDD 24, to the CDMS 14. These scenarios include: (1) a QLEA subject query of the CDMS 14 resulting in a "Negative" response only; (2A) a QLEA subject query of the CDMS 14 resulting in a "Confirmed" status classification confirmation response, seizure, and successful asset forfeiture; (2B) a QLEA subject query of the CDMS 14 resulting in a "Suspected" status classification confirmation response, seizure, and successful asset forfeiture; (2C) a QLEA subject query of the CDMS 14 resulting in a "Suspected" status classification confirmation response, seizure, and unsuccessful asset forfeiture; and (3) a QLEA subject query of the CDMS 14 resulting in a "Suspected" status classification confirmation response only.

Figure 5:
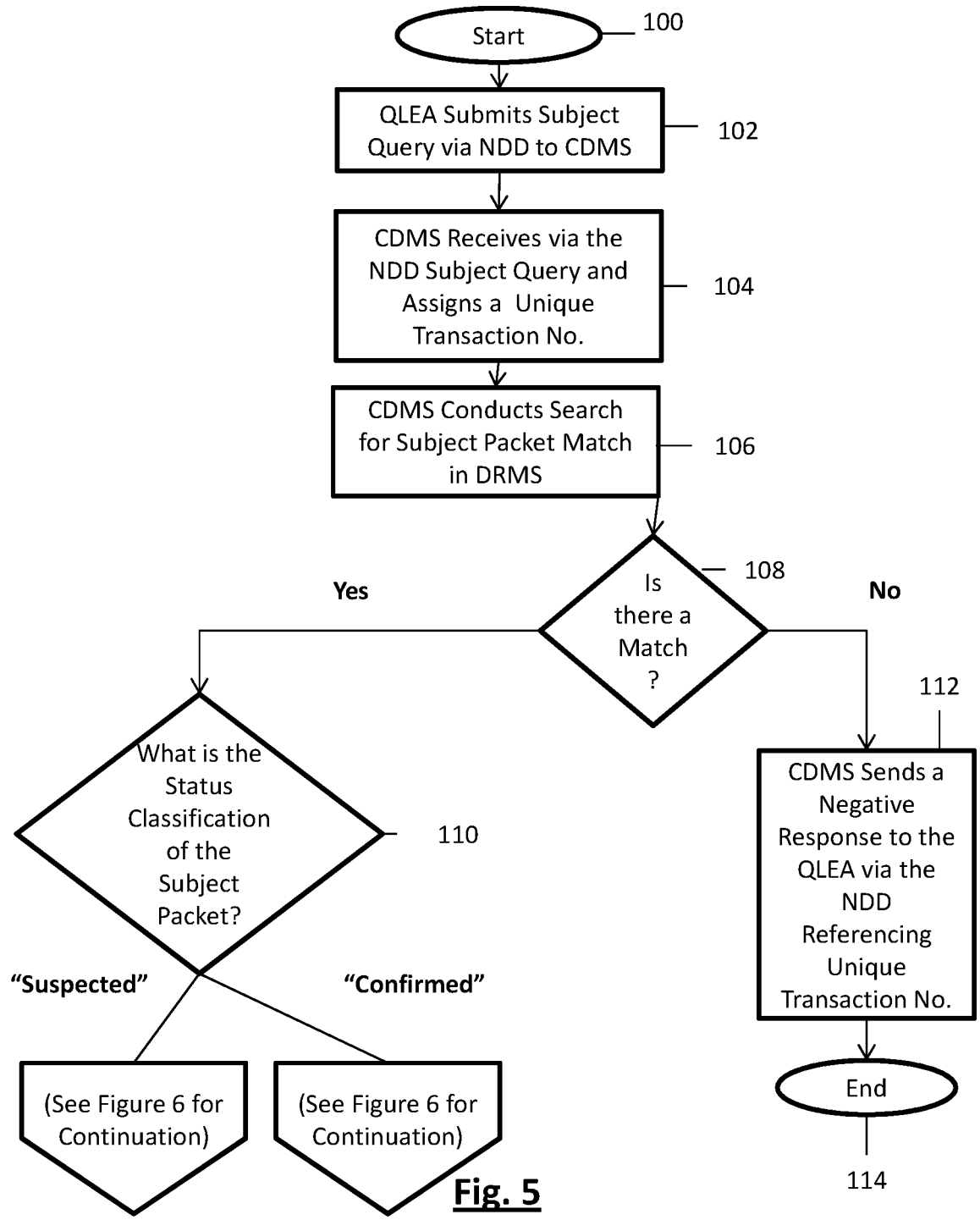
FIG. 5 is a partial flowchart illustrating exemplary subject query and retrieval processes carried out by the system of FIG. 3 and detailed in FIGS. 5-13, according to an embodiment of the present invention.

In a first exemplary scenario, a QLEA subject query of the CDMS 14 results in a "Negative" response only. Referring to FIG. 5, the process commences at 100, and in step 102, a QLEA submits, via the NDD 24, a subject query to the CDMS 14. The QLEA submits the subject query to the CDMS 14 in step 102 in order to determine whether or not a particular subject matches a subject packet in the DRMS 20. In step 104, the CDMS 14 receives the subject query from the QLEA via the NDD 24, and assigns it a unique transaction number. In a preferred embodiment of the invention, a unique transaction number is assigned by the CDMS 14 to each submitted subject query at step 104, FIG. 5. This unique transaction number is thereafter referenced by the CDMS 14 with regard to any communications relating to that specific QLEA subject query.

In subsequent step 106, the CDMS 14 conducts a search of the DRMS 20 for a subject packet matching the QLEA subject query, and determines at decision block 108 whether a match exists between the subject and any one of the subject packets in the DRMS 20. In this first exemplary scenario, the CDMS 14 determines that no match exists at decision block 108, and thus proceeds to step 112, where the CDMS 14 sends, via the NDD 24, a "Negative" response to the QLEA, referencing the unique transaction number assigned by the CDMS 14 to the original QLEA subject query in step 104. Thereafter, the process associated with the first exemplary scenario is concluded at step 114.

In a second exemplary scenario, a QLEA subject query of the CDMS 14 submitted via the NDD 24 results in a "Confirmed" Confirmation Response, seizure, and successful asset forfeiture. Referring again to FIG. 5, the process commences at step 100, and steps 102, 104, and 106 are the same as described above for the first exemplary scenario. However, the second exemplary scenario differs from the first exemplary scenario starting at decision block 108. In the second exemplary scenario, when the search is conducted of the DRMS 20, the CDMS 14 determines at decision block 108 that a match exists between the subject of the QLEA subject query and at least one of the subject packets in the DRMS 20. For the situation in which multiple matching subject packets are identified in a search of the DRMS 20, the CDMS 14 will associate all identified matching subject packets, their SLEA(s), and their respective unique transaction number(s) (assigned by the CDMS 12 at step 304, FIG. 14), with the unique transaction number assigned by the CDMS 14 to the QLEA subject query in step 104. Thereafter, at decision block 110, the CDMS 14 determines the status classification of the matching subject packet(s) identified in the DRMS 20.

Figure 6:
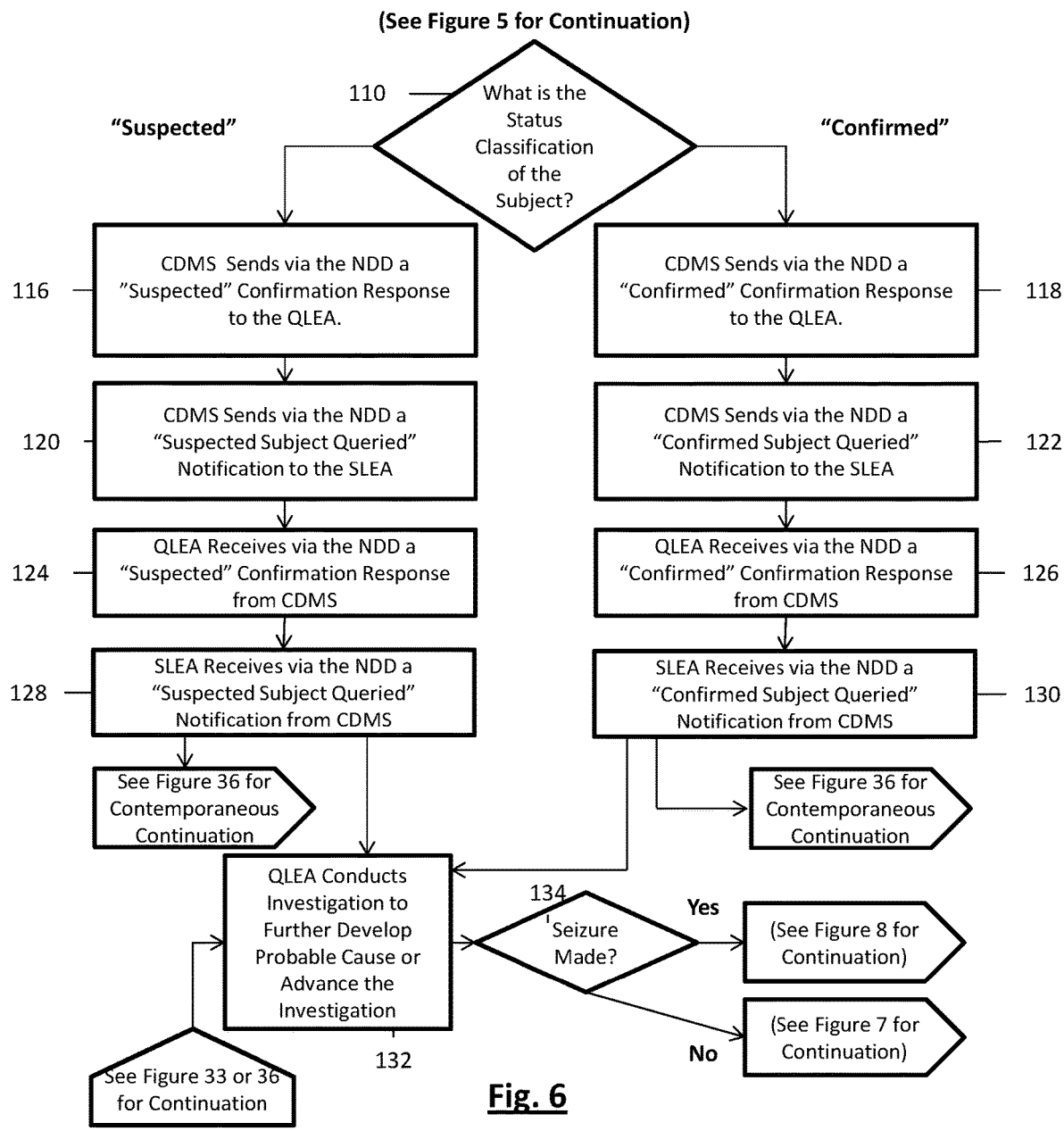
FIG. 6 is a continuation of the flowchart of FIG. 5, which illustrates additional steps of the exemplary subject query and retrieval processes, according to an embodiment of the present invention.
Figure 7:
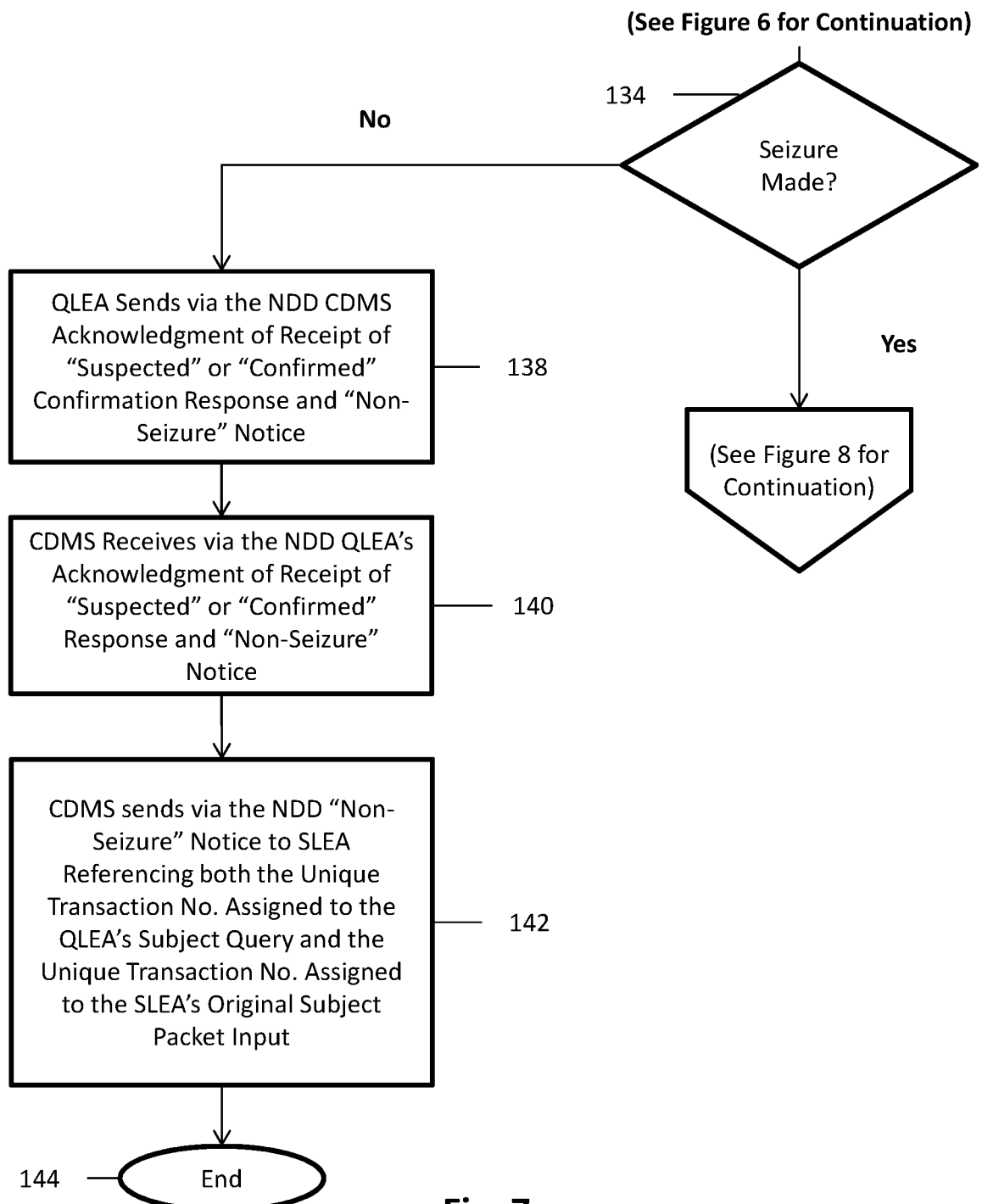
FIG. 7 is a continuation of the flowchart of FIG. 6, which illustrates additional steps of the exemplary subject query and retrieval processes, according to an embodiment of the present invention.

Continuing this second exemplary scenario on FIG. 5, at step 110, the matching subject packet is determined by the CDMS 14 to have a status classification of "Confirmed." Referring now to step 118 in FIG. 6, the CDMS 14 sends a "Confirmed" Confirmation Response to the QLEA, via the NDD 24, referencing the unique transaction number assigned by the CDMS 14 to the QLEA's subject query in step 104, FIG. 5. In a preferred embodiment of the invention, for subject queries resulting in a subject packet match, the Confirmation Response provides (1) the status classification, either "Confirmed" or "Suspected", of the matched subject packet(s), (2) the name and contact information for the SLEA(s), (3) the unique transaction number(s) of the matched subject packet(s) (assigned by the CDMS 12 at step 304, FIG. 14), and (4) the unique transaction number of the QLEA's subject query assigned at 104, FIG. 5.

In one or more embodiments of the invention, each of the "Confirmed" and "Suspected" Confirmation Responses comprises concisely presented actionable intelligence retrieved from a database of subject packets about a positively identified subject. Notably and significantly different from responses obtained from reports-based database systems, the information contained in the response from the subject packet-based database system described herein contains only positively identified subjects, the identification of which are each established and confirmed by specific descriptive data. Consequently, the Confirmation Response received by a querying officer resulting from the query of the subject packet-based database contains a positive match(es) of a queried subject with matching descriptive data specific to that data defined in the initial query; not a list of possible key-word matches which require further examination by the querying officer to ascertain and confirm applicability to the subject queried. Furthermore, each subject packet contains a concise, specifically defined criminal nature associated with a given subject. This positive subject match, coupled with the specifically defined criminal nature of the subject, provides the querying officer with actionable intelligence; actionable intelligence which can be immediately utilized by that officer in support of a necessary or desired law enforcement action without the need to review a list of key-word matched searches of subjects or to read a report, subjectively review the information it contains, develop the needed actionable intelligence therefrom and then utilize it. The concise, specific nature of the information contained in the Confirmation Response significantly expedites the delivery and utilization of actionable intelligence in support of law enforcement actions. Additionally, this concise presentation enables the database to provide more usable actionable intelligence to the querying officer at one time, because the information that is provided is only what the officer needs to know about the criminal nature(s) of a queried subject; not all the extraneous detail and supporting information surrounding the origin of the information. Also important to note is the evidentiary value of the actionable intelligence contained in the Confirmation Response and how it directly supports a querying officer's subsequent decisions and actions. Specifically, the actionable intelligence provided in the Confirmation Response can be utilized to serve an evidentiary function in a given legal proceeding resulting from the law enforcement action in which the actionable intelligence was used, meaning a querying officer can directly cite the actionable intelligence in the Confirmation Response as part of the officer's articulable facts and circumstances supporting such law enforcement actions as investigative detentions, interrogations, arrests, searches, or seizures being prosecuted before a court of law.

Also, in one or more embodiments, the "Confirmed" and "Suspected" Confirmation Responses generated by the system described herein include the following attributes: (1) the absence of the need for the querying officer to review lists of key-word matches and read individual report(s), (2) the immediate delivery of actionable intelligence to the querying officer, (3) the evidentiary usefulness of the actionable intelligence in support of law enforcement actions and the resultant legal proceedings such as arrests, suppression hearings, seizure/asset forfeiture prosecutions, and criminal prosecutions, (4) the enhanced facilitation of seizures and asset forfeitures, and (5) the automation of the equitable sharing of asset forfeiture proceeds.

At step 122 in FIG. 6, the CDMS 14 sends via the NDD 24, a "Confirmed Subject Queried" notification to the SLEA(s), notifying the SLEA(s) that a subject query matched a subject packet it submitted. Preferably, a "Confirmed Subject Queried" notification contains the following information: (1) the name of the subject queried, (2) the date of the subject query, (3) the QLEA's name and contact information, (4) the unique transaction numbers for both the QLEA subject query and the SLEA(s)' matched subject packet(s), and (5) a subject queried response packet. The contact information of the QLEA is maintained in the CDMS 16 under the system user's account and is automatically attached to the "Confirmed Subject Queried" notification based on the unique transaction number. In step 126, the QLEA receives, via the NDD 24, a "Confirmed" confirmation response from the CDMS 14. The CDMS "Confirmed" confirmation response, received by the QLEA at step 126, requires the QLEA to confirm or deny that a seizure was made. In step 130, the SLEA receives, via the NDD 24, the "Confirmed Subject Queried" notification from the CDMS 14. As part of the "Confirmed Subject Queried" notification received by the SLEA in step 130, FIG. 6, the process for the completion of the subject queried response packet begins at step 130 of FIG. 36, occurring contemporaneous to the investigation conducted by the QLEA in step 132, FIG. 6. At step 1104, FIG. 36, the SLEA is presented with a subject queried response packet. The subject queried response packet solicits the SLEA to provide immediate input/feedback to the QLEA concerning the subject query which resulted in the "Confirmed" confirmation response at step 118, FIG. 6. At step 1108, if the SLEA decides to complete the subject queried response packet, the process continues at step 1116 where the SLEA completes the subject queried response packet using the available response options. The subject queried response packet is comprised of pre-populated information from the "Confirmed" confirmation response and offers the SLEA three response options from which to select, to include (1) "no response", (2) a drop-down style menu of operational responses (e.g. "Contact SLEA immediately," "Contact SLEA at earliest convenience," "Obtain photograph of subject," "Identify all associates," "Newly developed investigative information available," "Surveillance on-going," "SLEA will contact QLEA by cellphone immediately," "SLEA will contact QLEA at a later time," etc., or (3) a customized text message. Upon completion of the subject queried response packet by the SLEA, the completed subject queried response packet is sent by the SLEA to the CDMS via the NDD. If at step 1108 the SLEA either selects the "no response" option or fails to submit a response within the CDMS's designated response time, the process continues at step 1112 where a "no response" response is assigned to the subject queried response packet and it is automatically sent to the CDMS via the NDD. At step 1120, the CDMS receives the completed subject queried response packet or the "no response" response from the SLEA. At step 1124, the CDMS sends the SLEA's completed subject queried response packet or the "no response" response to the QLEA via the NDD. At step 1128, the QLEA receives the SLEA's completed subject queried response packet or the "no response" response from the CDMS. The process then continues at step 132, FIG. 6. It should be reiterated the process described above concerning the completion and transmission of the subject queried response packet by the SLEA and its delivery to the QLEA occurs contemporaneous to the investigation conducted by the QLEA at step 132, FIG. 6.

At step 132 of FIG. 6, as described below, utilizing the actionable intelligence provided by the CDMS 14 and any information provided by the SLEA via the subject queried response packet, the QLEA conducts its investigation to further develop reasonable suspicion, probable cause, or advance its investigation as it deems appropriate. The actionable intelligence provided by the CDMS 14, namely the "Suspected" or "Confirmed" status classification of a subject, serves an evidentiary function similar to that of a reliable informant and thus, contributes to the developing of evidence sufficient in both quality and quantity for a legal finding of probable cause necessary to effectuate, substantiate, and successfully prosecute a seizure of assets and/or asset forfeiture. The "Confirmed" status classification of the subject can be used by a QLEA as evidentiary support or specific articulable facts, together with the other items of evidence or information the QLEA has in its possession, for developing reasonable suspicion and/or probable cause. At decision block 134, it is determined whether or not the QLEA's investigation resulted in a seizure of assets. In this second exemplary scenario, a seizure of assets does result from the QLEA's investigation, and thus, the process is continued in FIG. 8, step 146.

In a preferred embodiment of the invention, as stated above, when the QLEA receives a confirmation response for a subject with a "Confirmed" status classification at block 126, the CDMS 14 requires the QLEA to submit an "Acknowledgement of Receipt" of the "Confirmed" Confirmation Response and "Seizure" Notice at step 146. At step 146, in the preferred embodiment, the acknowledgement of receipt of the "Confirmed" confirmation response and "Seizure" notice by the QLEA contains the following information: (1) whether or not a seizure was accomplished, (2) if a seizure was accomplished, the amount of the seizure or the item(s) seized, (3) the QLEA's report number(s) documenting the results of its investigation, (4) the unique transaction number of the QLEA subject query (this field is prepopulated by the CDMS 14), (5) the unique transaction number for the SLEA subject packet(s) (assigned by the CDMS 12 at step 304, FIG. 14) (this field is pre-populated by the CDMS 14), and (6) when a seizure is made, the name and contact information of the prosecutor's office in the seizing jurisdiction (selected from a pre-populated "drop-down" menu), hereafter referred to as the Designated Prosecutor's Office ("DPO"). A Confirmation Response remains in "open" status in the CDMS 14 until the QLEA submits the acknowledgment of receipt of the "Confirmed" confirmation response and "Seizure" notice to the CDMS 14 via the NDD 24.

Figure 8:
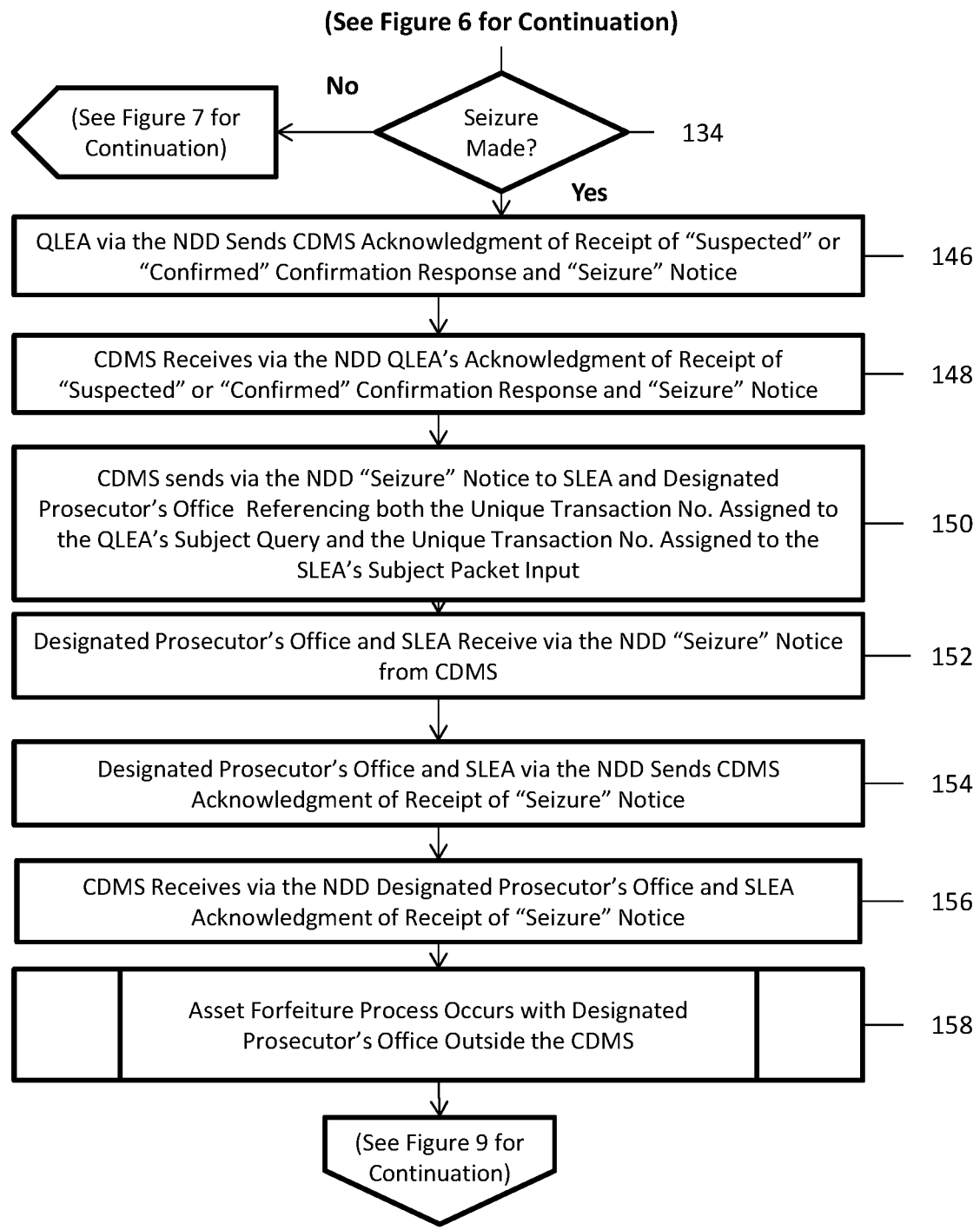
FIG. 8 is a continuation of the flowchart of FIGS. 6 and 7, which illustrates additional steps of the exemplary subject query and retrieval processes, according to an embodiment of the present invention.

Continuing with step 146 in FIG. 8, the QLEA sends the CDMS 14, via the NDD 24, an acknowledgement of receipt of "Confirmed" confirmation response and "Seizure" notice indicating that a seizure was made. Because the QLEA's investigation resulted in a seizure in this exemplary scenario, the QLEA's acknowledgement of receipt of the "Confirmed" confirmation response and "Seizure" notice would contain the following information: (1) a seizure was accomplished, (2) the amount of the seizure and/or item(s) seized, (3) the QLEA's report number(s) documenting the results of its investigation, (4) the unique transaction number for the QLEA's subject query, (5) the unique transaction number for the SLEA(s)'s subject packet(s) (assigned by the CDMS 12 at step 304, FIG. 14), and (6) the name and contact information of the DPO. In step 148, the CDMS 14 receives, via the NDD 24, the QLEA's acknowledgment of receipt of the "Confirmed" confirmation response and "Seizure" notice indicating that a seizure was made. Then, in step 150, the CDMS 14 sends, via the NDD 24, a "Seizure" notice to the SLEA(s) and the DPO. In a preferred embodiment, the "Seizure" notice contains the following information: (1) a seizure confirmation, (2) the amount of the seizure and/or the item(s) seized, (3) the unique transaction number assigned in block 104 to the QLEA subject query, (4) the QLEA's report number(s) documenting the results of its investigation, (5) the QLEA's name and contact information, (6) the contact information for the SLEA(s), (7) the contact information for the DPO, and (8) the unique transaction number(s) assigned to the SLEA(s)'s matched subject packet(s) (assigned by the CDMS 12 at step 304, FIG. 14). The contact information for the QLEA, SLEA(s), and DPO(s) is maintained in the DRMS 20 under each user's personal or designated account and is automatically attached based on the unique transaction numbers assigned to the subject query and subject packet(s). The CDMS 14 sends, via the NDD 24 the "Seizure" notice in step 150 which is received by the SLEA(s) and DPO in step 152. At step 154, the SLEA(s) and DPO send the CDMS 14, via the NDD 24, acknowledgement of receipt of "Seizure" notices. After the CDMS 14 receives the SLEA(s)'s and DPO's acknowledgement of receipt of "Seizure" notice at step 156, the asset forfeiture process commences at step 158, outside the CDMS 14.

In a first variation of the second exemplary scenario, the matching subject packet is determined at step 110, FIG. 5 to have a status classification of "Suspected." Referring now to step 116, FIG. 6, the CDMS 14 sends, via the NDD 24, a "Suspected" confirmation response to the QLEA identifying the subject's status classification as "Suspected". In a preferred embodiment of the invention, the "Suspected" confirmation response for this scenario contains the following information: (1) the status classification of "Suspected" of the matched subject packet(s), (2) the name and contact information for the SLEA(s), (3) the SLEA(s)'s unique transaction number(s) of the matched subject packet(s) (assigned by the CDMS 12 at step 304, FIG. 14), and (4) the unique transaction number of the QLEA's subject query assigned at step 104, FIG. 5. The CDMS 14 also sends a "Suspected Subject Queried" notification, via the NDD 24, at step 120, to the SLEA(s), notifying the SLEA(s) of the QLEA's subject query. Preferably, the "Suspected Subject Queried" notification contains the following information: (1) the name of the subject queried, (2) the date of the subject query, (3) the QLEA's name and contact information, (4) the unique transaction number for the QLEA's subject query, (5) the unique transaction number(s) assigned to the SLEA's original subject packet input (assigned by the CDMS 12 at step 304, FIG. 14), and (6) a subject queried response packet. The contact information of the QLEA and SLEA(s) is maintained in the DRMS 20 under the user's account and is automatically attached to the "Suspected Subject Queried" notification based on the unique transaction number. In step 124, the QLEA receives the "Suspected" confirmation response from the CDMS 14, via the NDD 24, identifying the status classification of the subject as "Suspected."

In step 128, the SLEA receives the "Suspected Subject Queried" notification from the CDMS 14, via the NDD 24. As part of the "Suspected Subject Queried" notification received by the SLEA in step 128, FIG. 6, the process for the completion of the subject queried response packet begins at step 128 of FIG. 36, occurring contemporaneous to the investigation conducted by the QLEA in step 132, FIG. 6. At step 1104, FIG. 36, the SLEA is presented with a subject queried response packet. The subject queried response packet solicits the SLEA to provide immediate input/feedback to the QLEA concerning the subject query which resulted in the "Suspected" confirmation response at step 116, FIG. 6. At step 1108, if the SLEA decides to complete the subject queried response packet, the process continues at step 1116 where the SLEA completes the subject queried response packet using the available response options. The subject queried response packet is comprised of pre-populated information from the "Suspected" confirmation response and offers the SLEA three response options from which to select, to include (1) "no response", (2) a drop-down style menu of operational responses (e.g. "Contact SLEA immediately," "Contact SLEA at earliest convenience," "Obtain photograph of subject," "Identify all associates," "Newly developed investigative information available," "Surveillance on-going," "SLEA will contact QLEA by cellphone immediately," "SLEA will contact QLEA at a later time," etc., or (3) a customized text message. Upon completion of the subject queried response packet by the SLEA, the completed subject queried response packet is sent by the SLEA to the CDMS via the NDD. If at step 1108 the SLEA either selects the "no response" option or fails to submit a response within the CDMS's designated response time, the process continues at step 1112 where a "no response" response is assigned to the subject queried response packet and it is automatically sent to the CDMS via the NDD. At step 1120, the CDMS receives the completed subject queried response packet or the "no response" response from the SLEA. At step 1124, the CDMS sends the SLEA's completed subject queried response packet or the "no response" response to the QLEA via the NDD. At step 1128, the QLEA receives the SLEA's completed subject queried response packet or the "no response" response from the CDMS. The process then continues at step 132, FIG. 6. It should be reiterated the process described above concerning the completion and transmission of the subject queried response packet by the SLEA and its delivery to the QLEA occurs contemporaneous to the investigation conducted by the QLEA at step 132, FIG. 6.

Next, at step 132 of FIG. 6, the QLEA conducts its investigation utilizing the actionable intelligence provided by the CDMS 14 and any information provided by the SLEA via the subject queried response packet, and a seizure results at decision block 134. As in the case of the second exemplary scenario discussed above involving a "Confirmed" confirmation response, a seizure, and a successful asset forfeiture, this first variation of the second exemplary scenario involves a "Suspected" confirmation response, a seizure, and a successful asset forfeiture. Consequently, at decision block 134, when it is determined that the QLEA's investigation resulted in a seizure, in this first variation of the second exemplary scenario, the process is continued in FIG. 8, step 146, and thereafter progresses the same as it had for the original version of the second exemplary scenario through steps 148, 150, 152, 154, and 156.

As it did in the original version of the second exemplary scenario above, after the CDMS 14 receives the SLEA(s)'s and DPO's acknowledgement of receipt of "Seizure" notices via the NDD 24 at step 156, the asset forfeiture process commences at step 158, outside the CDMS 14. Hereafter, the process steps for both the second exemplary scenario ("Confirmed" confirmation response, seizure, and successful asset forfeiture) and the first variation of the second exemplary scenario ("Suspected" confirmation response, seizure, and successful asset forfeiture) are the same. The first step in the asset forfeiture process conducted outside the CDMS occurs when the QLEA provides a copy of its agency report(s) documenting the results of its investigation and the resultant seizure to the DPO who will be handling the asset forfeiture process. The QLEA's agency report(s) will reference the unique transaction number associated with the subject query that resulted in the seizure. Next, the DPO initiates asset forfeiture proceedings and issues a discovery request to the SLEA(s) for its respective agency report(s) identified in the seizure notice(s) issued by the CDMS 14 in step 150, upon which the "Confirmed" or "Suspected" status classification of the matched subject packet in the DRMS 20 was based. After the SLEA(s) provides the DPO with the requested report(s) in response to the discovery request, the DPO continues the asset forfeiture process. Following the conclusion of the asset forfeiture process, at step 160, FIG. 9, the DPO sends a "Status of Asset Forfeiture" notification via the NDD 24 to the CDMS 14. In a preferred embodiment, the "Status of Asset Forfeiture" notification contains the following information: (1) the asset forfeiture status as successful or not successful, (2) the total amount or value of the asset forfeiture, and (3) the unique transaction number assigned to the QLEA's subject query at step 104, FIG. 5, that resulted in the seizure. Referring again to FIG. 9, the CDMS 14 receives the "Status of Asset Forfeiture" notification from the DPO via the NDD 24 at step 162. The process next continues at step 164, FIG. 9, based on the status of the asset forfeiture, that being either successful or unsuccessful, as identified by the DPO in its Status of Asset Forfeiture notification in step 162.

Figure 9:
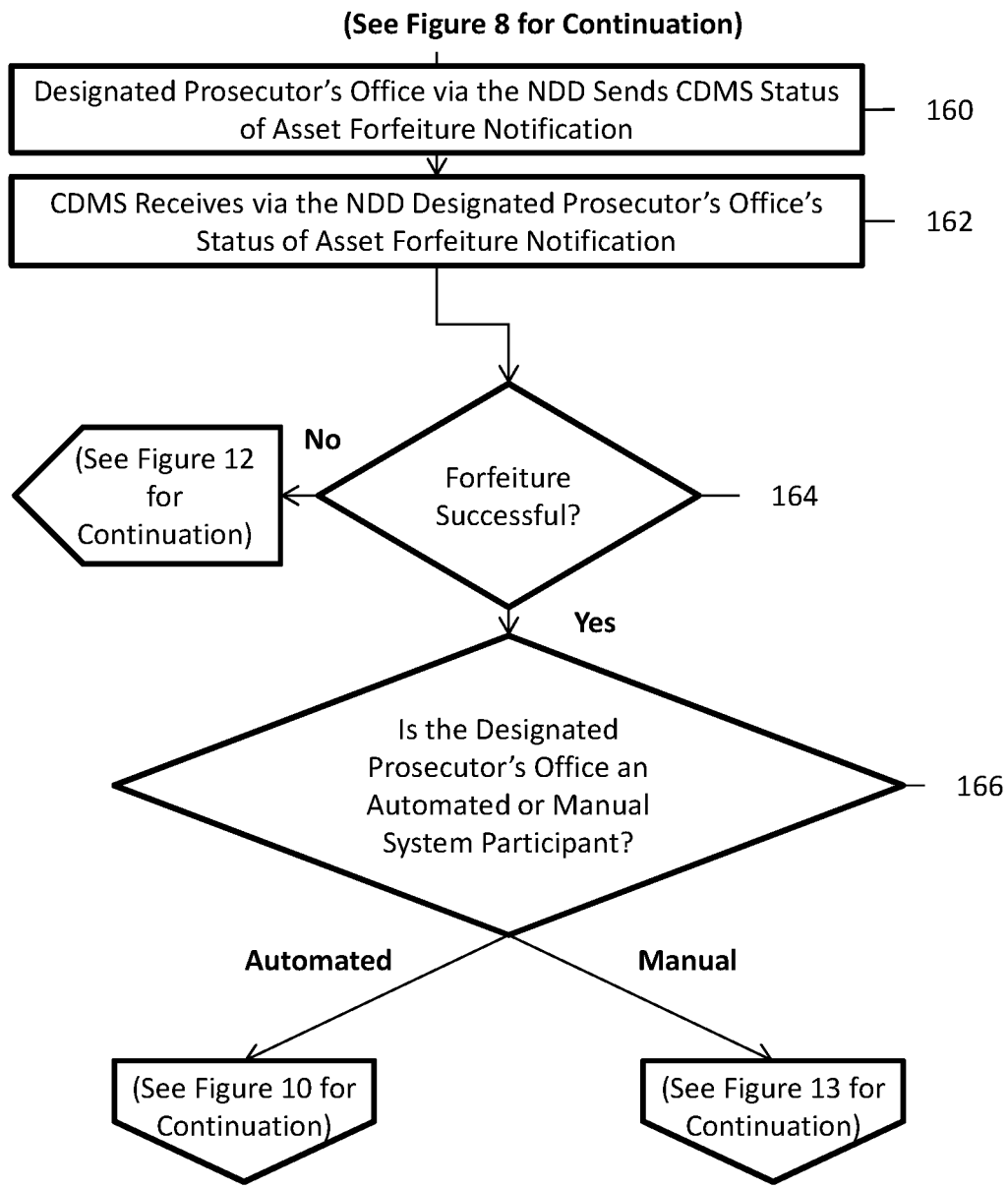
FIG. 9 is a continuation of the flowchart of FIG. 8, which illustrates additional steps of the exemplary subject query and retrieval processes, according to an embodiment of the present invention.
Figure 10:
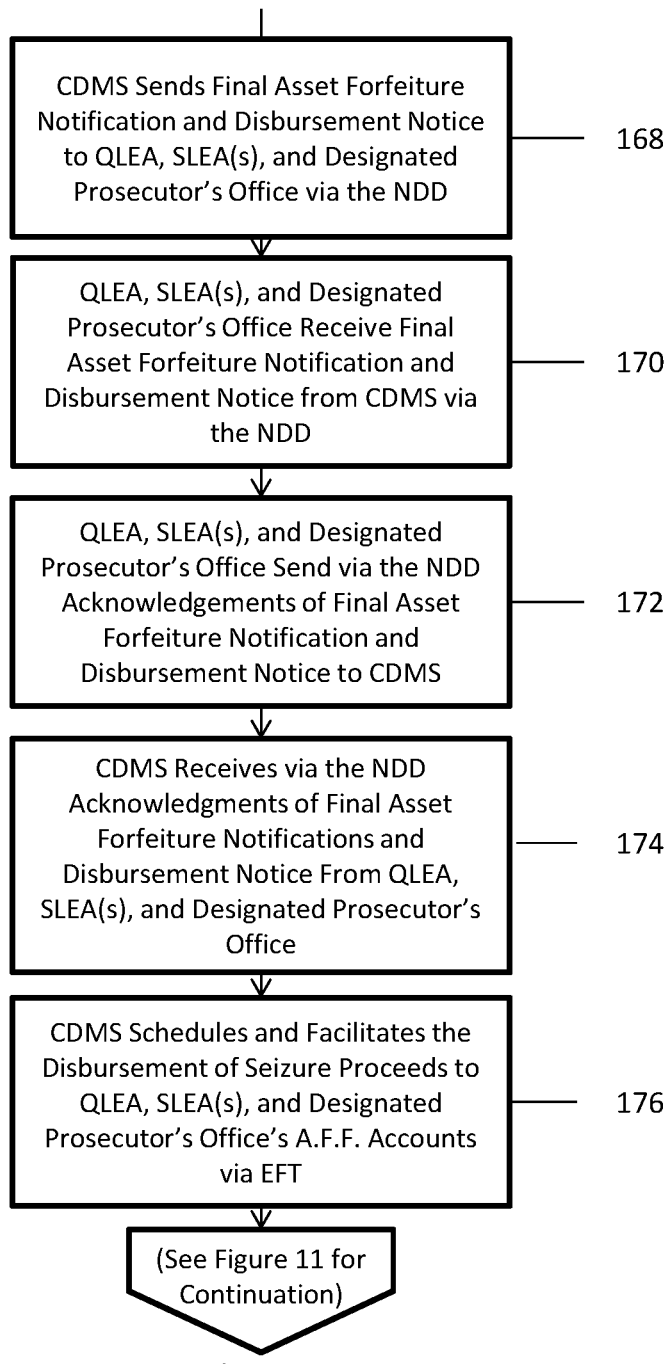
FIG. 10 is a continuation of the flowchart of FIG. 9, which illustrates additional steps of the exemplary subject query and retrieval processes, according to an embodiment of the present invention.
Figure 11:
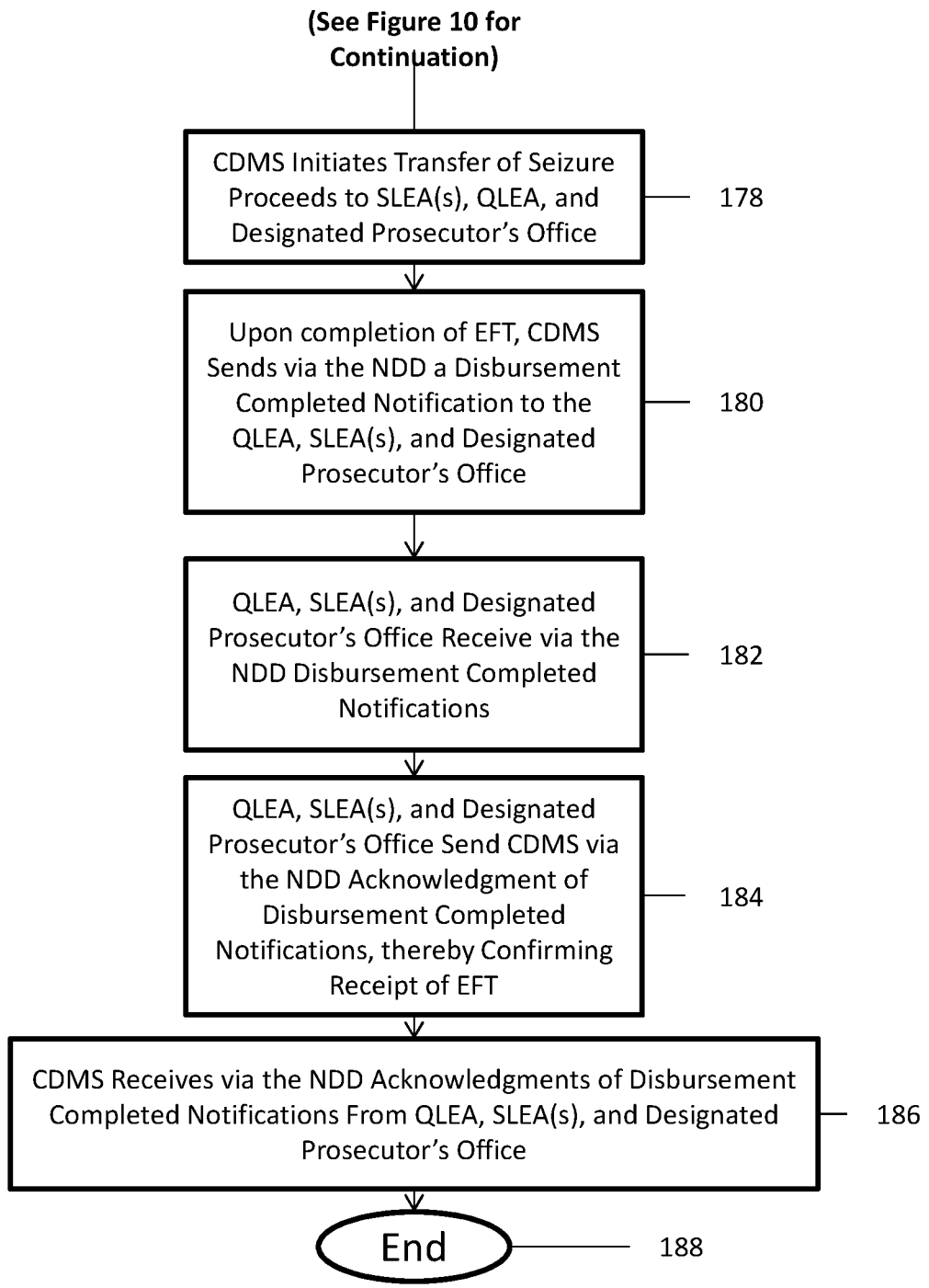
FIG. 11 is a continuation of the flowchart of FIG. 10, which illustrates additional steps of the exemplary subject query and retrieval processes, according to an embodiment of the present invention.
Figure 12:
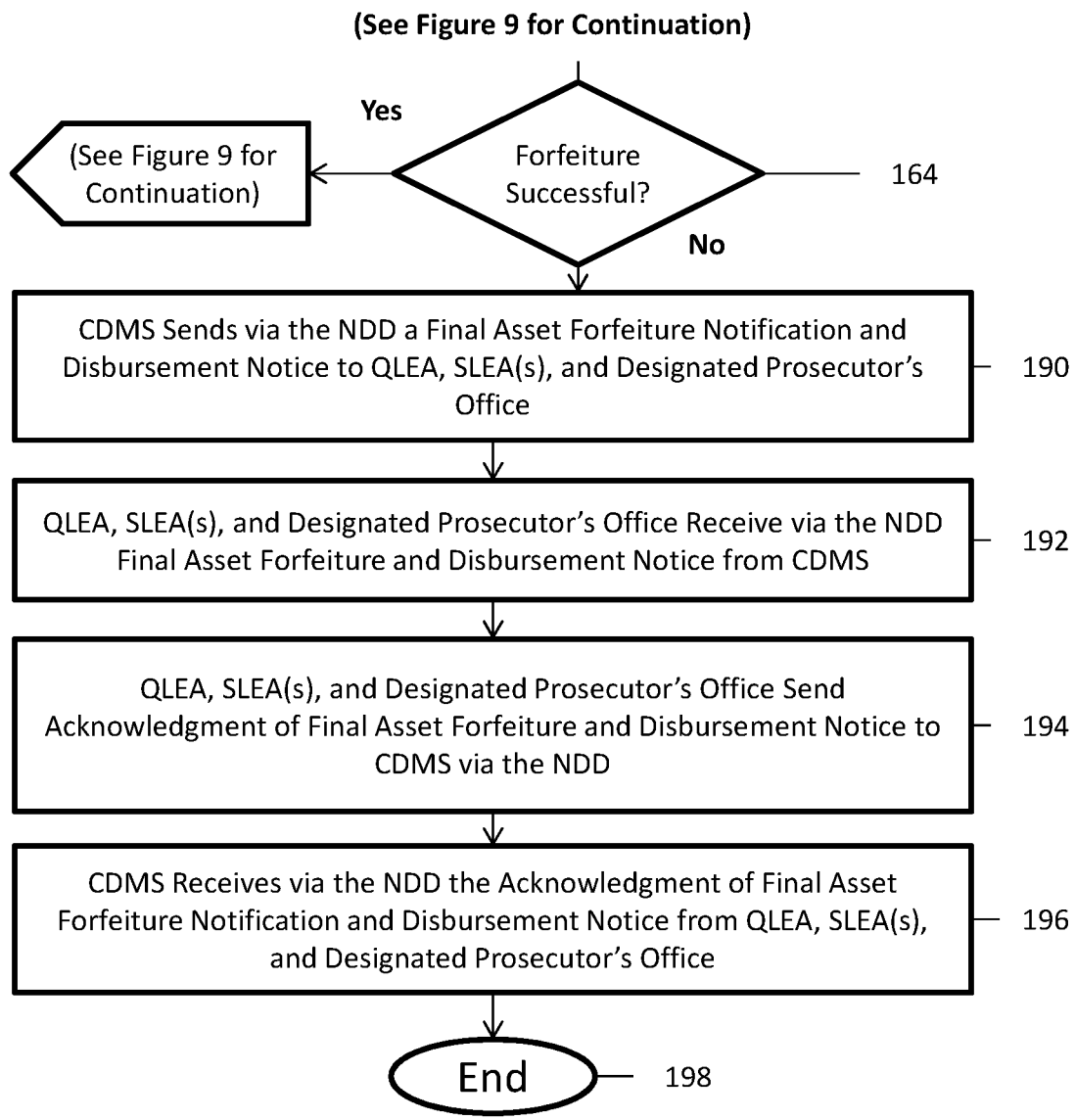
FIG. 12 is a continuation of the flowchart of FIG. 9, which illustrates additional steps of the exemplary subject query and retrieval processes, according to an embodiment of the present invention.

In a second variation of the second exemplary scenario, the asset forfeiture is unsuccessful at decision block 164, FIG. 9. Referring now to step 190, FIG. 12, the CDMS 14 sends via the NDD 24 a Final Asset Forfeiture Notification and Disbursement Notice to the QLEA, SLEA(s), and DPO. The Final Asset Forfeiture notification and Disbursement notice notifies the QLEA, SLEA(s), and confirms with the DPO that the asset forfeiture was unsuccessful. In a preferred embodiment of the invention, the Final Asset Forfeiture Notification and Disbursement Notice for an unsuccessful asset forfeiture would include the following information: (1) asset forfeiture was unsuccessful, (2) no asset forfeiture proceeds are pending disbursement, and (3) the unique transaction number of the subject query which resulted in the seizure. At step 192, the QLEA, SLEA(S), and DPO receive via the NDD 24 the Final Asset Forfeiture Notification and Disbursement Notice from the CDMS 14. Thereafter, in step 194, the QLEA, SLEA(s), and DPO send via the NDD 24 an Acknowledgement of Final Asset Forfeiture and Disbursement Notice to the CDMS 14. After the CDMS 14 receives via the NDD 24 the Acknowledgement of Final Asset Forfeiture and Disbursement Notices from the QLEA, SLEA(s), and DPO, at step 196, the process for this second variation of the second exemplary scenario involving an unsuccessful asset forfeiture concludes at step 198.

Referring again to FIG. 9, if, at decision block 164, the asset forfeiture was successful, the process continues at step 166, FIG. 9, where the CDMS 14 determines if the DPO is an automated participant or a manual participant in the asset forfeiture proceeds disbursement process. If the DPO is determined to be an automated participant at decision block 166, FIG. 9, the process continues in FIG. 10, step 168, where the CDMS 14 sends a "Final Asset Forfeiture" notification and "Disbursement" notice via the NDD 24 to the QLEA, SLEA(s), and DPO. In a preferred embodiment of the invention, when an asset forfeiture is successful the "Final Asset Forfeiture" notification and "Disbursement" notice notifies the QLEA, SLEA(s), and DPO of the details of the pending asset forfeiture proceeds disbursement transaction and includes the following information: (1) total disbursement amounts for each agency involved in the seizure/asset forfeiture process (disbursement percentages are determined in accordance with those established in each agency's CDMS user agreement/contract), (2) the bank routing information and AFF account number for each recipient agency, and (3) the unique transaction number of the subject query which resulted in the seizure. At step 170, the QLEA, SLEA(s), and DPO receive the "Final Asset Forfeiture" notification and "Disbursement" notice from the CDMS 14 via the NDD 24. At step 172, the QLEA, SLEA(s), and DPO send via the NDD 24 acknowledgement of "Final Asset Forfeiture" notifications and "Disbursement" notices to the CDMS 14. The acknowledgement of "Final Asset Forfeiture" notification and "Disbursement" notice serves to provide the CDMS 14 with the QLEA's, SLEA(s)'s, and DPO's concurrence with the disbursement amounts detailed in the "Final Asset Forfeiture" notification and "Disbursement" notice sent by the CDMS 14 in step 168. After receiving the acknowledgement of "Final Asset Forfeiture" notifications and "Disbursement" notice from the QLEA, SLEA(s), and DPO at step 174, the CDMS 14 next schedules and facilitates the disbursement of the asset forfeiture proceeds, at step 176, to the QLEA's, SLEA's, and DPO's asset forfeiture fund ("AFF") bank accounts, transferring those proceeds via electronic funds transfer ("EFT") at step 178, FIG. 11. Upon completion of the EFT, at step 180, the CDMS 14 sends via the NDD 24 a "Disbursement Completed" notification to the QLEA, SLEA(s), and DPO. The QLEA, SLEA(s), and DPO receive via the NDD 24 the "Disbursement Completed" notification from the CDMS 14 in step 182 and, thereafter, send via the NDD 24 the acknowledgement of "Disbursement Completed" notifications, confirming their receipt of the EFT, to the CDMS 14 at step 184. At step 186, the CDMS 14 receives via the NDD 24 the acknowledgement of "Disbursement Completed" notification from the QLEA, SLEA(s), and DPO.

Figure 13:
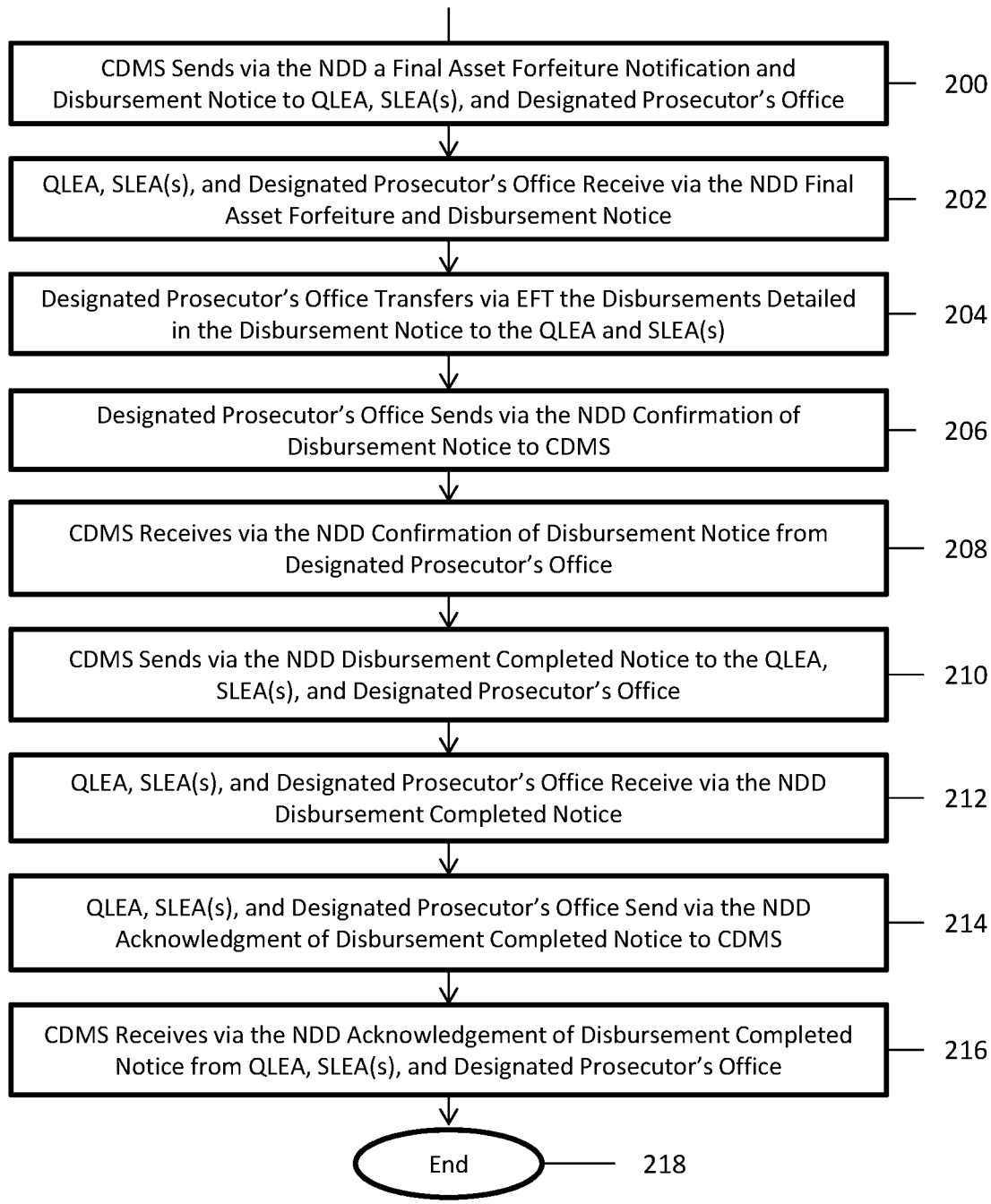
FIG. 13 is a continuation of the flowchart of FIG. 9, which illustrates additional steps of the exemplary subject query and retrieval processes, according to an embodiment of the present invention.

If, at step 166, FIG. 9, the DPO was determined by the CDMS 14 to be a manual participant in the asset forfeiture proceeds disbursement process, the process continues in FIG. 13, at step 200, where the CDMS 14 sends a "Final Asset Forfeiture Notification and Disbursement Notice" via the NDD 24 to the QLEA, SLEA(s), and DPO. In a preferred embodiment of the invention, the "Final Asset Forfeiture Notification and Disbursement Notice" notifies the QLEA, SLEA(s), and DPO of the details of the pending asset forfeiture proceeds disbursement transaction and directs the DPO to disburse the proceeds of the asset forfeiture from its AFF account to the recipient agencies, and it includes the following information: (1) total disbursement amounts for each agency involved in the seizure/asset forfeiture process (disbursement percentages are determined in accordance with those established in each agency's CDMS user agreement/contract), (2) the bank routing information and AFF account number for each recipient agency, and (3) the unique transaction number of the subject query which resulted in the seizure. At step 202, the QLEA, SLEA(s), and DPO receive via the NDD 24 the "Final Asset Forfeiture Notification and Disbursement Notice" from the CDMS 14. At step 204, the DPO transfers via EFT the disbursements detailed in the "Final Asset Forfeiture Notification and Disbursement Notice" to the QLEA and SLEA(s). After the EFT transfer of the asset forfeiture proceeds to the QLEA and SLEA(s) is completed at step 204, the DPO sends via the NDD 24 a Confirmation of "Disbursement" notice to the CDMS 14. The CDMS 14 receives via the NDD 24 the Confirmation of "Disbursement" notice from the DPO at step 208 and subsequently sends a "Disbursement Completed" notice via the NDD 24 to the QLEA, SLEA(s), and DPO at step 210. The QLEA, SLEA(s), and DPO receive the "Disbursement Completed" notice from the CDMS 14 at step 212 and at step 214, send via the NDD 24 an acknowledgement of "Disbursement Completed" notice to the CDMS 14. After the CDMS 14 receives via the NDD 24 the acknowledgement of "Disbursement Completed" notice from the QLEA, SLEA(s), and DPO at step 186, FIG. 11, for an automated participant or at step 216, FIG. 13 for a manual participant, the process associated with second exemplary scenario is concluded at step 188, FIG. 11, or step 218, FIG. 13, respectively.

Figure 36:
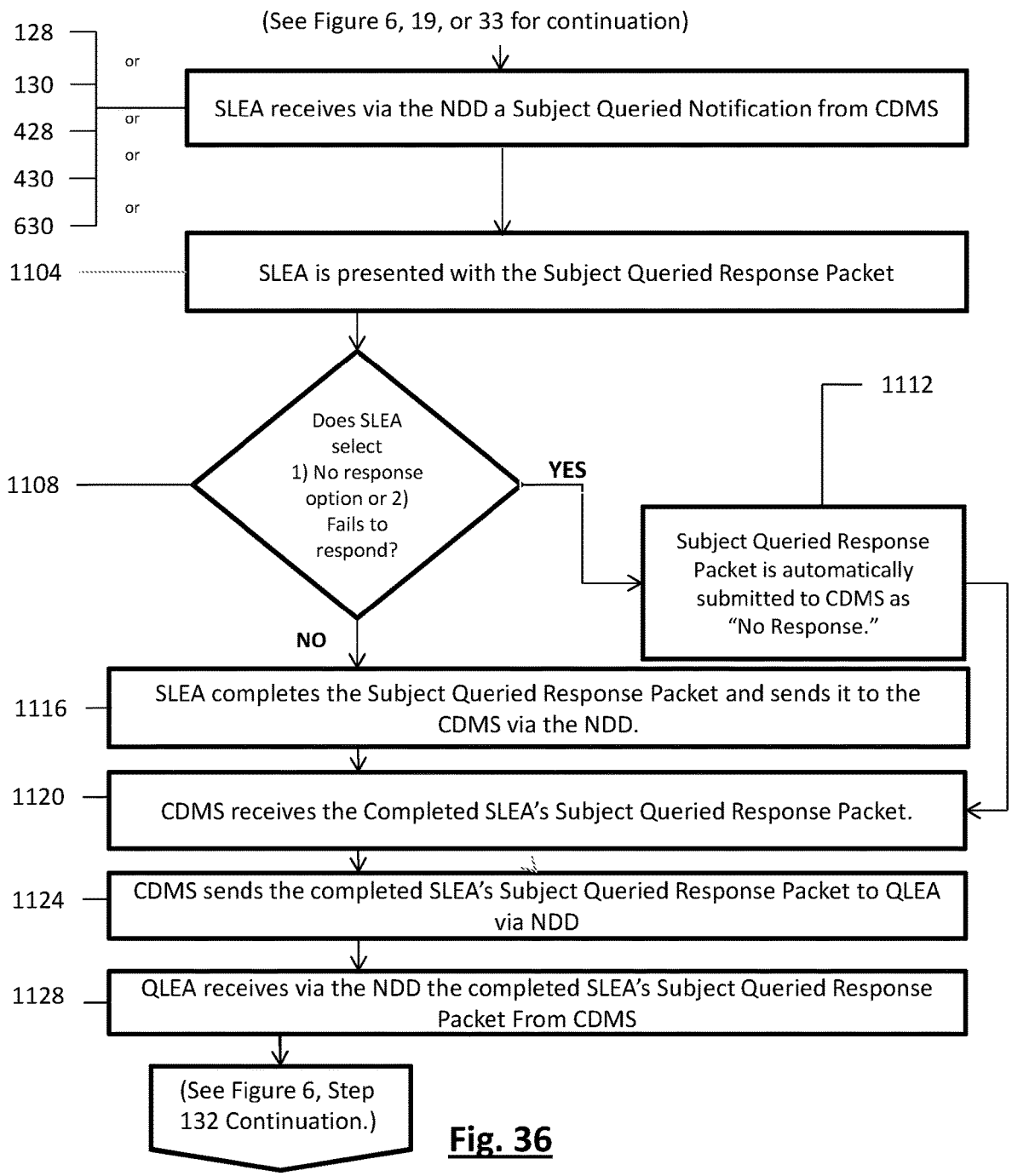
FIG. 36 is a flowchart illustrating an exemplary process for the issuance, completion, transmission, and delivery of a subject queried response packet carried out by the system of FIG. 1, according to an embodiment of the present invention.

In a third exemplary scenario, a QLEA subject query of the CDMS 14 results in a "Suspected" classification status confirmation response only. Referring to FIGS. 3 and 5, the process commences at step 100, and steps 102, 104, 106, and the outcome of decision block 108 are the same as that described above for the second exemplary scenario. However, the third exemplary scenario differs from the second exemplary scenario starting at decision block 110. In the third exemplary scenario, unlike the second exemplary scenario, at step 110, the status classification of the subject is "Suspected". Thereafter, steps 116, 120, 124, 128, and 132, FIG. 6, and steps 1104, 1108, 1112, 1116, 1120, 1124, and 1128, FIG. 36, are the same as the first variation of the second exemplary scenario above; however, at decision block 134, FIG. 6, no seizure is made. Consequently, continuing on FIG. 7, step 138, the QLEA sends via the NDD 24 the CDMS 14 an acknowledgment of receipt of the "Suspected" confirmation response and "Non-Seizure" notice. Because the QLEA's investigation did not result in a seizure in this third exemplary scenario, the QLEA's acknowledgement of receipt of the "Suspected" confirmation response and "Non-Seizure" notice would provide the following information: (1) no seizure was accomplished, (2) the QLEA's report number(s) documenting the results of its investigation, and (3) the unique transaction number of the QLEA's subject query. In step 140, the CDMS 14 receives via the NDD 24 the QLEA's acknowledgement of receipt of "Suspected" confirmation response and "Non-Seizure" notice indicating a seizure was not made. Then, in step 142, the CDMS 14 sends via the NDD 24 a "Non-Seizure" notice to the SLEA(s). In a preferred embodiment of the invention, the "Non-Seizure" notice includes the following information: (1) no seizure was accomplished, (2) the QLEA's report number(s) documenting the results of its investigation, (3) the unique transaction number assigned to the QLEA's subject query, and (4) the unique transaction number assigned to the SLEA(s)'s original subject packet input. Thereafter, the process associated with the third exemplary scenario is concluded at step 144.

In FIGS. 18-26, which comprises flowcharts for an exemplary terrorist subject query and retrieval processes carried out by the system of FIG. 3, it is to be understood that steps 400-518 of FIGS. 18-26 are analogous to steps 100-218 described above, except that they are specific to the terrorist application of the system. For example, steps 100, 102, and 104 of FIG. 5 are analogous to steps 400, 402, and 404 of FIG. 18, etc.

4. Exemplary Subject Packet Input Processes

Figure 14:
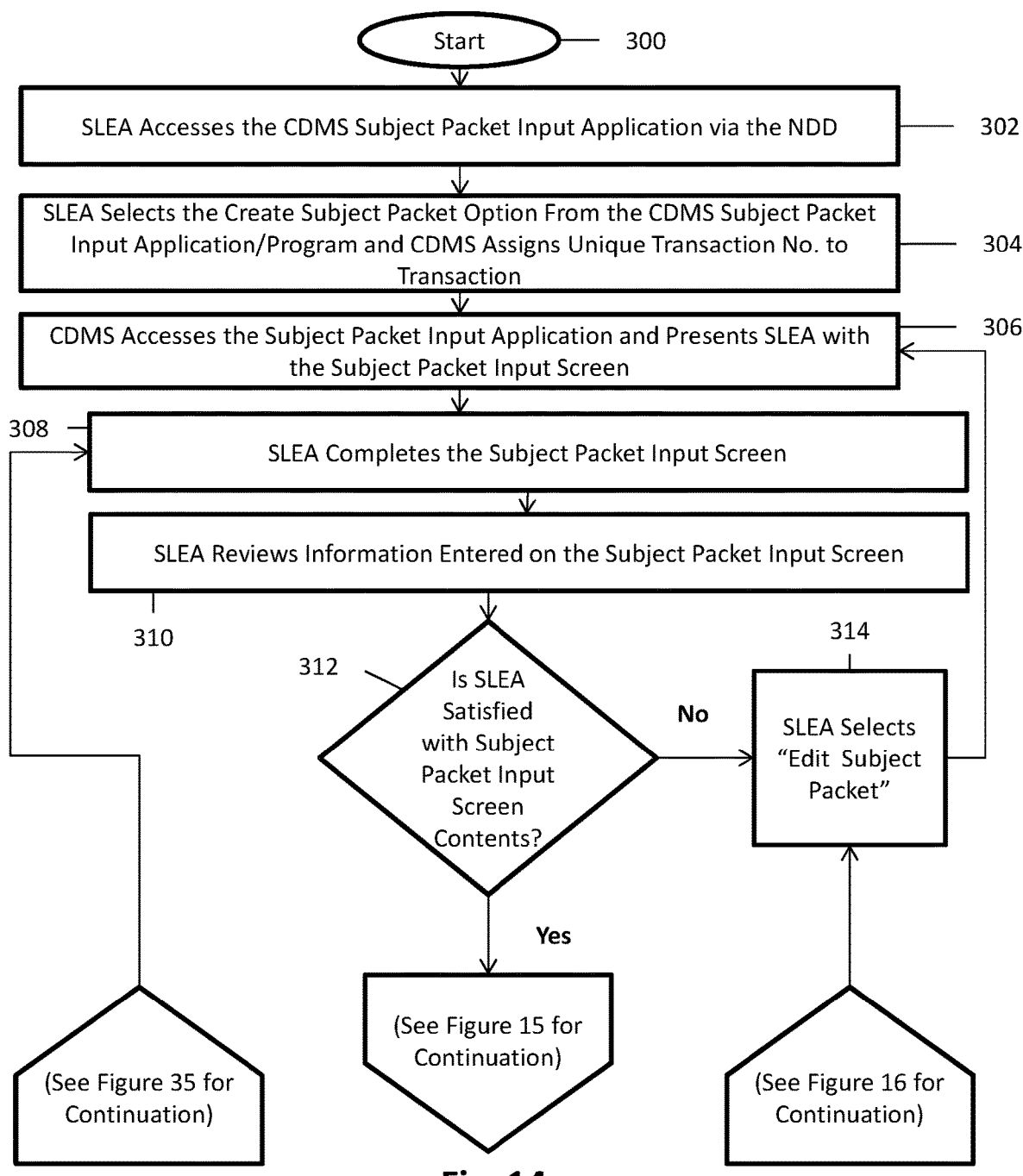
FIG. 14 is a partial flowchart illustrating an exemplary subject packet input processes for submitting subject packets into the system of FIG. 2 and detailed in FIGS. 14-17, according to an embodiment of the present invention.
Figure 15:
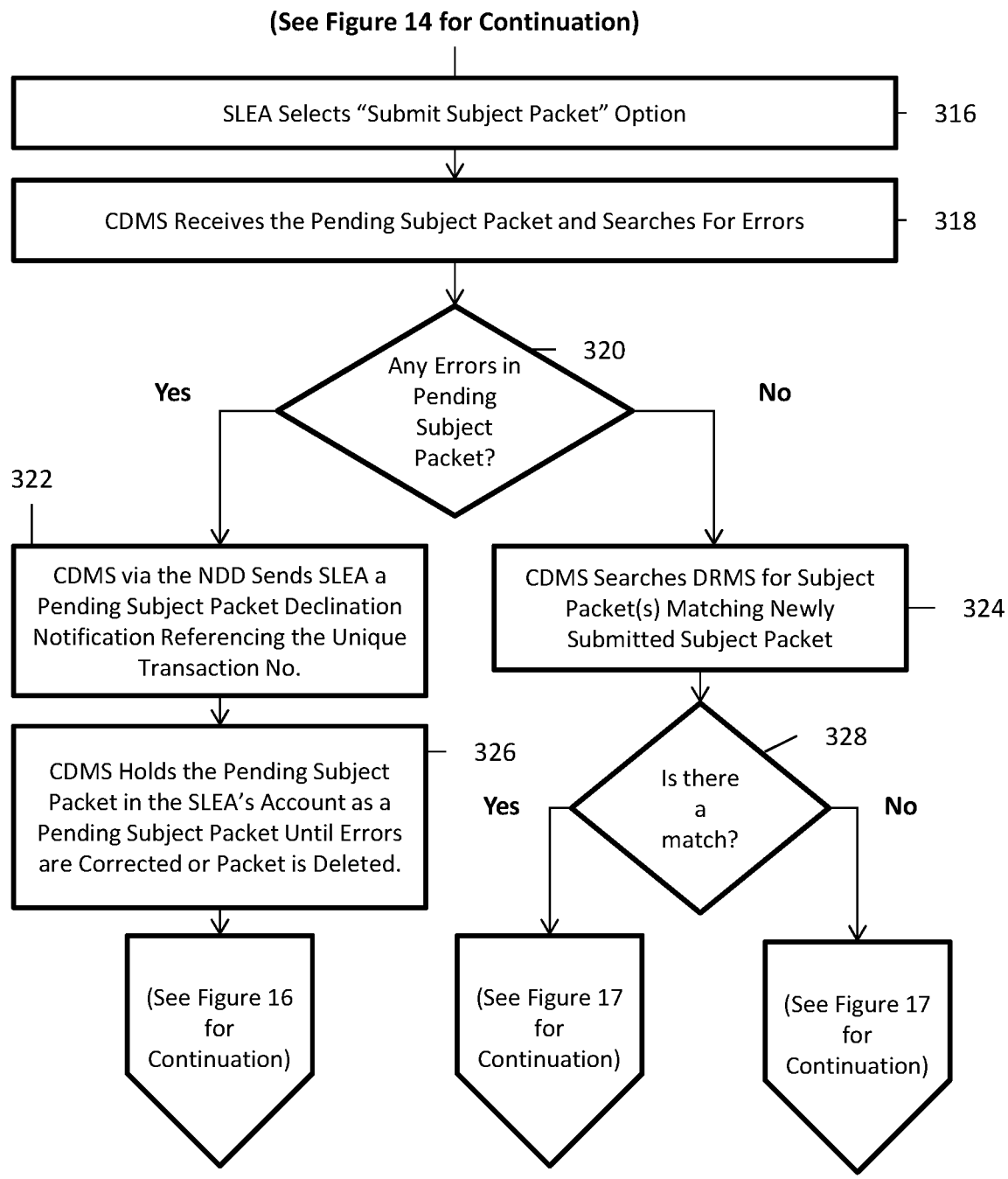
FIG. 15 is a continuation of the flowchart of FIG. 14, which illustrates additional steps of the exemplary subject packet input processes, according to an embodiment of the present invention.
Figure 16:
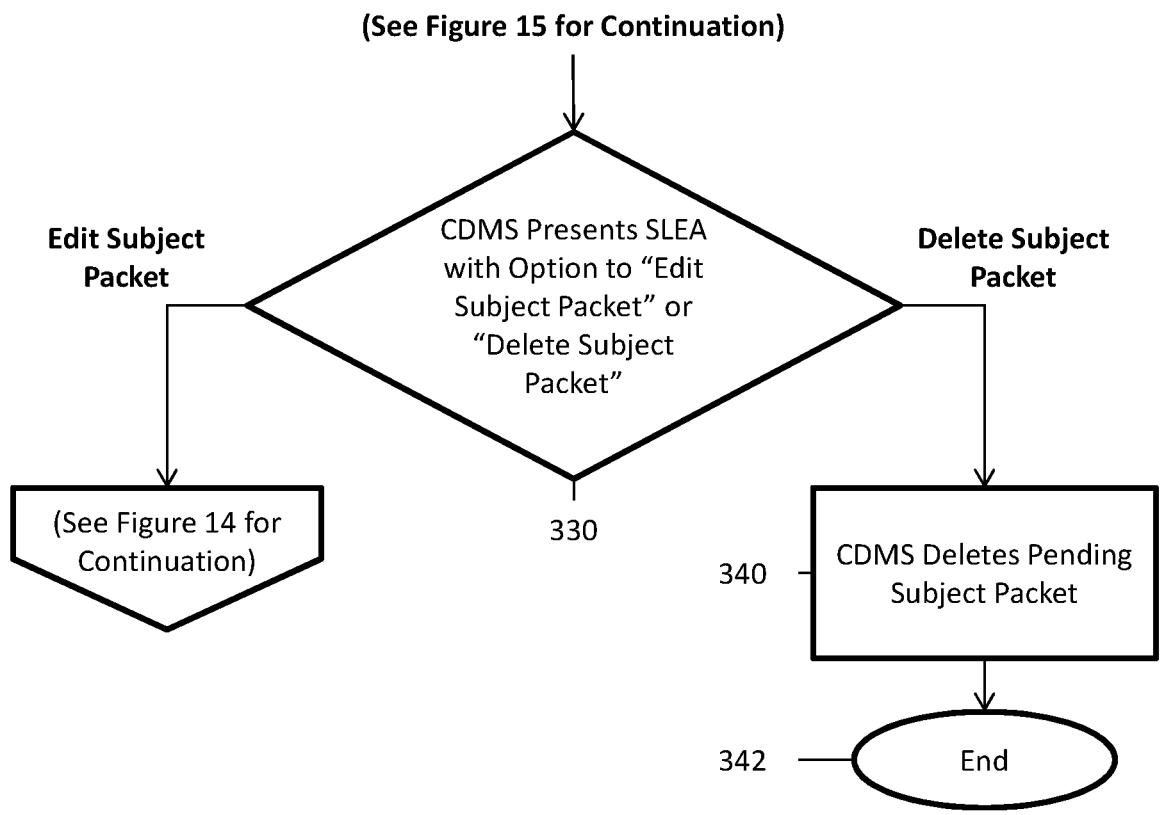
FIG. 16 is a continuation of the flowchart of FIG. 15, which illustrates additional steps of the exemplary subject packet input processes, according to an embodiment of the present invention.
Figure 17:
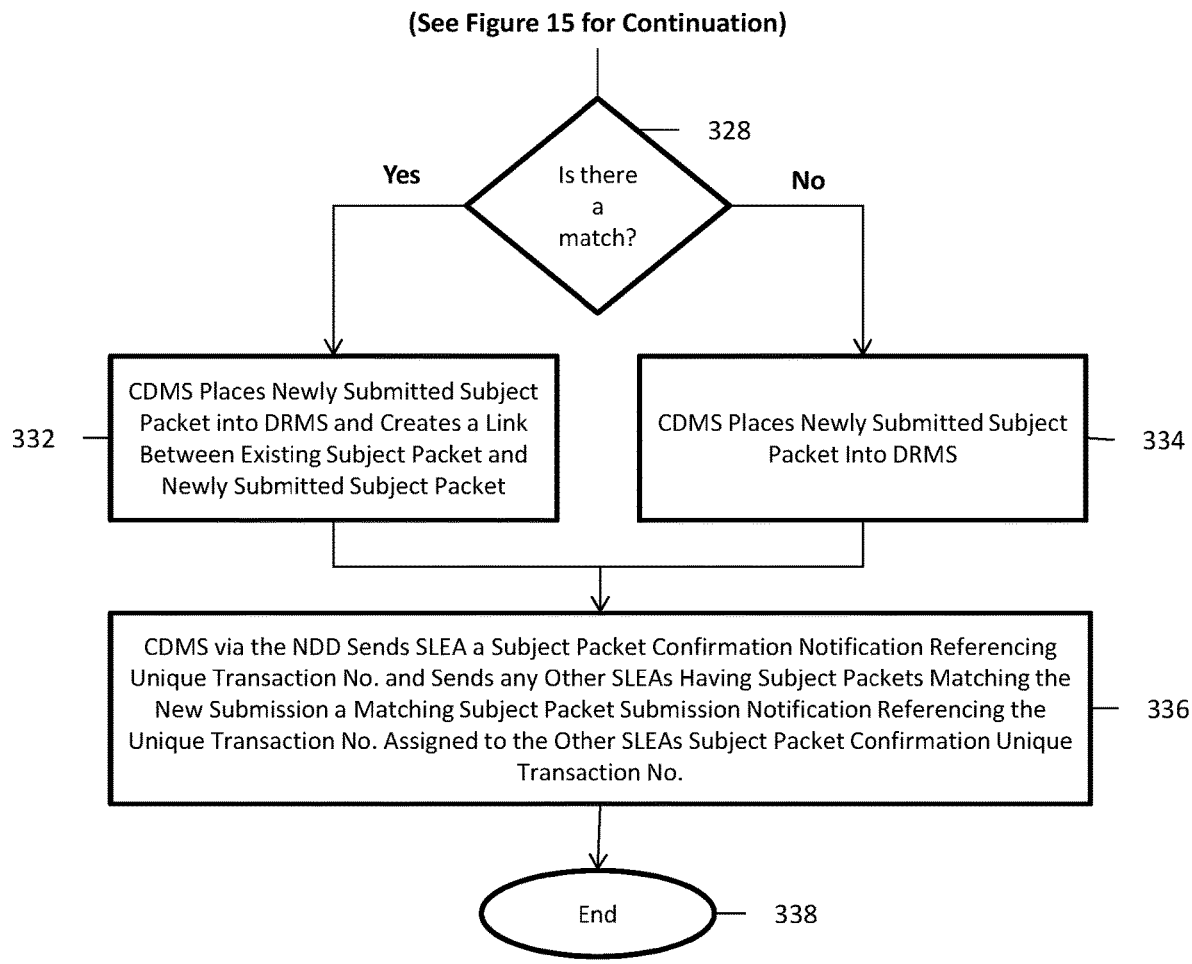
FIG. 17 is a continuation of the flowchart of FIG. 15, which illustrates additional steps of the exemplary subject packet input processes, according to an embodiment of the present invention.
Figure 18:
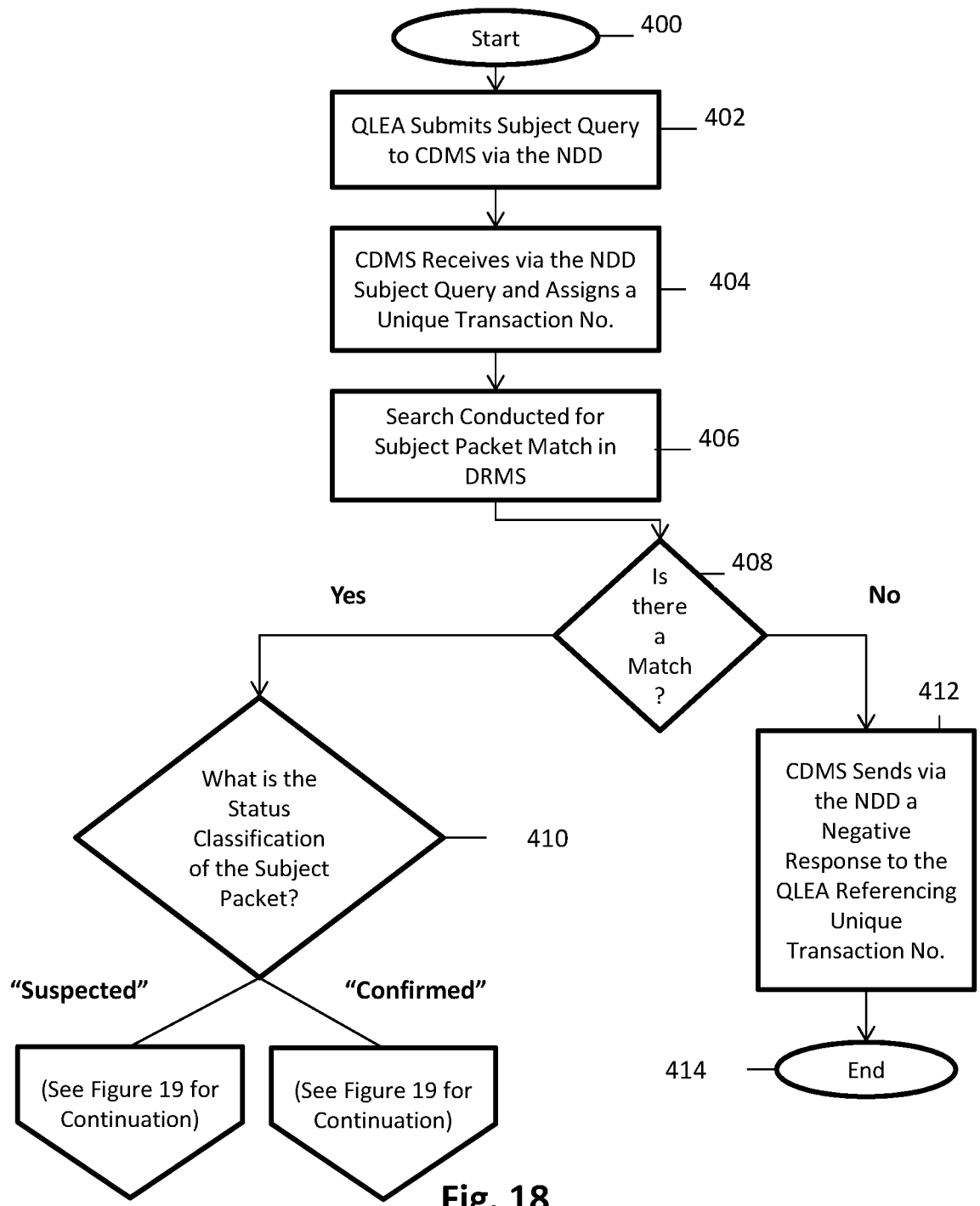
FIG. 18 is a partial flowchart illustrating an exemplary terrorist subject query and retrieval processes carried out by the system of FIG. 3 and detailed in FIGS. 18-26, according to an embodiment of the present invention.
Figure 19:
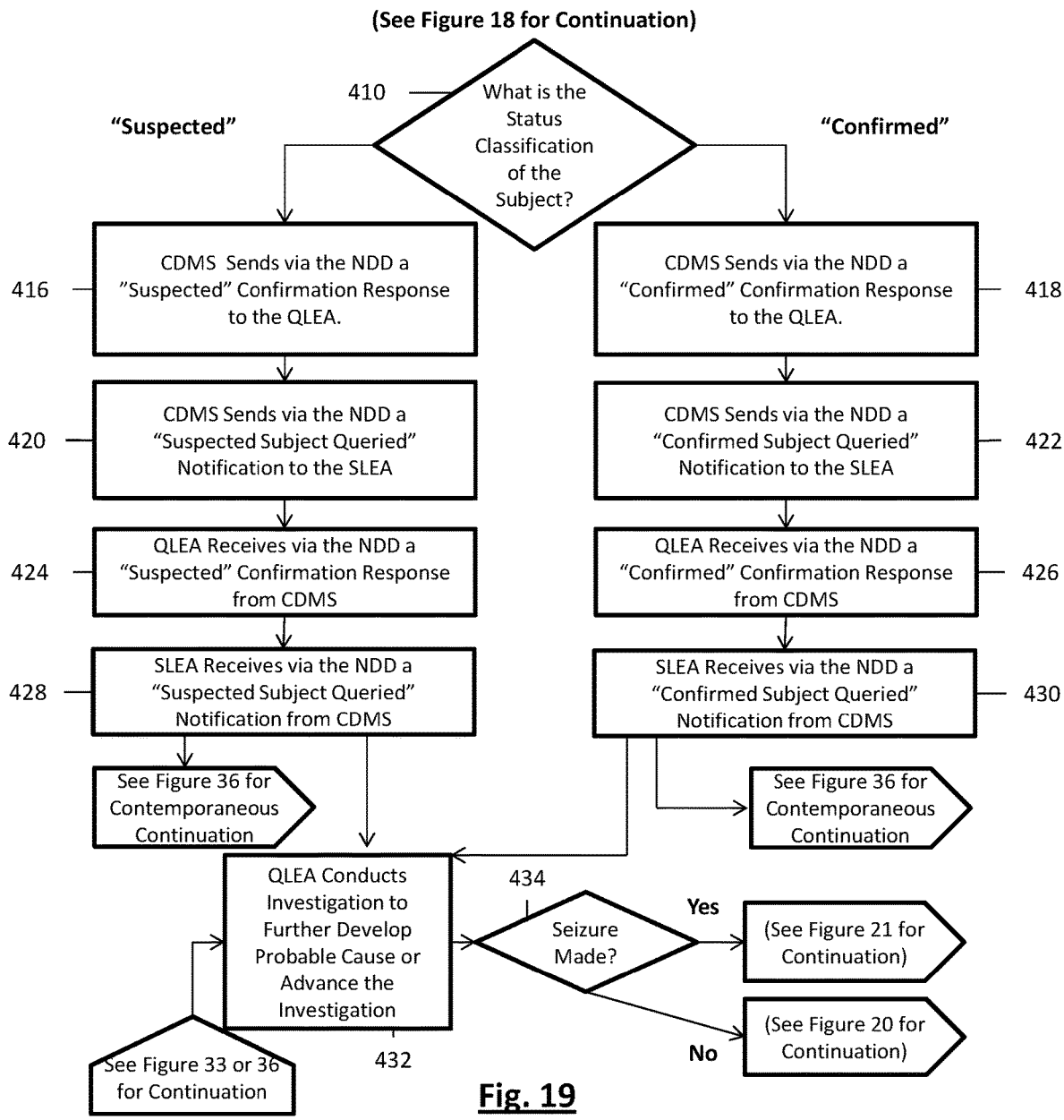
FIG. 19 is a continuation of the flowchart of FIG. 18, which illustrates additional steps of the exemplary terrorist subject query and retrieval processes, according to an embodiment of the present invention.
Figure 20:
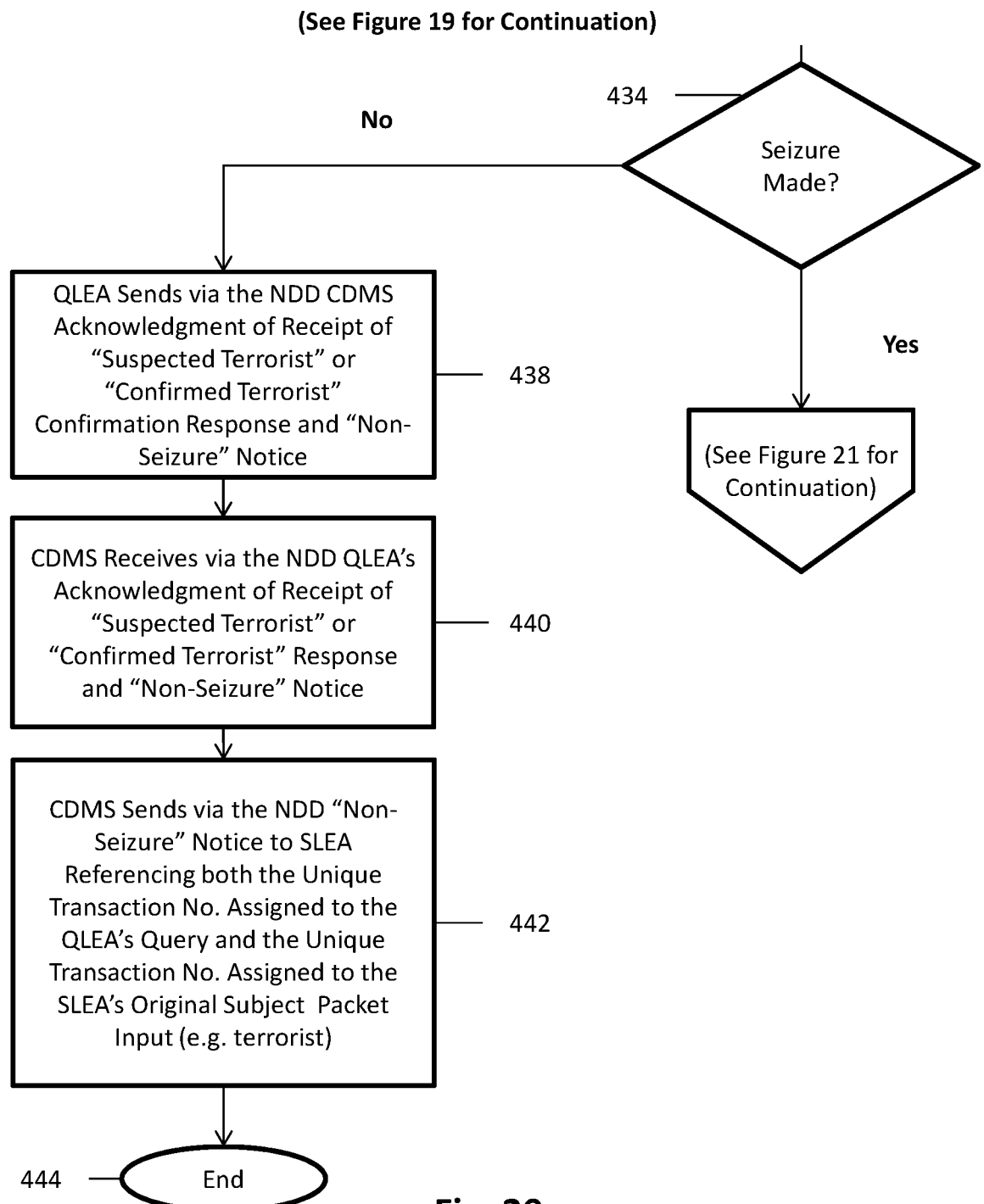
FIG. 20 is a continuation of the flowchart of FIG. 19, which illustrates additional steps of the exemplary terrorist subject query and retrieval processes, according to an embodiment of the present invention.
Figure 21:
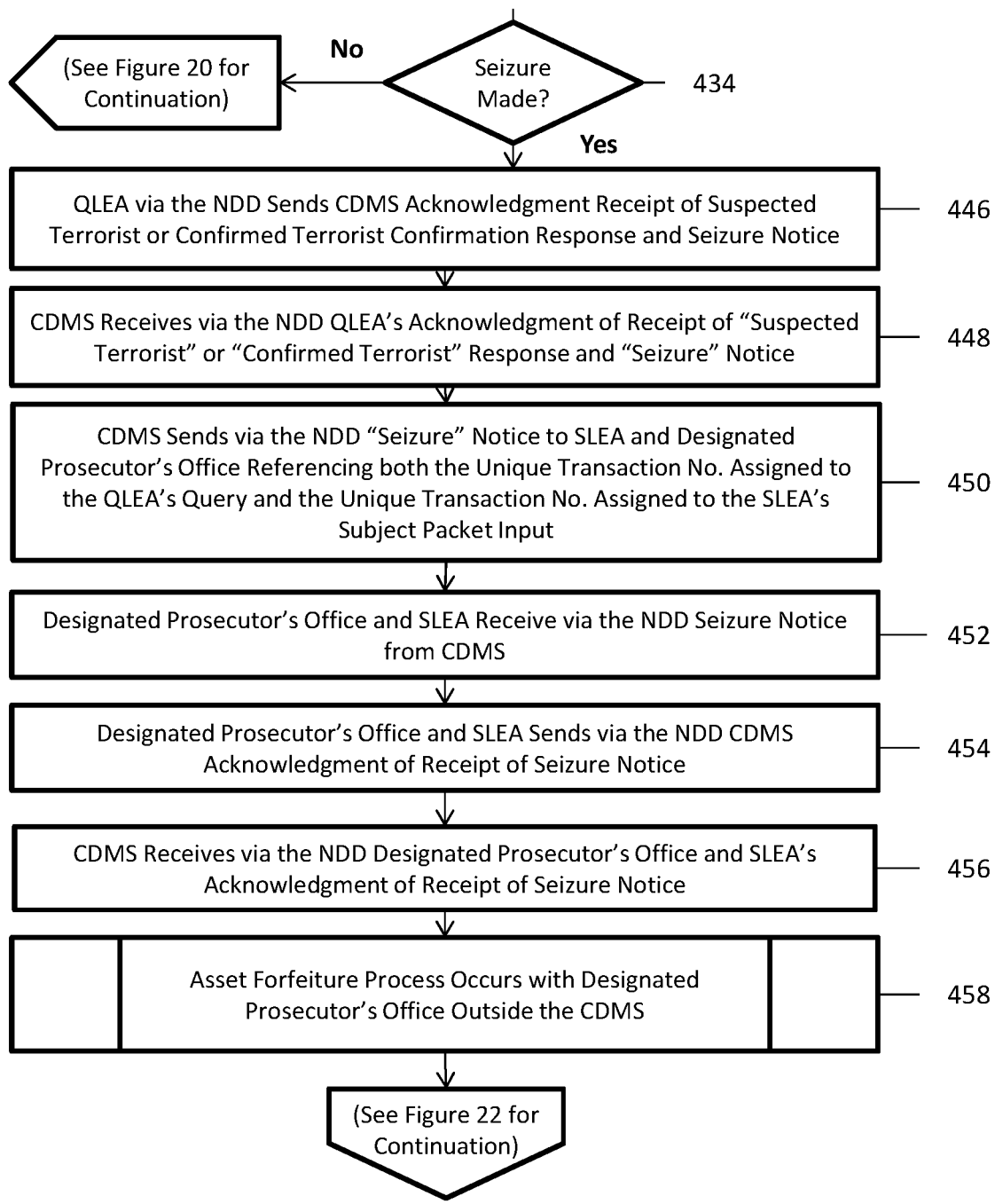
FIG. 21 is a continuation of the flowchart of FIGS. 19 and 20, which illustrates additional steps of the exemplary terrorist subject query and retrieval processes, according to an embodiment of the present invention.
Figure 22:
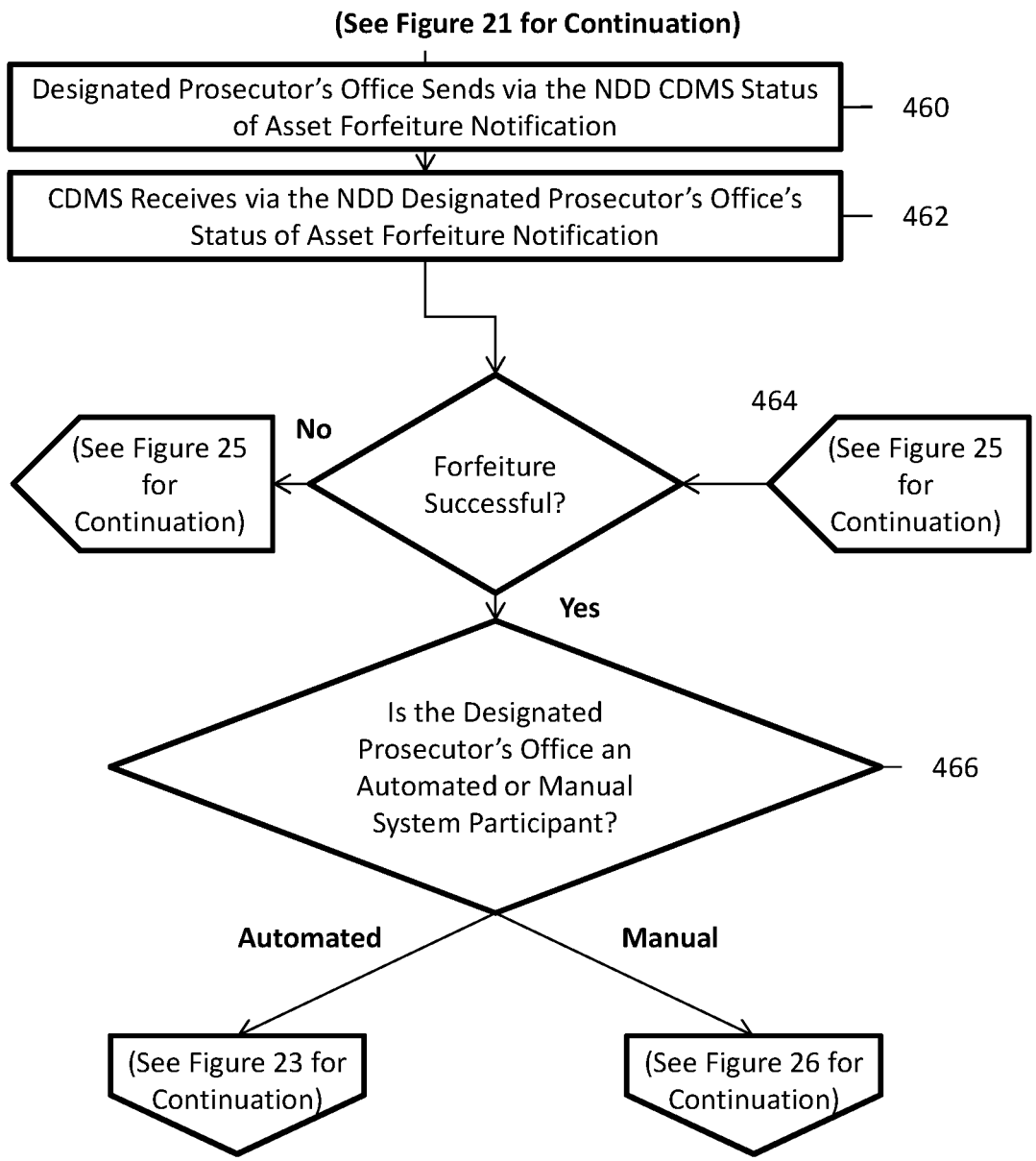
FIG. 22 is a continuation of the flowchart of FIG. 21, which illustrates additional steps of the exemplary terrorist subject query and retrieval processes, according to an embodiment of the present invention.
Figure 23:
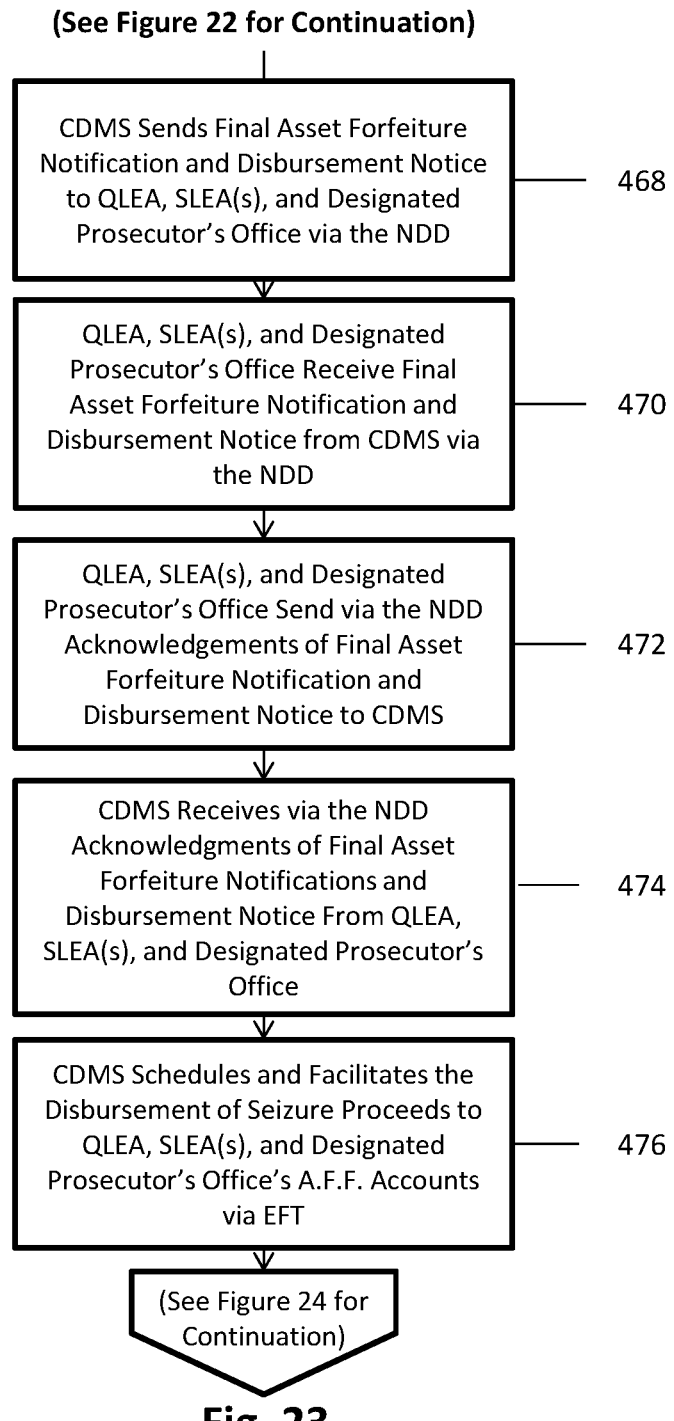
FIG. 23 is a continuation of the flowchart of FIG. 22, which illustrates additional steps of the exemplary terrorist subject query and retrieval processes, according to an embodiment of the present invention.
Figure 24:
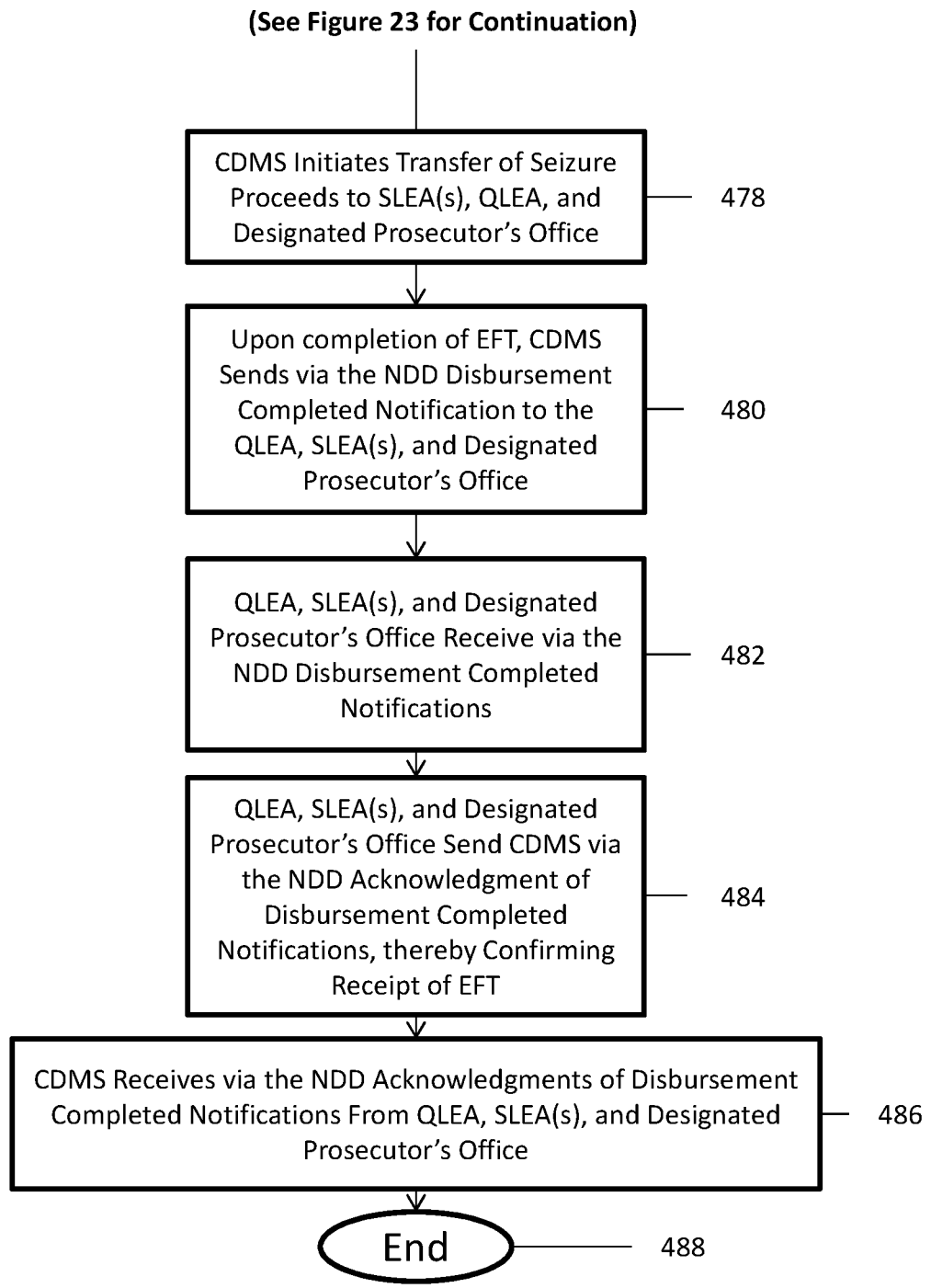
FIG. 24 is a continuation of the flowchart of FIG. 23, which illustrates additional steps of the exemplary terrorist subject query and retrieval processes, according to an embodiment of the present invention.
Figure 25:
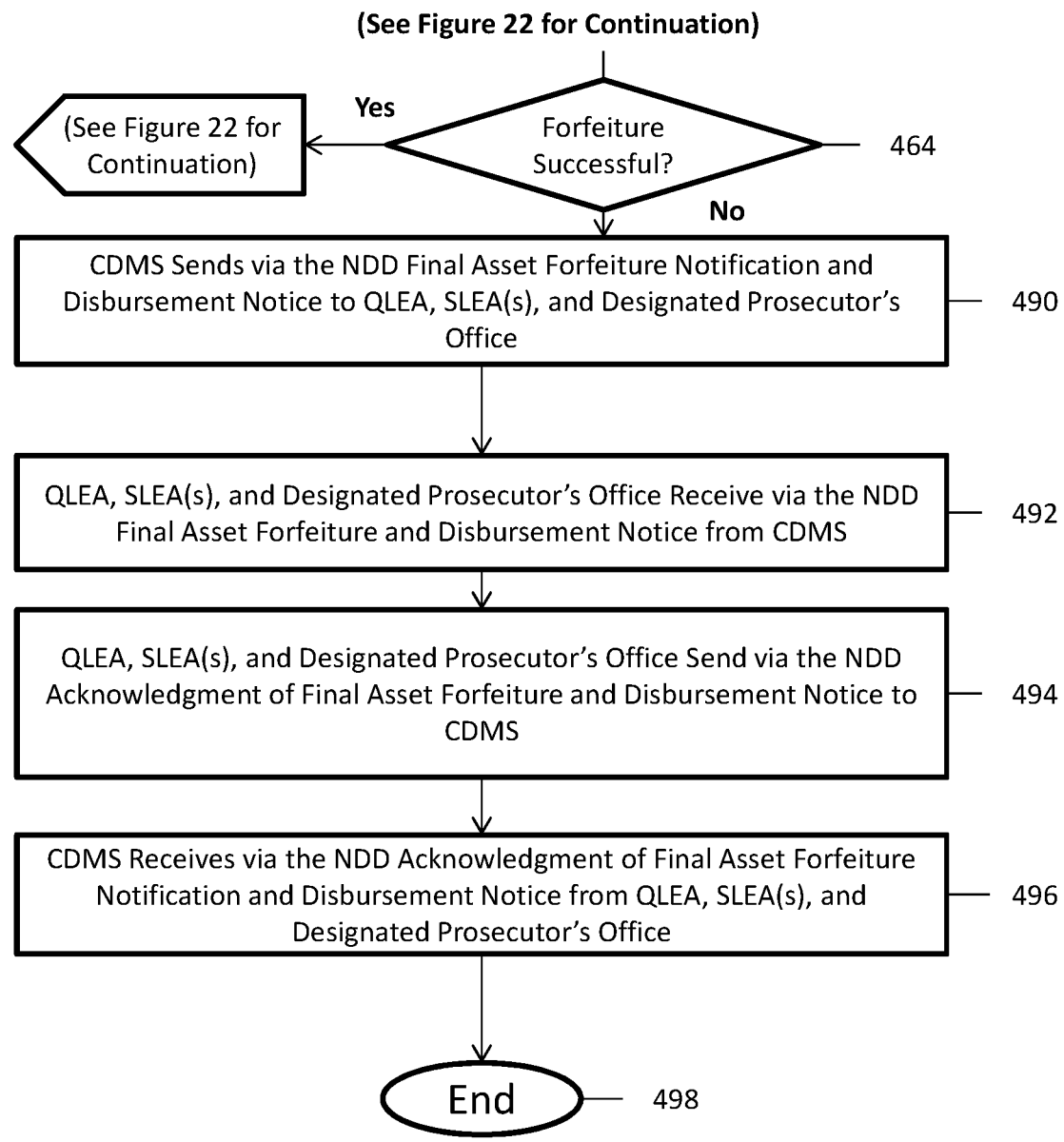
FIG. 25 is a continuation of the flowchart of FIG. 22, which illustrates additional steps of the exemplary terrorist subject query and retrieval processes, according to an embodiment of the present invention.
Figure 26:
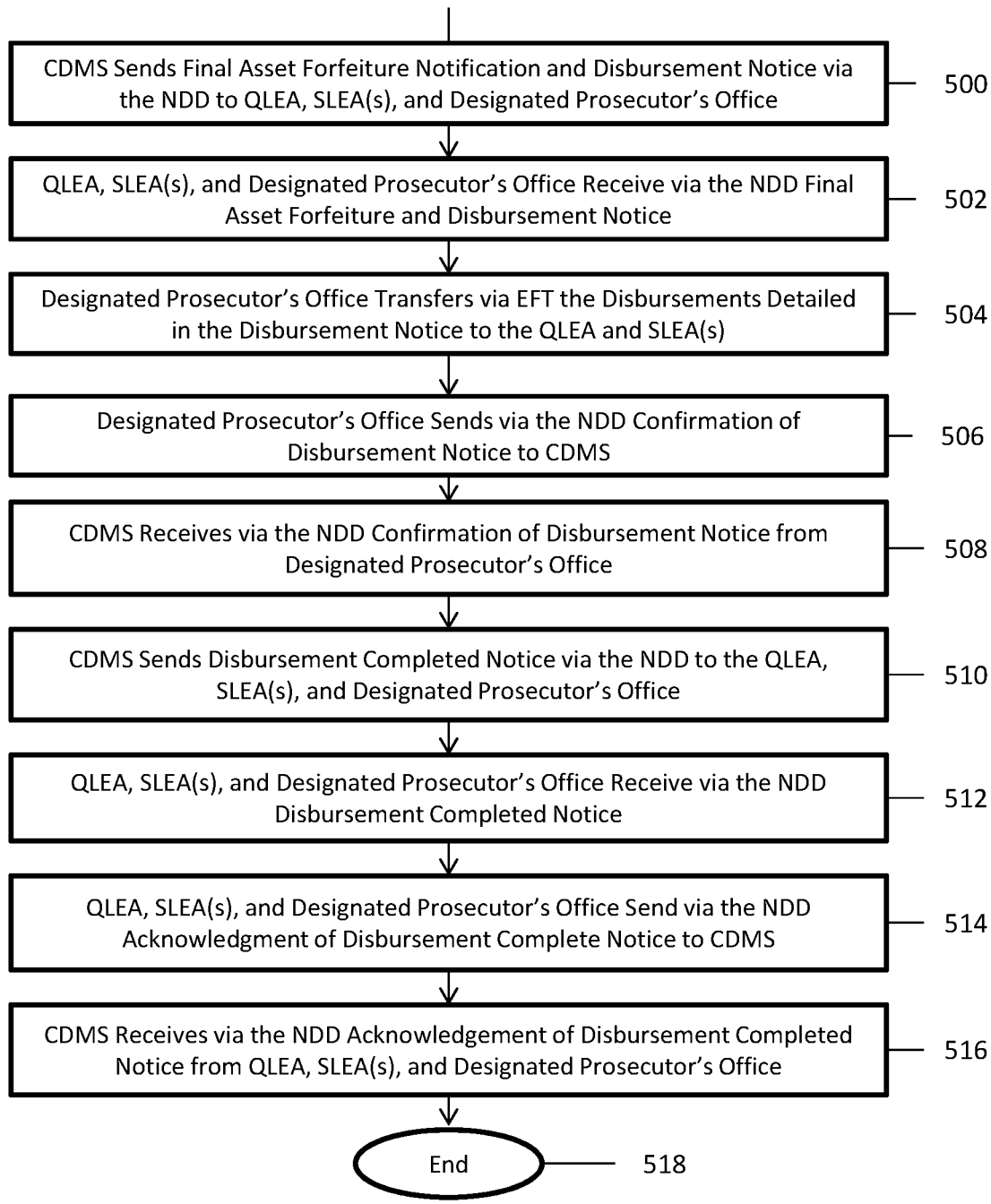
FIG. 26 is a continuation of the flowchart of FIG. 22, which illustrates additional steps of the exemplary terrorist subject query and retrieval processes, according to an embodiment of the present invention.

In accordance with an embodiment of the invention, a flowchart illustrating exemplary subject packet input processes for entering data into the central data management system ("CDMS") 12 is set forth in FIG. 2 and FIGS. 14-17. In a preferred embodiment of the invention, these processes are performed by using the CMDS 12 Subject Packet Input Application 32, Local Digital Computer Subject Packet Input Program 52, Mobile Digital Device Subject Packet Input Application 72, and Data Records Management System ("DRMS") 20, which enable a SLEA to input subject data into the DRMS 20. Referring to FIG. 14, the process commences at step 300, and in step 302, a SLEA accesses the CDMS 12 via the NDD 22. Then, in step 304, the SLEA selects the "Create Subject Packet" option from the CDMS 12 and the CDMS 12 assigns a unique transaction number to the transaction. In subsequent step 306, the CDMS 12 accesses the CDMS 12 Subject Packet Input Application 32 and presents the SLEA with the "Subject Packet" input screen. At step 308, the SLEA completes the entering of all required information into the Subject Packet Input Screen.

In a preferred embodiment of the invention, the Subject Packet Input Screen displays for the SLEA a selection of data fields used to describe the subject. The initial subject field selection is the category of the subject, such as a "Person", "Currency", "Vehicle", "Aircraft", "Marine Vessel", "Address", or "Other" (for a subject that is not properly categorized by any of the listed standard categories). After a subject category is selected, the appropriate descriptive data fields for the selected category are displayed. For example, for the subject category "Person", the Subject Packet Input Application 32 displays descriptive data fields for first name, middle name, last name, alias(es), sex, date of birth, social security number ("SSN"), driver's license number and state of issuance, state identification card and state of issuance, Integrated Automated Fingerprint Identification System ("IAFIS") number, etc. A special descriptive data field is included for persons titled "Health Warnings." The Health Warnings field is used to include legally obtained medical information (such as the medical files of a formerly arrested or incarcerated subject) concerning a subject's medical condition which would present an immediate health hazard to law enforcement officers, such as Hepatitis C, AIDS, Tuberculosis, etc. For the subject category "Vehicle," the Subject Packet Input Application 32 displays fields for make, model, year, license plate number and state of issuance, vehicle identification number ("VIN"), color, and other descriptors, etc. For the subject category "Address," the Subject Packet Input Application 32 displays fields for numerical address, street name, unit or apartment number, city, state, zip code, and other descriptors, etc. A photograph of any subject can be submitted as descriptive data. The mandatory minimum number of descriptive data fields to be completed for each subject category will be established by the CDMS administrator. In a preferred embodiment, a minimum number of descriptive data fields are required to be completed for a selected subject category before the Subject Packet Input Application 32 will allow the SLEA user to proceed to the next step in the process. After the SLEA enters the available information into the descriptive data fields, the Subject Packet Input Application 32 displays the subject field selections for the status classification of the subject packet. In a preferred embodiment, status classifications are either "Confirmed" or "Suspected." The status classification of a subject packet submitted for inclusion in the CDMS 12 is selected by the SLEA and is based on the SLEA's application of the stipulative definition of "Confirmed" or "Suspected" characterizing the quantity and quality of information it possesses concerning a respective subject. A "Confirmed" status classification denotes a higher standard of evidentiary support than a "Suspected" status classification. After the SLEA enters all of the descriptive data for its subject, the Subject Packet Input Application 32 displays all the information entered for the subject packet created by the SLEA.

In step 310, the SLEA reviews the information that was entered into the Subject Packet input screen and decides whether it is satisfied with the Subject Packet Input at decision block 312. If at decision block 312 the SLEA is not satisfied with the descriptive data entered into the Subject Packet Input Screen, it can select the "Edit Subject Packet" option in step 314, where the process returns the SLEA to step 306 to make any desired changes to the descriptive data. Conversely, if the SLEA is satisfied at step 312 with the descriptive data entered into the Subject Packet Input Screen, the SLEA can select the "Submit Subject Packet" option at step 316, FIG. 15, to submit the pending subject packet to the CDMS 12. When the "Submit Subject Packet" option is selected by the SLEA, the CDMS Subject Packet Input Application 32 receives the pending subject packet at step 318 and searches the pending subject packet for error (s). If one or more errors are identified by the CDMS 12 in the pending subject packet at decision block 320, the CDMS 12 denies the pending subject packet and sends via the NDD 22, a "Subject Packet Declination" notification to the SLEA at step 322 which identifies the error(s) resulting in the declination and references the unique transaction number assigned to the pending subject packet at step 304, FIG. 14. At step 326, the CDMS 12 holds the pending subject packet in the SLEA's account until the SLEA corrects the identified error(s) or the pending subject packet is deleted by the SLEA. In decision block 330, FIG. 16, the SLEA must decide whether to delete the pending subject packet or to correct the errors in the pending subject packet. If the SLEA elects to "Delete" the pending subject packet, the CDMS 12 deletes the pending subject packet from the DRMS 20 at step 340 and the subject packet input process is concluded at step 342, FIG. 16. However, if the SLEA, at decision block 330, FIG. 16, selects the "EDIT Subject Packet" option, the process returns to step 306, FIG. 14, where the SLEA is again presented with the Subject Packet Input screen where it corrects the identified errors in the pending subject packet. The process then proceeds as before through steps 308, 310, 312, and 316 in FIGS. 14 and 15. Then, at step 318, the CDMS 12 receives the corrected pending subject packet and again searches for any errors. At step 320, if the CDMS 12 still finds an error in the pending subject packet, then the process repeats beginning at step 322, wherein the CDMS 12 sends another "Subject Packet Declination" notification to the SLEA identifying the error(s) in the pending subject packet. This edit, review, and submit process continues until the pending subject packet is either submitted without errors or the SLEA deletes the pending subject packet.

However, if at decision block 320 the CDMS 12 finds no errors in the pending subject packet, the process continues at step 324 where the CDMS 12 searches the DRMS 20 for any subject packets matching the pending subject packet. At decision block 328, the CDMS 12 determines if there is a match between the pending subject packet and one of the existing subject packets in the DRMS 20. If no match is identified in decision block 328, the CDMS 12 places the pending subject packet into the DRMS 20 as a newly submitted subject packet at step 334, FIG. 17. Conversely, if a match with an existing subject packet(s) is identified at decision block 328, the CDMS 12 will create a link within the DRMS 20 between the matched subject packet(s) and the pending subject packet at step 332 and then the CDMS 12 places the pending subject packet in the DRMS 20 as a newly submitted subject packet.

In step 336, the CDMS 12 sends via the NDD 22 a "Subject Packet Confirmation" notification to the SLEA and any other SLEA(s) who have subject packets matching the newly submitted subject packet, thereby confirming the acceptance of the new subject packet by the CDMS 12 in the DRMS 20. In a preferred embodiment of the invention, a "Subject Packet Confirmation" notification includes the following information: (1) the subject packet is accepted, (2) the status classification of the new subject packet, (3) date of acceptance, (4) the name(s) and contact information for any SLEA(s) who has a subject packet(s) linked in the DRMS 20 with the newly submitted subject packet, (5) the unique transaction number(s) of the matching subject packet(s), (6) the status classification of any matched subject packets, and (7) the unique transaction number of the newly submitted subject packet. Thereafter, the processes associated with the exemplary subject packet input processes are concluded at step 338.

5. Exemplary Data Query and Retrieval for Paper Currency Processes

Figure 32:
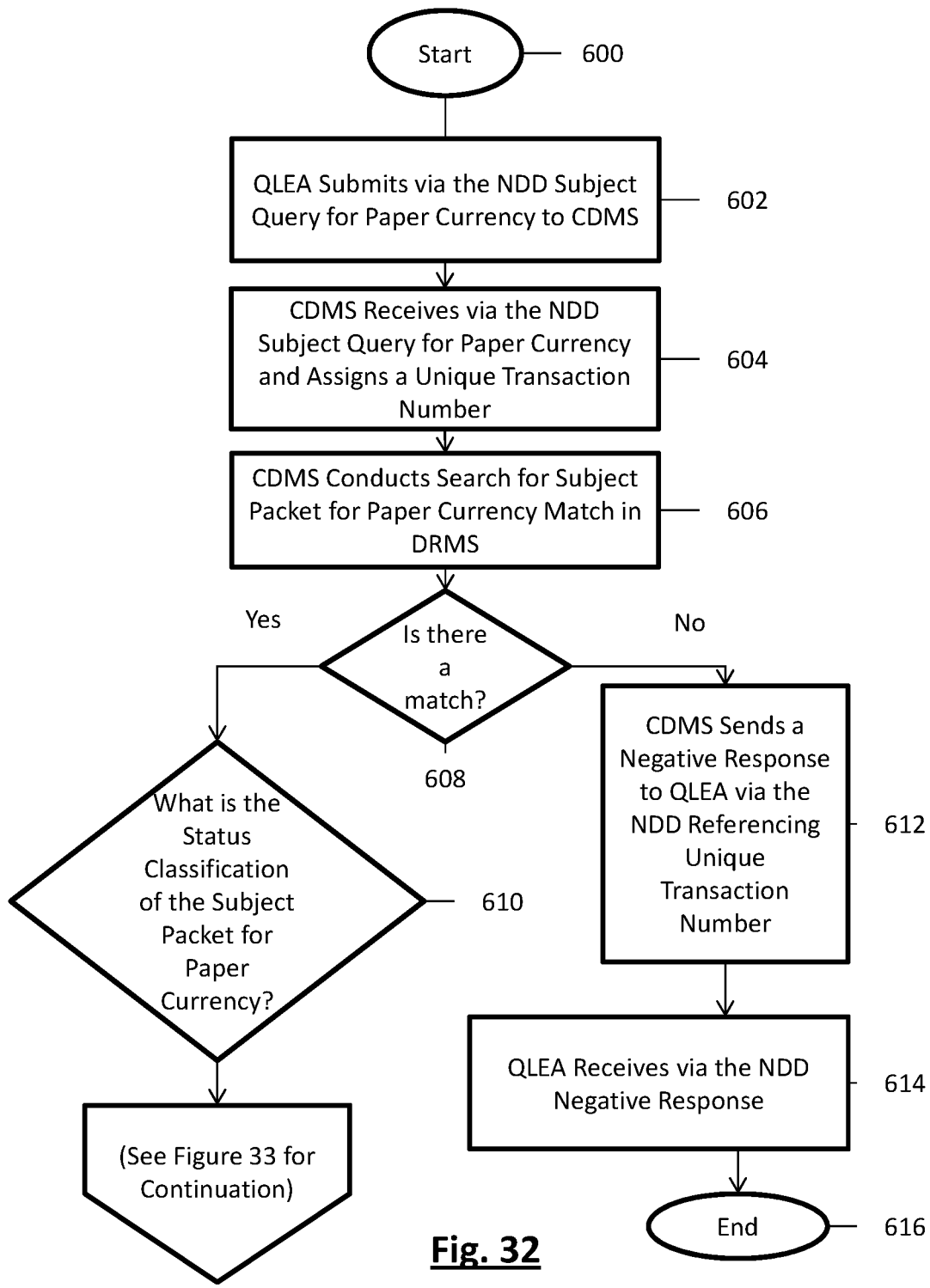
FIG. 32 is a partial flowchart illustrating an exemplary subject query of paper currency and retrieval processes carried out by the system of FIG. 1, detailed in FIGS. 32-33, according to an embodiment of the present invention.
Figure 33:
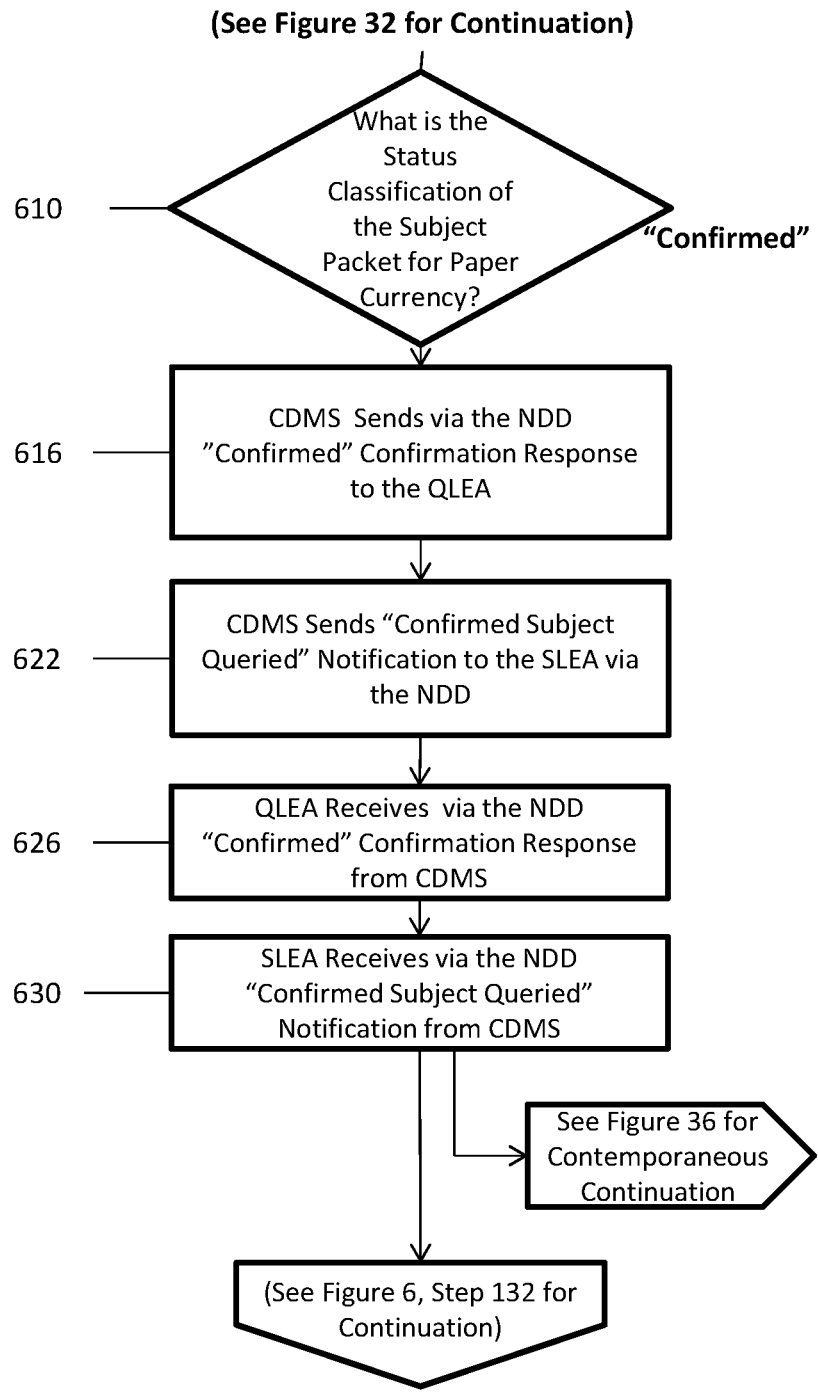
FIG. 33 is a continuation of the flowchart of FIG. 32, which illustrates additional steps of the exemplary subject query of paper currency and retrieval processes, according to an embodiment of the present invention.

In accordance with an embodiment of the invention, a flowchart illustrating exemplary query and retrieval processes for paper currency carried out by the central data management system ("CDMS") 14 via the NDD 24 is set forth in FIG. 32-33 and FIG. 36. For the sake of clarity, the subject query and retrieval process for paper currency of the CDMS 14 will be described in relation to two different scenarios that are possible when an exemplary QLEA submits a subject query for paper currency via the NDD 24 to the CDMS 14. These scenarios include (1) a QLEA subject query for paper currency of the CDMS 14 resulting in a "Negative" response only and (2) a QLEA subject query for paper currency of the CDMS 14 resulting in a "Confirmed" status classification confirmation response.

In a first exemplary scenario, a QLEA subject query for paper currency of the CDMS 14 results in a "Negative" response only. Referring to FIG. 32, the process commences at step 600, and at step 602, a QLEA submits a subject query for paper currency to the CDMS 14 via the NDD 24. The QLEA submits the subject query for paper currency to the CDMS 14 in step 602 in order to determine whether or not a particular subject—paper currency serial number(s)— matches a subject packet in the DRMS 20. The CDMS 14 receives the subject query for paper currency from the QLEA via the NDD 24 at step 604 and assigns it a unique transaction number. In a preferred embodiment of the invention, a unique transaction number is assigned by the CDMS 14 to each submitted subject query for paper currency at step 604. This unique transaction number is thereafter referenced by the CDMS 14 with regard to any communications relating to that specific QLEA subject query for paper currency.

In subsequent step 606, the CDMS 14 conducts a search of the DRMS 20 for a subject packet with serial numbers that match those of the QLEA subject query for paper currency and determines at decision block 608 whether a match exists between that subject and any one of the subject packets in the DRMS 20. In this first exemplary scenario, the CDMS 14 determines that no match exists at decision block 608 and thus, proceeds to step 612, where the CDMS 14 sends via the NDD 24 a "Negative" response to the QLEA referencing the unique transaction number assigned by the CDMS 14 to the original QLEA subject query for paper currency in step 604. At step 614, the QLEA receives via the NDD 24 the Negative response. Thereafter, the processes associated with the first exemplary scenario are concluded at step 616.

In a second exemplary scenario, a QLEA subject query for paper currency of the CDMS 14 submitted via the NDD 24 results in a "Confirmed" status classification confirmation response. Referring again to FIG. 32, the process commences at step 600, and steps 602, 604, and 606 are the same as described above for the first exemplary scenario. However, the second exemplary scenario differs from the first exemplary scenario starting at decision block 608. In the second exemplary scenario, when the search is conducted of the DRMS 20, the CDMS 14 determines at decision block 608 that a match exists between one or more of the serial numbers in the subject query for paper currency of the QLEA and those in a subject packet in the DRMS 20. (i.e., a response of "yes" at decision block 608). For a situation in which multiple matching subject packets are identified in a search of the DRMS 20, the CDMS 14 will associate all identified matching subject packets, their SLEA(s) and their respective unique transaction number(s) (assigned by the CDMS 12 at step 1004, FIG. 35) with the unique transaction number assigned by the CDMS 14 to the QLEA subject query for paper currency in step 604, FIG. 32. Thereafter, at decision block 610, the CDMS 14 determines the status classification of the matching subject packet(s) for paper currency identified in the DRMS 20.

Continuing this second exemplary scenario in FIG. 33 at step 610, the matching subject packet for paper currency is determined to have a status classification of "Confirmed". Referring now to step 616, the CDMS 14 sends a "Confirmed" confirmation response via the NDD 24 to the QLEA referencing the unique transaction number assigned by the CDMS 14 to the QLEA's subject query for paper currency in step 604. In a preferred embodiment of the invention, for a subject query for paper currency resulting in a subject packet match, the "Confirmed" confirmation response for paper currency provides (1) the unique transaction number assigned to the QLEA's subject query for paper currency at step 604; (2) the status classification (e.g. Confirmed—Drug Buy Funds), (3) the total number of serial number matches per matching subject packet, (4) the unique transaction number(s) for the matching subject packet(s), and (5) the name and contact information for the SLEA(s) for each of the matching subject packet(s). At step 622, the CDMS 14 sends a "Confirmed Subject Queried" notification to the SLEA(s) via the NDD. Preferably, a "Confirmed Subject Queried" notification for paper currency contains the following information: (1) the subject queried, (2) the date of the subject query, (3) the number of serial number matches per matching subject packet, (4) the unique transaction number(s) for the SLEA(s) matched subject packet(s), (5) the name and contact information for the QLEA, (6) the unique transaction number assigned to the QLEA's subject query for paper currency assigned in step 604, and (7) a subject queried response packet. The contact information of the QLEA is maintained in the CDMS 14 under the system user's account and is automatically attached to the "Confirmed Subject Queried" notification based on the unique transaction number. In step 626, the QLEA receives via the NDD 24 the "Confirmed" confirmation response from the CDMS 14. In step 630, the SLEA(s) receives via the NDD 24 the "Confirmed Subject Queried" notification from the CDMS 14. As part of the "Confirmed Subject Queried" notification received by the SLEA in step 630 of FIG. 33, the process for the completion of the subject queried response packet begins at step 630, FIG. 36, occurring contemporaneous to the investigation conducted by the QLEA in step 132, FIG. 6. At step 1104, FIG. 36, the SLEA is presented with a subject queried response packet. The subject queried response packet solicits the SLEA to provide immediate input/feedback to the QLEA concerning the subject query which resulted in the "Confirmed" confirmation response at step 616, FIG. 33. At step 1108, if the SLEA decides to complete the subject queried response packet, the process continues at step 1116 where the SLEA completes the subject queried response packet using the available response options. The subject queried response packet is comprised of pre-populated information from the "Confirmed" confirmation response and offers the SLEA three response options from which to select, to include (1) "no response", (2) a drop-down style menu of operational responses (e.g. "Contact SLEA immediately," "Contact SLEA at earliest convenience," "Obtain photograph of subject," "Identify all associates," "Newly developed investigative information available," "Surveillance on-going," "SLEA will contact QLEA by cellphone immediately," "SLEA will contact QLEA at a later time," etc.), or (3) a customized text message. Upon completion of the subject queried response packet by the SLEA, the completed subject queried response packet is sent by the SLEA to the CDMS via the NDD. If at step 1108 the SLEA either selects the "no response" option or fails to submit a response within the CDMS's designated response time, the process continues at step 1112 where a "no response" response is assigned to the subject queried response packet and it is automatically sent to the CDMS via the NDD. At step 1120, the CDMS receives the completed subject queried response packet or the "no response" response from the SLEA. At step 1124, the CDMS sends the SLEA's completed subject queried response packet or the "no response" response to the QLEA via the NDD. At step 1128, the QLEA receives the SLEA's completed subject queried response packet or the "no response" response from the CDMS. The process then continues at step 132, FIG. 6. It should be reiterated the process described above concerning the completion and transmission of the subject queried response packet by the SLEA and its delivery to the QLEA occurs contemporaneous to the investigation conducted by the QLEA at step 132, FIG. 6.

The CDMS 14 "Confirmed" confirmation response received by the QLEA at step 626 (see FIG. 33) requires the QLEA to confirm or deny that a seizure was made. This second exemplary scenario continues at step 132, FIG. 6, where the subject query continues in the same manner described in Section 3, Page 45, paragraph 00125 of the Exemplary Subject Data Query and Retrieval Processes. That is, the processes depend on whether or not a seizure was made at step 134, FIG. 6. If a seizure was made, the process continues as it did above in the second exemplary scenario described in step 134, FIG. 8, in which the QLEA subject query of the CDMS 14 resulted in a "Confirmed" status classification confirmation response and seizure. If a seizure was not made, the processes would continue as it did above in the third exemplary scenario described in step 134, FIG. 7, in which the QLEA subject query of the CDMS 14 resulted in a "Suspected" status classification confirmation response only.

6. Exemplary Subject Packet for Paper Currency Input Processes

Figure 35:
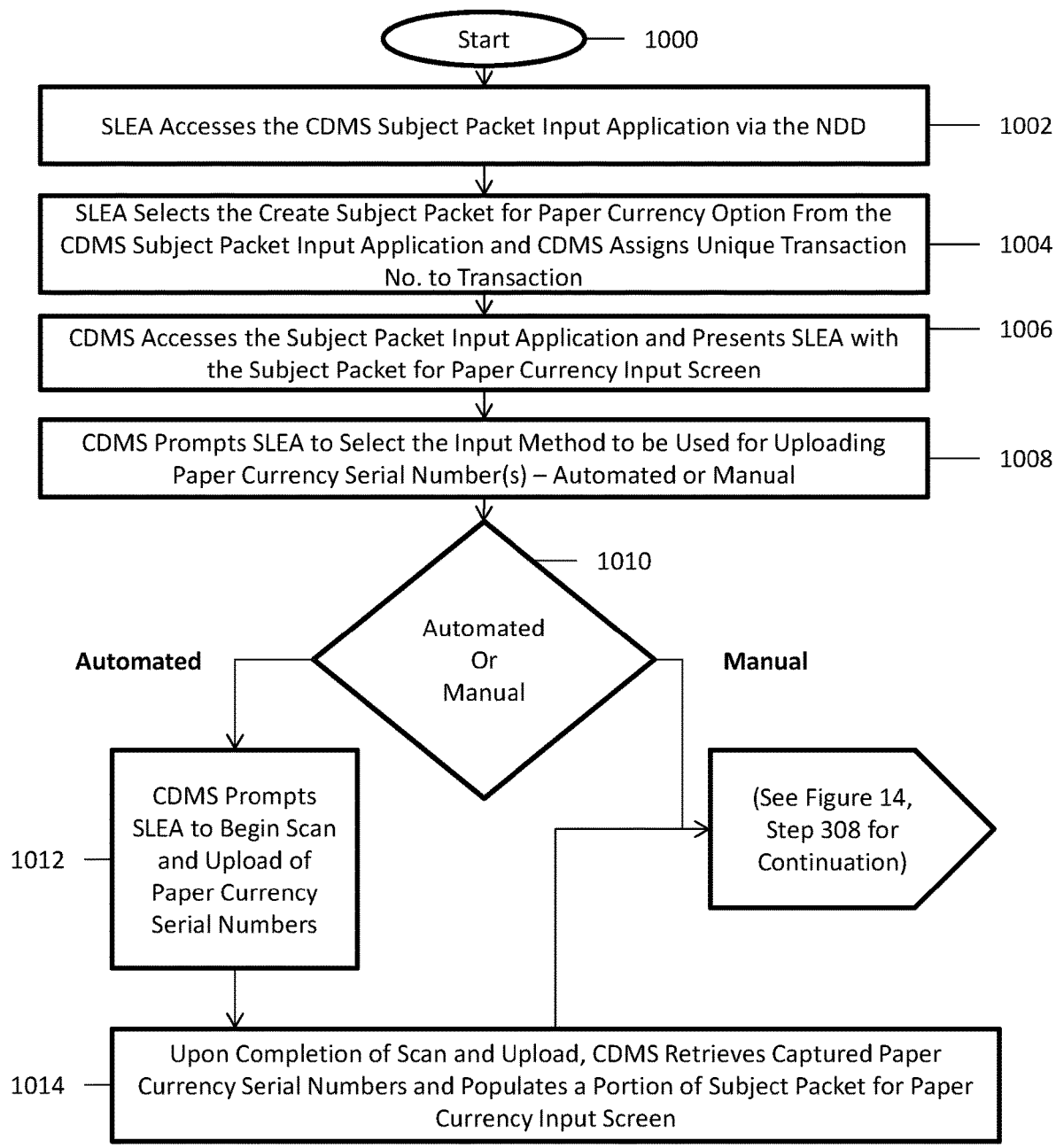
FIG. 35 is a partial flowchart illustrating an exemplary subject packet input processes for submitting subject packets for paper currency into the system of FIG. 1, according to an embodiment of the present invention.

In accordance with an embodiment of the invention, a flowchart illustrating exemplary subject packet for paper currency input processes for entering data into the central data management system ("CDMS") 12 and data records management system ("DRMS") 20 is set forth in FIG. 35. In a preferred embodiment of the invention, these processes are performed by using the CDMS Subject Packet Input Application 32, local digital computer Subject Packet Input Program 52, or mobile digital device Subject Packet Input Application 72, which enable a SLEA to input subject data into the DRMS 20. Referring to FIG. 35, the process commences at step 1000, and in step 1002, a SLEA accesses the CDMS 12 via the NDD 22. In step 1004, the SLEA selects the "Create Subject Packet for Paper Currency" option from the CDMS 12 and the CDMS 12 assigns a unique transaction number to the transaction. In subsequent step 1006, the CDMS 12 accesses the CDMS Subject Packet Input Application 32 and presents the SLEA with the "Subject Packet for Paper Currency" input screen. In a preferred embodiment, subject packets in the DRMS 20 for paper currency include (1) the type of currency, (2) the serial number of each note, (3) a description of the currency identifying its "Confirmed" status classification (e.g. "Drug Buy Funds", "Money Laundering Funds", "Bait Money", "Bribe Money", or the general term "Evidence"), and (4) the SLEA's contact information. At step 1008, the Subject Packet Input Application 32 prompts the SLEA for the method to be used to enter the paper currency serial numbers into the CDMS 12. Paper Currency serial number(s) can either be input (1) manually, or (2) uploaded through an automated commercial scanning process. At decision block 1010, if the paper currency serial numbers will be entered manually, the process continues at step 308, FIG. 14, where the SLEA completes the entering of all required information, to include the serial number for each item of paper currency, into the Subject Packet for Paper Currency input screen. An image or photograph of the paper currency can be submitted as descriptive data. The mandatory minimum number of descriptive data fields to be completed for the paper currency will be established by the CDMS administrator. In a preferred embodiment, a minimum number of descriptive data fields are required to be completed for the paper currency category before the Subject Packet Input Application 32 will allow the SLEA user to proceed to the next step in the process. After the SLEA enters the available information into the descriptive data field, the Subject Packet Input Application 32 displays the subject field selection for the status classification of the subject packet for paper currency. In a preferred embodiment, the only status classification available for paper currency is "Confirmed". The status classification of the subject packet for paper currency submitted for inclusion in the CDMS 12 is selected by the SLEA and is based on the SLEA's application of the stipulated definition of "Confirmed" characterizing the quantity and quality of information the SLEA possesses concerning the paper currency. After the SLEA enters all of the descriptive data for its subject paper currency, the Subject Packet Input Application 32 displays all the information entered in the subject packet for paper currency screen by the SLEA at step 308, FIG. 14. Thereafter, in step 310, the SLEA reviews the information that was entered into the Subject Packet for Paper Currency input screen and decides whether it is satisfied with the Subject Packet for Paper Currency input. At decision block 312, the SLEA must decide if it is satisfied with the saved Subject Packet for Paper Currency. If the SLEA is not satisfied with the descriptive data entered into the Subject Packet for Paper Currency input screen in step 308, the SLEA can select the "Edit Subject Packet" option in step 314, where the process returns the SLEA to step 306 to make any desired changes to the descriptive data. Conversely, if the SLEA is satisfied at step 312 with the descriptive data entered into the Subject Packet for Paper Currency input screen at step 308, the SLEA can select the "Submit Subject Packet" option at step 316, FIG. 15, to submit the pending subject packet to the CDMS 12 for storage in the DRMS 20. Now referring back to FIG. 35, if at decision block 1010, the SLEA is going to utilize the automated scanning and upload process for entering the paper currency serial numbers, additional hardware and software are needed and the process differs slightly. For the automated scanning and uploading of paper currency serial numbers, the process starts at step 1000 and continuing at step 1002, the SLEA accesses the CDMS 12 via the NDD 22. Steps 1004, 1006, and 1008 are the same for both the manual and automated paper currency serial number input process; however, at decision block 1010, the processes change when the SLEA selects "Automated". In a preferred embodiment, the automated paper currency serial number input process requires the use of a commercial grade currency scanner equipped with character or image recognition and serial number capture functionality and the capability to export the digitized data files into the CDMS 12. If the SLEA selects "automated" at decision block 1010, the process continues at step 1012 where the SLEA is prompted by the Subject Packet Input Application 32 to begin the scanning and uploading of paper currency serial number process. The QLEA then loads the paper currency into the attached scanner which scans all the paper currency capturing and digitizing the serial number of each item of currency. At step 1014, the CDMS Subject Packet Input Application 32 retrieves the digitized serial numbers and populates the appropriate fields of the Subject Packet for Paper Currency input screen. Thereafter, the process continues at step 308, FIG. 14, where the SLEA completes the entering of all required information, except the serial number for each item of paper currency, which was automatically retrieved from the currency scanner and populated into the Subject Packet for Paper Currency input screen. Referring again to FIG. 14, the processes for the creation of a Subject Packet for Paper Currency option mirrors the processes for the creation of a subject packet option, that is, the process continues as previously discussed through steps 310, 312, 314, 316, 318, 320, 322, 324, 326, 328, 330, 332, 334, 336, 338, 340, and 342 in FIGS. 14-17.

7. Exemplary Creation of an Investigative Alert and the Related Processes

In accordance with an embodiment of the invention, a flowchart illustrating an exemplary creation of the Investigative Alert process carried out by the central data management system ("CDMS") 18 via the NDD 28 is set forth in FIG. 4 and thoroughly detailed in FIGS. 27-30. In a preferred embodiment of the invention, the central data management system ("CDMS") 18 and the NDD 28 includes an Investigative Alert feature. An Investigative Alert ("IA") is a proactive notification created by a SLEA to provide information pertinent to on-going law enforcement operations to a designated user(s) of the CDMS 18 via the NDD 28. The CDMS 18 can forward an IA via the NDD 28 immediately to the entire network of system users, to a geographical group of users (e.g., users in the northeast U.S., the southwestern U.S. border states, or users in the State of Ohio), to a targeted group of users (e.g. users located along the I-20 corridor from Dallas, Texas, to Jackson, Mississippi), to a specific user agency (e.g., the Bossier City Police Department, the Louisiana State Police, or the Desoto Parish Sheriff's Office), or to individual users (e.g. two Shreveport Police Department interdiction units and one Caddo Parish Canine Unit working a local highway interdiction operation). Preferably, an IA includes the following information: (1) the SLEA's contact name and 24-hour contact information (e.g., cellular telephone number or dispatch center telephone number), (2) the date and time of issuance, (3) the effective period for the IA (e.g., start time/date, end time/date), (4) identification of all system users to whom the IA is being directed—referred to as "Designated Recipients", (5) a succinct summary of the information being provided, to include photographs and any requested actions by the SLEA, and (6) the unique transaction number assigned to the IA by the CDMS 18 in step 704, FIG. 27.

Figure 27:
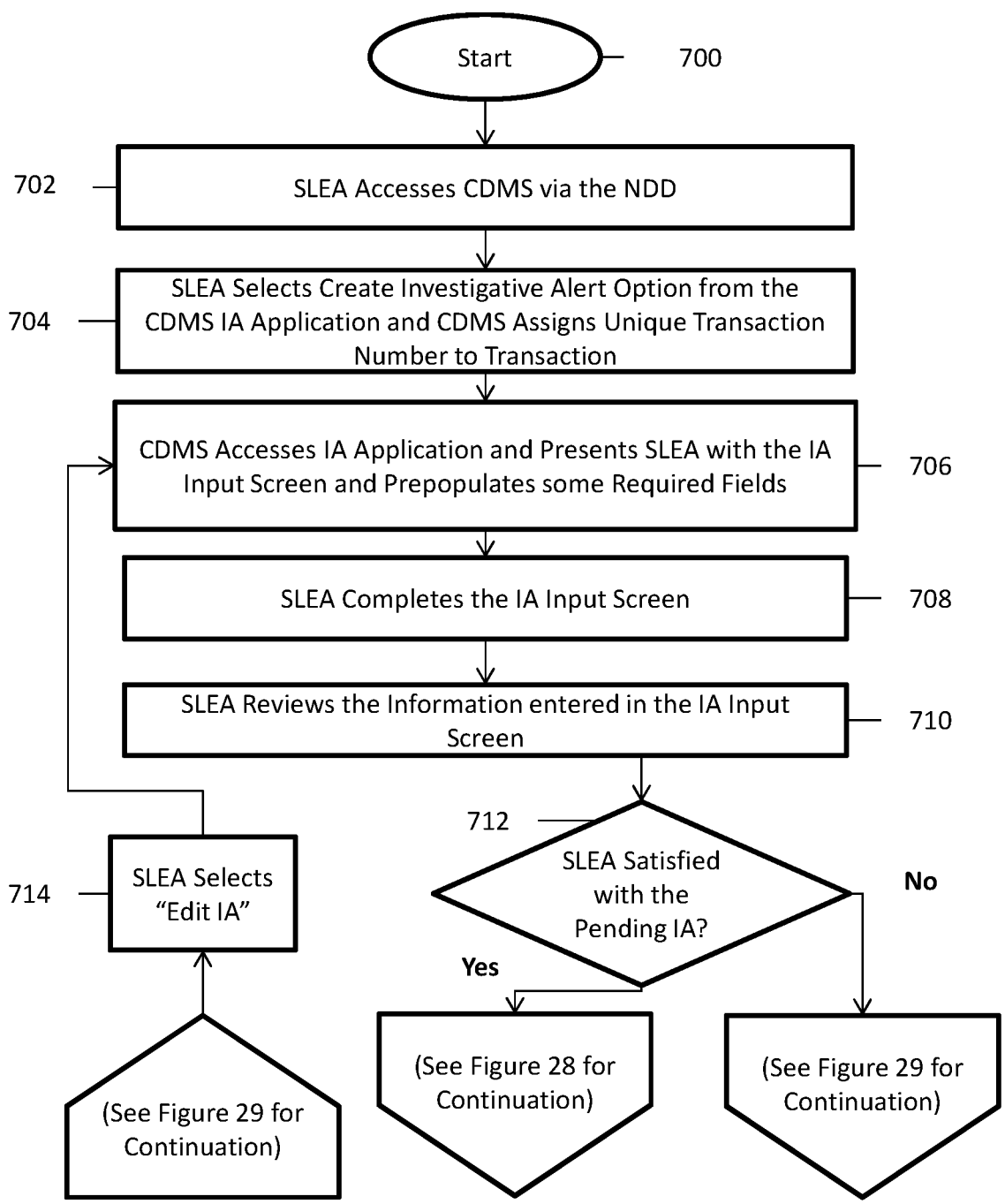
FIG. 27 is a partial flowchart illustrating an exemplary input and issuance of an investigative alert processes carried out by the system of FIG. 4, detailed in FIGS. 27-30, according to an embodiment of the present invention.
Figure 28:
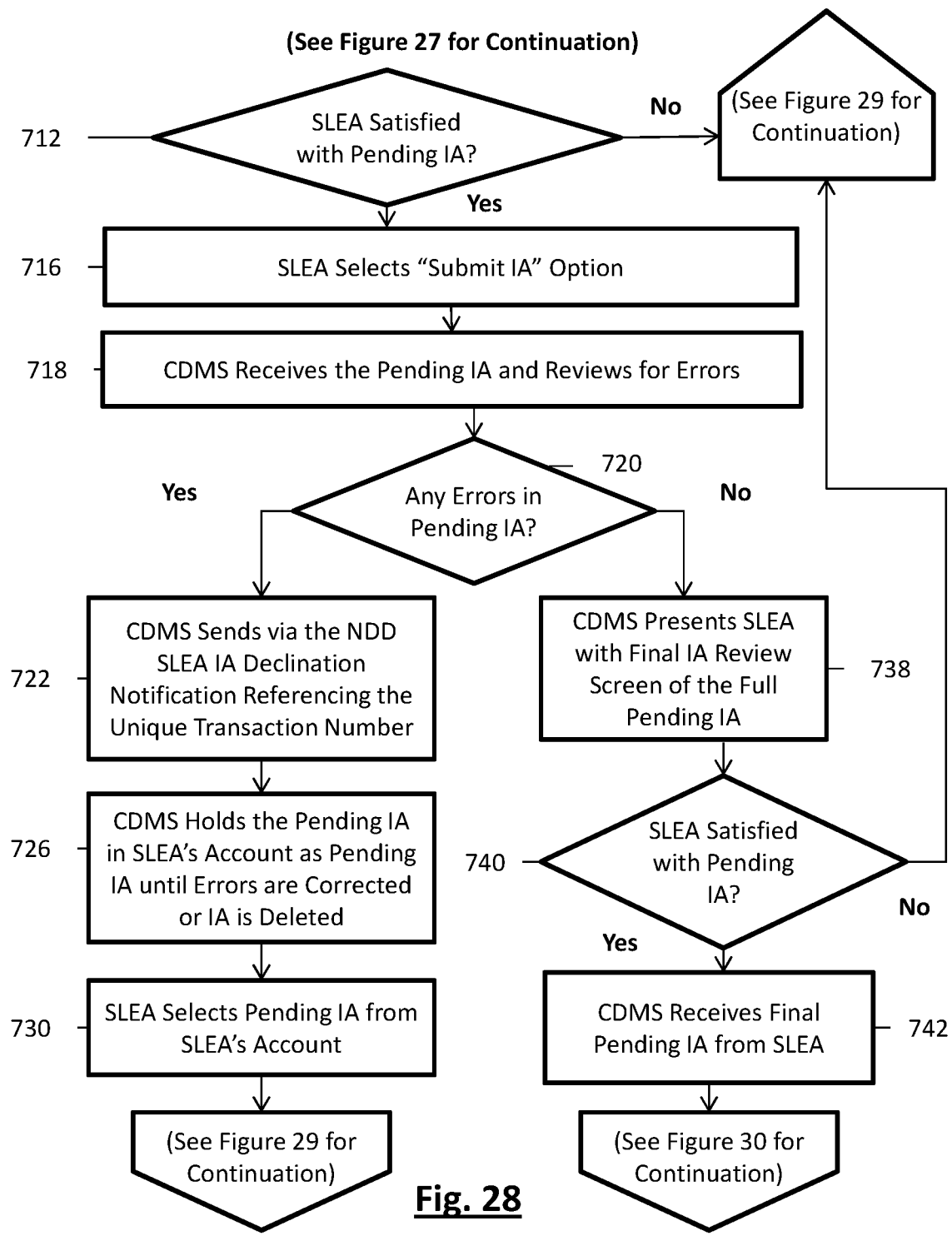
FIG. 28 is a continuation of the flowchart of FIG. 27, which illustrates additional steps of the exemplary input and issuance processes of an investigative alert, according to an embodiment of the present invention.

Referring now to FIG. 27, the process for creating and issuing an IA using the CDMS 18 and the NDD 28 will be described. The process for creating an IA begins in FIG. 27, step 700 and continues with the SLEA accessing the CDMS 18 via the NDD 28 at step 702. At step 704, the SLEA selects the "Create Investigative Alert" option from the CDMS IA Application 38 and the CDMS 18 assigns a unique transaction number to the transaction. In subsequent step 706, the CDMS 18 accesses the CDMS IA Application 38, presents the SLEA with the "IA" input screen, and prepopulates some of the required data fields based on the SLEA's user account identification number. Preferably, each field in the IA Input screen requires that the requested information be provided. The IA input screen is prepopulated by the CDMS 18 using the information maintained in the SLEA's user account and also offers the SLEA the option to make any changes/additions to the specific contact name(s) or 24-hour contact number(s). At step 708, the SLEA completes the entering of all required information into the IA Input screen. As part of step 708, the SLEA user must select the designated recipients of the IA. The IA Input Application 38 has prepopulated designee recipient groups including all system users, specific geographical groups of users, targeted groups of users, individual users, or it allows the SLEA user to customize combinations of users for designation as a recipient(s). The CDMS 18 also provides the SLEA the option to save customized distribution lists in the DRMS 20, under the user's account identification number. Finally, as part of step 708, the SLEA is prompted to enter a succinct summary of the information to be contained in the IA, to include any special directions or requests by the SLEA and the effective start date and time and end date and time for the IA. The date and time of issuance will automatically be noted when the final IA submission is completed and submitted to the CDMS 18 for issuance.

Figure 29:
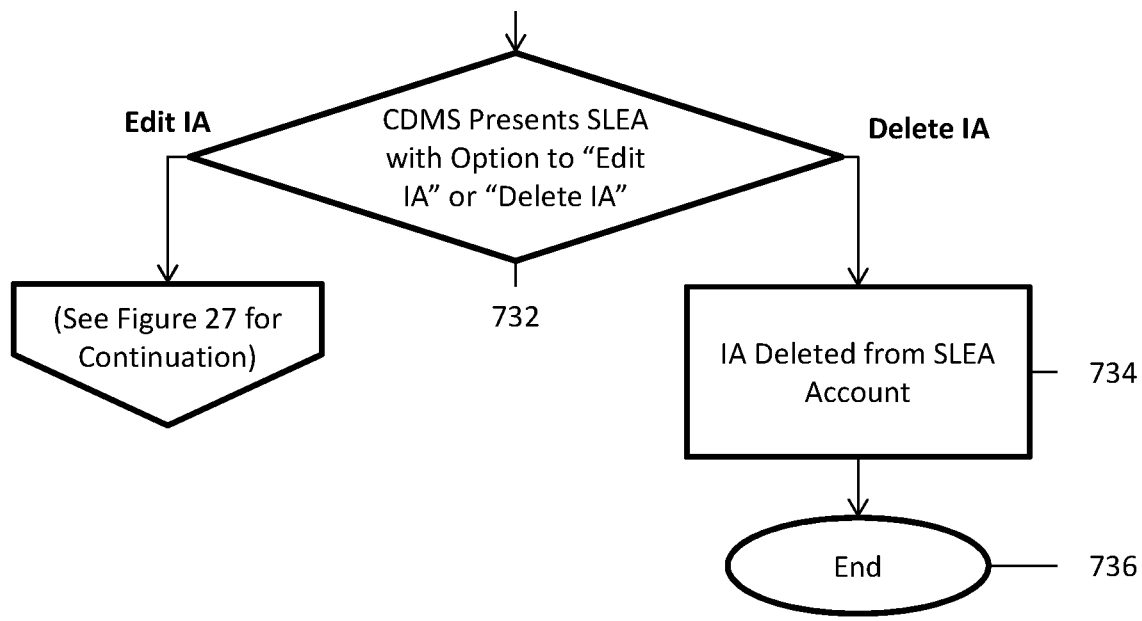
FIG. 29 is a continuation of the flowcharts of FIGS. 27 and 28 which illustrates additional steps of the exemplary input and issuance processes of an investigative alert, according to an embodiment of the present invention.
Figure 30:
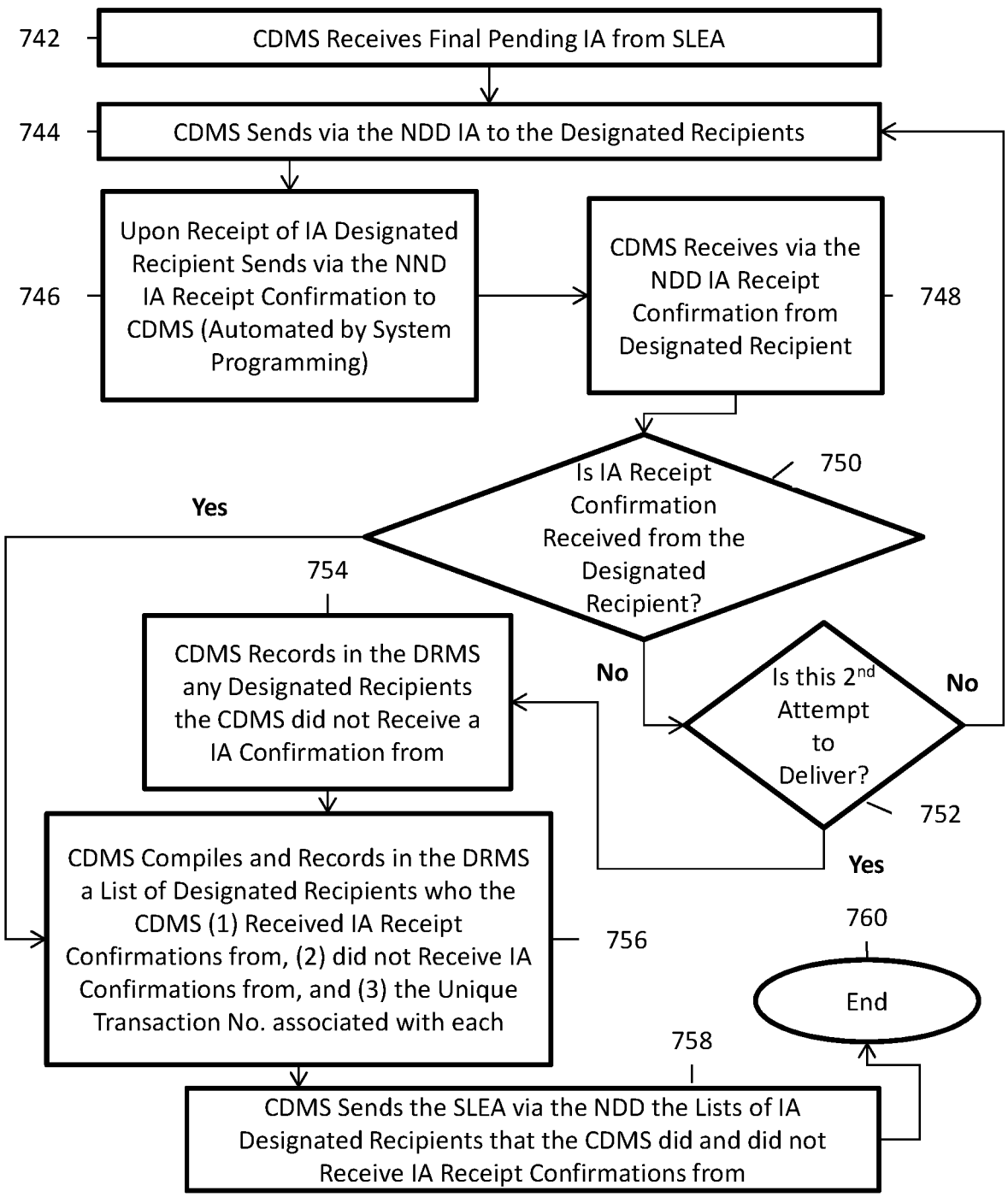
FIG. 30 is a continuation of the flowchart of FIG. 28, which illustrates additional steps of the exemplary input and issuance processes of an investigative alert, according to an embodiment of the present invention.

Upon completion of all the required input fields in the IA input screen, the SLEA reviews the content of the pending IA at step 710. Based on the SLEA's review of the pending IA, the SLEA determines in the decision block 712 if the SLEA is satisfied with the content of the pending IA. If the SLEA user is not satisfied with the content of the IA, the process continues at decision block 732, FIG. 29, where the SLEA must select either the "Edit IA" or "Delete IA" option. If the SLEA selects the "Delete IA" option, the CDMS 18 deletes the pending IA at step 734 and the process thereafter concludes at step 736. If however, at the decision block at step 732, the SLEA selects the "Edit IA" option, the process continues at step 714, FIG. 27. Thereafter, the CDMS returns the SLEA user to the IA Input Screen at step 706 and continues as before through steps 708, 710, and 712. Continuing again at step 712, FIG. 27, if the SLEA is satisfied with the content of the pending IA, the process continues at step 716, FIG. 28, where the SLEA selects the "Submit IA" option. At step 718, the CDMS 18 receives the pending IA and reviews it for errors. If the CDMS 18 identifies any errors in the pending IA at decision block 720, the CDMS 18 next sends the SLEA via the NDD 28, at step 722, an "IA Declination" notification referencing the unique transaction number initially assigned to the IA in step 704 (FIG. 27). Thereafter, at step 726, the CDMS 18 holds the pending IA in the SLEA's user account in the DRMS 20 or in the NDD 28 as a pending IA until the errors are corrected or the pending IA is deleted by the SLEA. At step 730, the SLEA selects the pending IA from the SLEA's user account and in decision block 732, FIG. 29, presents the SLEA with the "Edit IA" option or "Delete Pending IA" option. If the SLEA selects the "Delete IA" option at decision block 732, the pending IA is deleted at step 734 and the process concludes at step 736. If, however, at decision block 732 the SLEA selects the "Edit IA" option, the IA Input Application 38 continues through step 714, FIG. 27 and returns the SLEA user to step 706, FIG. 27. Thereafter, the IA Input Application 38 allows the SLEA to tab through the IA Input screen's data fields to edit the data as needed to correct the identified errors. The process again continues through steps 706, 708, 710, 712, 716, and 718 as before. Again referring to the decision block at 720, FIG. 28, if the CDMS 18 does not identify any errors in the Pending IA, the CDMS 18 presents the SLEA with the "Final IA Review" screen at step 738 and allows the SLEA to review the entire pending IA. If the SLEA is not satisfied with the pending IA at decision block 740, the process continues as before at decision block 732, FIG. 29. However, if at step 740 the SLEA is satisfied with the pending IA, the SLEA selects the "Submit IA" option and the pending IA is sent via the NDD 28 to the CDMS 18. At step 742, the CDMS 18 receives via the NDD 28 the Final Pending IA from the SLEA and at step 744, FIG. 30, the CDMS 18 sends the IA, via the NDD 28, to the Designated Recipient(s). At step 746, the CDMS 18 determines if the IA is successfully received by each Designated Recipient(s). The Designated Recipient(s)'s device is configured and arranged to automatically notify the CDMS 18 if it successfully receives an IA. At step 748, the CDMS 18 receives via the NDD 28 the IA Receipt Confirmation(s) from the Designated Recipient(s). At decision block 750, the CDMS 18 determines if an IA Receipt Confirmation was received from each Designated Recipient. If the CDMS 18 determines at decision block 750 that any Designated Recipient did not receive the IA, the process continues at decision block 752, where the CDMS 18 next determines if the failed receipt was the CDMS 18's second attempt to deliver the IA. If it was not the second failed attempt, the process again returns to step 744 and repeats through steps 746, 748 and 750. Again at step 750, if the CDMS 18 determines that any Designated Recipient did not receive the IA, the process continues at decision block 752, where the CDMS 18 next determines if the failed receipt was the CDMS 18's second attempt to deliver the IA. If the CDMS 18 determines at decision block 752 that a second failed attempt to deliver the IA has occurred, the process continues at step 754 where the CDMS 18 records in the DRMS 20 any Designated Recipient(s) from which the CDMS 18 did not receive an IA Receipt Confirmation. Thereafter, the process would continue at step 756. Returning to decision block 750, if the CDMS 18 determines that an IA Receipt Confirmation was received from any Designated Recipient(s), the process continues at step 756 where the CDMS 18 records in the DRMS 20 a list of Designated Recipients (1) who successfully received the IA and (2) those to whom IA delivery attempts failed, referencing the unique transaction number associated with each, and compiles an "IA Distribution Confirmation" notice. Then, at step 758, the CDMS 18 sends via the NDD 28 the IA Distribution Confirmation notice to the SLEA containing, in a preferred embodiment, (1) the list of Designated Recipient(s) who successfully received the IA, (2) the list of Designated Recipient(s) who failed to successfully receive the IA, and (3) the unique transaction number assigned to the IA. The exemplary creation of an IA process is thereafter concluded at step 760.

8. Exemplary Creation of an Archive Record and Related Processes

In a preferred embodiment of the invention, the central data management system ("CDMS") 16 includes an archive feature which creates an Archive Record consisting of all Subject Queries, accepted Subject Packets, successfully issued Investigative Alerts, and Archive Record Queries in the DRMS 20. Preferably, each Archive Record includes (1) the subject and descriptive data entered by the QLEA or SLEA, (2) the date of the query or entry, (3) the name and contact information of the QLEA or SLEA, and (4) the unique transaction number for the respective transaction. Maintenance of such archives enables a QLEA to conduct an historical search, using the CDMS 16, of the massive amount of data contained in the DRMS Archive Record. Unlike the Subject Packets contained in the DRMS 20 which have assigned Status Classifications with a known criminal involvement, the Archive Records include all negative queries; negative queries which individually taken can appear inconsequential and unrelated and whose existence would not be made known to a QLEA as the result of a Subject Query. However, with the archive feature, a QLEA is able to perform an Archive Record Query of the DRMS's 20 Archive Records to determine if a subject was ever queried or inputted by another QLEA or SLEA, thereby identifying other locations or circumstances which prompted law enforcement to make contact with, and query, a given subject. If the QLEA discovers from an Archive Record Query that the Archive Record contains information that a given subject was previously queried by another QLEA or inputted by an SLEA, the QLEA can contact that QLEA or SLEA for additional information using the name and contact information stored in the Archive Record. By contacting a QLEA or SLEA who previously entered a query or inputted an entry for the same subject, the QLEA is likely to obtain additional information about that subject that would have otherwise likely gone unnoticed and could potentially further its investigation.

Figure 31:
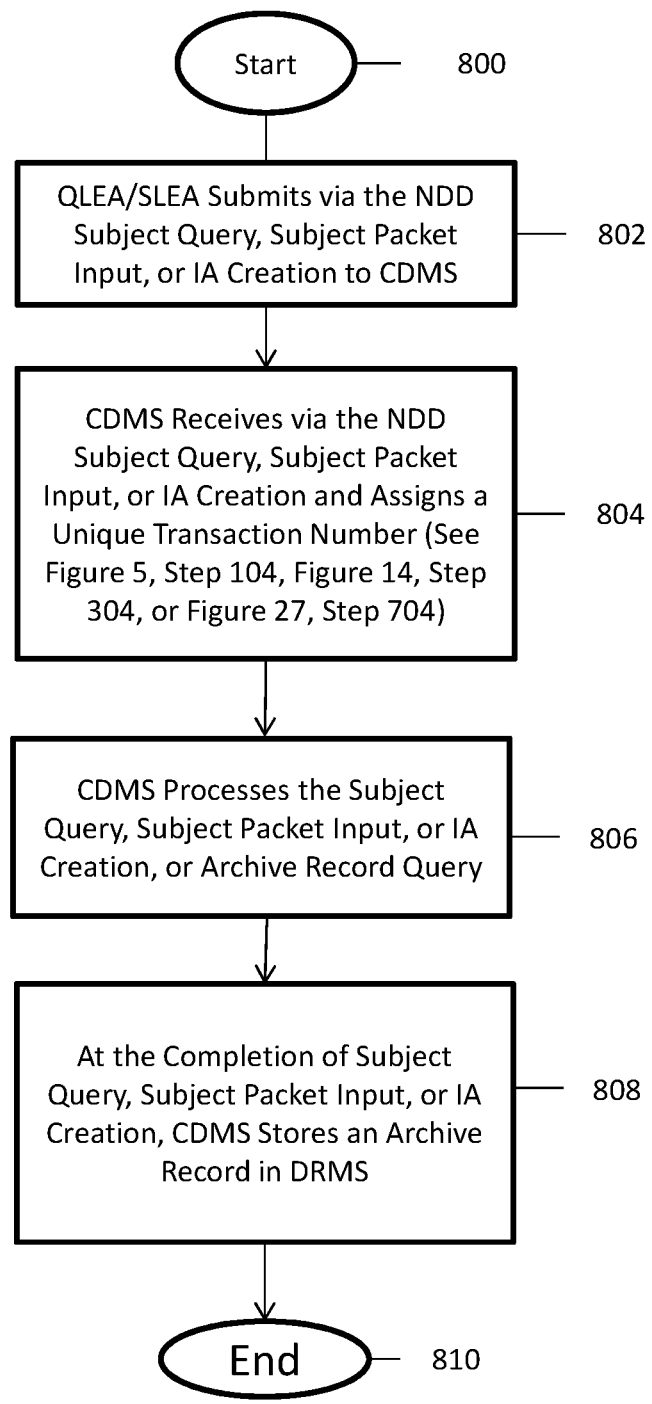
FIG. 31 is a flowchart illustrating an exemplary creation of an archive record processes carried out by the system of FIG. 1, according to an embodiment of the present invention.

In a preferred embodiment of the invention, the creation of an Archive Record starts at step 800 of FIG. 31. At step 802, a QLEA or SLEA accesses the CDMS 12, 14, 16, or 18 (collectively referred to in this exemplary embodiment as CDMS) via the NDD 22, 24, 26, or 28 (collectively referred to in this exemplary embodiment as NDD) and submits a Subject Query, inputs a Subject Packet, creates an IA, or submits an Archive Record Query. At step 804, the CDMS receives via the NDD the Subject Query, inputted Subject Packet, created IA, or Archive Record Query and assigns a unique transaction number (A unique transaction number is assigned by the CDMS at step 104, FIG. 5, for a Subject Query; at step 304, FIG. 14, for a Subject Packet input; at step 704, FIG. 27, for an IA; and at step 904, FIG. 34, for an Archive Record Query.) At step 806, the CDMS processes the Subject Query, inputted Subject Packet, created IA, or Archive Record Query. If during the process the inputted Subject Packet or the created IA is deleted by the SLEA, the Archive Record process is aborted and no Archive Record of the transaction is generated. At step 808, at the completion of the Subject Query, inputted Subject Packet, created IA, or the Archive Record Query processes, the CDMS generates an Archive Record of the transaction, referencing the unique transaction number, and sends that Archive Record to the DRMS 20. Thereafter, the Archive Record creation process ends at step 810.

10. Exemplary Archive Record Query and Related Processes

Figure 34:
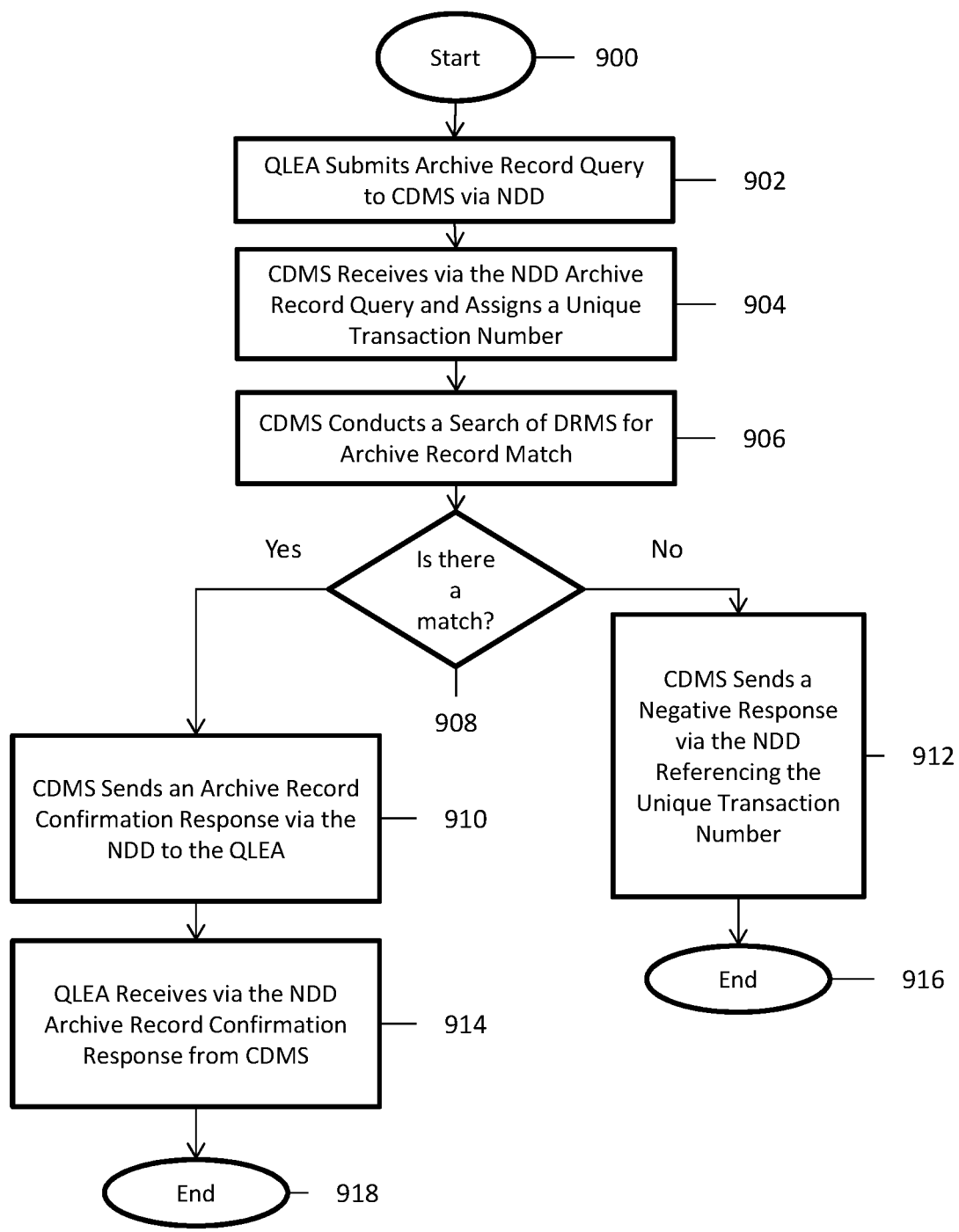
FIG. 34 is a flowchart illustrating exemplary archive record query and retrieval processes carried out by the system of FIG. 1, according to an embodiment of the present invention.

In yet another preferred embodiment of the invention, the process for submitting an Archive Record Query of the DRMS 20 begins at step 900, FIG. 34. At step 902, the QLEA accesses the CDMS 16 and submits an Archive Record Query via the NDD 26. At step 904, the CDMS 16 receives the QLEA's Archive Record Query and assigns a Unique Transaction Number to the query. At step 906, the CDMS 16 conducts a search of the DRMS 20 for a matching Archive Record(s). Thereafter, at the decision block 908, the CDMS 16 determines if an Archive Record(s) matching the Archive Record Query was identified in the DRMS 20. If no matching Archive Record was identified, the process continues at step 912 where the CDMS 16 sends a Negative Response via the NDD 26 referencing the Unique Transaction Number assigned to the query at step 904 to the QLEA and the Archive Record Query process subsequently concludes at step 916. If however, at the decision block at step 908 a matching Archive Record is identified, the process continues at step 910 where the CDMS sends an Archive Record Confirmation Response via the NDD 26 to the QLEA. In a preferred embodiment of the invention, an Archive Record Confirmation Response contains (1) the date of the matched Archive Record(s), (2) the Unique Transaction Number for the matched Archive Record(s), (3) the name and contact information of the QLEA(s) or SLEA(s) for the matched Archive Record(s), and (4) the Unique Transaction Number for the QLEA's Archive Record Query. Thereafter, at step 914, the QLEA receives via the NDD 26 the Archive Record Confirmation Response from the CDMS. The Archive Record Query process then concludes at step 918.

11. Additional Features of the System

In one or more preferred embodiments of the invention, the system for facilitating the execution of law enforcement duties includes additional features that further enhance its functionality. Several exemplary features will be described hereinafter.

In one preferred embodiment of the invention, additional categories of status classifications could be developed for the submission of subject packets, as determined by the needs of system users. For example, a third tier of status classification based on a lesser standard of evidentiary support than that defined for "Confirmed" or "Suspected" could be utilized. Additionally, compulsory responses of the system could be modified, added, or removed as needed for queries involving such third tier defined subject packets.

In another preferred embodiment of the invention, an additional category of subject packet could be created for identification of witnesses or persons of interest in law enforcement investigations. These subjects, the nature of whose involvement in a law enforcement investigation is either unknown or has not been established to be of a criminal nature, can be included in a subject packet-based information sharing system as "Confirmed—Witness" subject packets. Confirmed—Witness subject packets could be utilized by SLEAs, whether they be a law enforcement agency, a district attorney's office, or other government agency or organization with criminal or civil investigative responsibilities, to receive a Subject Queried Notification if one of these non-criminal subjects are encountered by law enforcement. Notifications of this type greatly enhance law enforcement's capability to leverage its information sharing network to locate critical subjects who otherwise might not have been contacted in a timely manner. Witnesses in on-going criminal and civil investigations, cold-case investigations, hearings, and trials, some of whom may be unaware of law enforcement or government efforts to locate them for interview or subpoena service, and some who might be actively eluding law enforcement and government by relocating to other cities, states, or countries or by employing other proactive means of subterfuge (e.g. not registering vehicles, property, leases, or other personal assets in their own name) to avoid involvement or detection, can be more easily found using a nationally-scalable, information sharing network populated with Witness Subject Packets. In another application of this non-criminal Witness Subject Packet, non-law enforcement government agencies (e.g. federal, state, county/parish, and local government benefit agencies, child and domestic welfare agencies) could also benefit in fulfilling their regulatory or administrative responsibilities by utilizing this same functionality to assist in their efforts to locate persons, such as references, next-of-kin, heirs, beneficiaries, or identified/appointed guardians of minors by submitting these types of subject packets to the information sharing system.

In another preferred embodiment of the invention, additional types of subject packets could be created in the DRMS for warrants and local warrants. Confirmed—Warrant or Confirmed—Local Warrant subject packets, for example, could be submitted to the CDMS not only by law enforcement agencies, but also court systems. Currently, information concerning the existence of local warrants is not consistently available in any national database, but instead is more typically available through local or regional systems or through manual searches necessarily conducted by telephone inquiry. While software-based warrant creation systems have been developed and are in use, systems which, in some cases, can automatically upload a created warrant into their respective database, a "source" database, prevalent problems persist with both the warrant identification/verification and removal processes. These problem processes typically require agencies to manually identify/verify the existence of warrants and to manually remove from or reclassify warrants in their respective source databases, those being the individual databases in which the original warrant(s) is maintained. Once a warrant is either served or recalled, it must be timely removed from or reclassified in its respective source database; not doing so creates significant liability for law enforcement agencies and threatens the integrity and public reputation of both law enforcement and government, and the systems and processes they employ to conduct their law enforcement duties. One of the persisting challenges limiting the current processes for warrant identification/verification and removal/reclassification to predominantly manually-based solutions is the fact most of the source databases containing original warrants are not integrated with the extra-jurisdictional databases in use by other law enforcement agencies. Lacking integration, these systems can't support an automated, programmatic solution to these critical warrant processes. For example, the Shreveport Police Department (SPD) places its warrants into, and thereafter maintains, its own source database of warrants. This SPD warrants database is not accessible by adjacent jurisdictions/agencies like the Caddo Sheriff's Office, the Bossier City Police Department, and the DeSoto Sheriff's Office, each of which either share jurisdiction with, or are situated as a bordering jurisdiction to, SPD and have their own individual warrants, jail management/booking/records management systems or software databases for processing arrests, bookings, and warrants. When an arrest in one of these adjacent jurisdictions occurs based on an active SPD warrant, the arresting jurisdiction/agency does not have direct access to SPD's warrants database to remove the warrant due to the lack of an integrated connection between that arresting agency's system and SPD's warrants database. Consequently, the arresting jurisdiction/agency must manually notify SPD, often by telephone call or email, that the arrest occurred and that the SPD warrant has been served. Thereafter, responsibility falls on SPD to manually remove from or reclassify this now executed warrant in its database. If this manual process fails to get the warrant removed or reclassified accordingly and the subject of the warrant is subsequently encountered by law enforcement, SPD's warrant database will continue to errantly reflect the same warrant as being "active," making the subject of the warrant susceptible to being mistakenly rearrested on what is actually a served warrant. This problem also occurs at the national level with felony warrants entered into the National Crime Information Center (NCIC), a federal system which houses warrants for local, county, parish, state, and federal jurisdictions nationwide. NCIC's warrant removal process is essentially a manual process, supported by computerized steps. So despite some process automation facilitated by its software, the NCIC warrant process too often requires manual removal of warrants from the source database(s)

following notification of warrant execution because NCIC is not integrated with the numerous, disparate jail management/booking/records management, and other such siloed databases and systems in use by its nationwide network of law enforcement users. As with all these warrant systems, a lack of system integration hinders the development and deployment of automated, programmatic solutions to the processes involved with the verification/identification and updating of the warrant information contained in source database(s). Because the current warrant and jail management/booking/records management systems in use by U.S. law enforcement remain effectively siloed, it's typical for an agency serving an extra-jurisdictional warrant to thereafter find itself relegated to manually notifying the source agency of a warrant's service and for that source agency to be ultimately responsible for accomplishing the warrant's final removal or reclassification from its database. As most of these databases exist as disparate and siloed systems, manual efforts to remove or reclassify warrants have proven to be consistently inconsistent and unreliable, not infrequently resulting in errant arrests being made based on served or expired warrants simply because the maintaining agency neglected or failed to successfully remove or otherwise reclassify their warrant, as discussed in the SPD example above. A programmatic solution to this problem is what is needed. Although a direct integration with each individual warrant or jail management/booking system or records management system is currently unlikely due to costs, security, and system compatibility obstacles, a national database of subject packets for warrants would offer a solution to the manual warrant identification/verification, notification, removal, and reclassification process. For example, this national warrant database would enable disparate database systems or individual agency users to submit a Confirmed—"Active" Warrant subject packet for each active warrant in its source database or records management system, whether manual or computerized. When a warrant is thereafter executed, this national database can either be accessed directly by the arresting agency or through an integration between the national database and the arresting agency's system. Through the national database, the arresting jurisdiction could re-classify the warrant subject packet to a Confirmed—"Served" Warrant status classification and attach any relevant notes, photographs, and documents, such as a booking report, booking photograph(s), and a property list to that subject packet. The creation of the Confirmed—Served Warrant subject packet would also prompt the CDMS to generate and send a notification (e.g. a Warrant Served Notification) to the SLEA, enabling the SLEA to accept or reject the re-classification of their warrant subject packet and make the SLEA immediately aware of the warrant's change in status. Although this process could still require the manual removal of warrants from source databases by the SLEA responsible for maintaining and updating the warrant information contained in those databases, the current warrant process would be significantly improved by the automated processing and notification steps enabled by the national database. In cases in which a software integration between the source agency's warrants database software and the national database allow for automated identification/verification of a warrant based on a subject query or removal, reclassification, or updating of a warrant subject packet upon receipt and acceptance/rejection of an automated system notification (e.g. a Warrant Served Notification), a dramatic improvement of the accuracy, consistency, and reliability of the existing process would be achieved. In either case discussed above, the creation of a national database of local, county, state, and federal warrants which automates all or parts of the warrant process using a Subject Packet-based software solution will result in significant system performance improvements and substantial financial savings and societal benefits for both law enforcement and the public they serve.

In another preferred embodiment of the invention, new categories of subject packets could be developed to enable the submission of additional subject types to the DRMS. These new categories of subject packets expand the uses of the CDMS and DRMS and enhance the effectiveness of not only law enforcement databases, but also that of other government, commercial, and private databases. For example, subject packets pertaining to probation and parole agencies and their enforcement responsibilities, such as Confirmed—Probationer, Confirmed—Parolee, Confirmed—Probationer/Parolee Associate, Confirmed—Probationer/Parolee Address, Confirmed—Probationer/Parolee Associate Address, Confirmed—Probationer/Parolee Vehicle, Confirmed—Probationer/Parolee Associate Vehicle, etc., when included in the DRMS, provide valuable information to the QLEA while dramatically enhancing the effectiveness of probation and parole programs designed to monitor, assess, and document the activities of its probationers and parolees (a.k.a. clients), and to manage, intervene, rehabilitate, and, where deemed warranted, arrest its clients. These Probation/Parole subject packets can include, in addition to standard descriptive data, documentation relevant to the monitoring or regulation of probationer/parolee activities such as letters granting permission for travel (e.g. out-of-state or out-of-jurisdiction travel, work travel, along with dates, times, and effective periods for the authorization). Currently throughout the U.S., many probation and parole systems, and the courts responsible for administering them, require self-reporting by a probationer or parolee of encounters with law enforcement and unauthorized behavior. These programs heavily and critically rely on this self-reporting process, supplemented in appropriate cases by random substance abuse testing, to monitor and assess its clients' behavior and success within their programs. For example, a probation client suffering with a substance abuse problem would typically need to self-report their existing or developing substance abuse issue to their probation officer, or the abuse might be detected through random drug testing, before the need for intervention and treatment by the program can be identified and provided. In this example scenario for a substance abuse issue, if the probationer fails to self-report numerous incidents involving substance abuse induced behavior and is eventually involved in a criminal action such as driving a motor vehicle under the influence (DUI) or a drunken domestic dispute, that client would be arrested and incarcerated. Once an arrest of such a client has occurred, the options for intervention and client management available to the probation program may be significantly and unavoidably limited. These reduced options can mean the client may well be required to remain incarcerated for an extended period until their case can be fully evaluated and an appropriate response, which could include an extended period of incarceration, is determined by the probation system and the courts. Contrast that with an alternative scenario in which that same probationer with the substance abuse problem has the appropriate information placed into the DRMS in the form of subject packets, such as Confirmed—Probationer, Confirmed—Probationer Vehicle, Confirmed—Probationer Address, and Confirmed—Probationer Associate Vehicle, by their probation officer. This time, when law enforcement first encounters the client on a call for service made to the client's address (i.e. a Confirmed—Probationer Address) for a domestic disturbance reported by the client's girlfriend (i.e. a Confirmed—Probationer Associate), the CDMS not only notifies in real-time the responding officer, the QLEA, that he is responding to a Confirmed—Probationer Address and provides the QLEA with the name and contact information of the responsible probation officer (i.e. a Confirmation Response), it also notifies in real-time the responsible probation officer of their client's encounter with law enforcement and the reason for the encounter, which in this case is a call for service (i.e. a Subject Queried Notification). These real-time notifications serve to enhance both the QLEA's safety and understanding of the situation they are encountering on an otherwise routine call for service, provides the probation officer an opportunity and capability to identify a struggling client and to intervene with appropriate treatment and counseling, before an arrest eliminates such options designed to prevent violations requiring incarceration, and eliminate the program's critical reliance on self-reporting by the client. Similar law enforcement encounters in which the QLEA's safety and understanding are enhanced by the presence of appropriate information concerning a probationer or parolee in the DRMS and the probation or parole officer's opportunities for monitoring, assessing, and intervening pre-arrest include traffic stops, traffic accidents, and investigative queries. In each of these scenarios, more effective sharing of information and real-time notification and collaboration between stakeholders (i.e. the responding law enforcement officer and the probation/parole officer) dramatically increases the effectiveness of both in doing their jobs and in more successfully implementing societal reintegration programs like probation and parole as they were theoretically designed and intended to function. This improved application of information sharing, facilitated by the CDMS and DRMS, increases officer safety, makes probation and parole programs more effective, and, in cases in which preventative treatment, timely prescribed, prevents escalation of a client's problems to an arrest-level violation, provides both direct and valuable social and financial benefits to the U.S. communities whose taxes fund both the programs and the law enforcement agencies and court systems who enforce them.

In one preferred embodiment of the invention, one exemplary feature of the central data management system ("CDMS") is its inherent capability to continually generate intelligence information. Although the CDMS 16 is designed to be proactively queried for intelligence by any system user, local, state, tribal, and federal, the significance of the design of the CDMS 16 and DRMS 20 is the fact that it automatically and continually generates intelligence through the use of Subject Queries, Subject Packet inputs, Investigative Alerts, and Archive Record Queries by system users. Each and every use of the CDMS 16 generates intelligence by adding to the DRMS 20, whether that intelligence information results from a Subject Query, a Confirmed or Suspected Confirmation Response, an Investigative Alert, or an Archive Record Query. The most significant user of the CDMS is the front-line law enforcement officer who, on a daily basis, has the most frequent and consistent contact with known subjects and potential subjects and therefore has the greatest potential to generate intelligence.

In one preferred embodiment of the invention, the CDMS of the system 16 is provided with a feature that enhances law enforcement officer safety with respect to health hazards posed by subjects. Use of this feature is subject to the legal limitations governing the release of personal medical information. Arrested or convicted individuals whose hazardous medical conditions are documented by a law enforcement agency or government corrections agency in that person's arrest records or inmate medical records can be included as a health warning in the DRMS 20. If such a subject is queried in the CDMS 16, the CDMS 16 will notify the QLEA of the hazardous health condition of that subject thereby enabling an officer encountering the subject to take the necessary precautions to protect his or her own health in the course of performing his or her law enforcement duties.

In another preferred embodiment of the invention, the CDMS of the system is provided with a feature that assists in the enforcement of immigration laws. Descriptive data submitted to the DRMS as subject packets, Investigative Alerts, or notes, as appropriate, by the U.S. Department of Homeland Security (DHS), U.S. Immigration and Customs Enforcement (ICS), the U.S. Customs and Border Protection Agency (CBP), U.S. Citizenship and Immigration Services (USCIS), or other law enforcement, government, or commercial agencies or entities responsible for issuing, verifying, or monitoring immigration documentation, as current, expired, or false immigration documentation can be more effectively monitored, identified, verified, or tracked using this feature of the CDMS. For example, the Alien Registration Number, also known as the A-number or Registration Number, found on many USCIS documents such as a Permanent Resident or "Green" card, an Employment Authorization Document (a.k.a. work permit), and Immigrant Visa, the Non-Immigrant Visa Number found on Non-Immigrant Visas, or the unique, identifying information contained in an 1-9 Employment Eligibility Verification form or in the E-Verify system, can all be utilized to assist in the identification, verification, and, in cases in which the responsible agency or entity deems it warranted, the tracking of individuals in possession of these immigration documents. In so doing, the CDMS provides a nationally accessible system which enhances the effectiveness of the enforcement of U.S. immigration laws through real-time sharing of information and quasi-instantaneous notifications to system users while improving the safety of both the law enforcement officers tasked with this responsibility, and the citizens, businesses, communities, immigrants, and non-immigrants these officers work to protect and serve. In another embodiment of the feature, businesses held responsible for verifying the employment eligibility of their employees could submit subject queries to CDMS to aid in their compliance with applicable government employment regulations and laws.

In yet another preferred embodiment of the invention, the CDMS 16 of the system is provided with a photographic line-up feature to support law enforcement investigations. Using commercially available software programs, this feature of the CDMS enables law enforcement officers to create photographic line-ups to be generated remotely for immediate use in the field by law enforcement officers in on-going investigations (e.g., a six-person photo line-up). In addition to the commercially available software needed to create the line-ups, this feature will require the use of a mobile digital device such as a smartphone, notepad, or laptop computer, programmed and configured for the remote creation and presentation of these line-ups. Thus, the system provides an automated method for generating quasi-instantaneous, in the field, six-person photo line-ups by law enforcement officers.

In still another preferred embodiment of the invention, the CDMS 16 of the system is provided with an emergency satellite communications feature. With this feature, a special version of the smart phone for use with the CDMS is designed with the capability to receive satellite communications. Equipped in this manner, the smart phone provides command and control notification capabilities to government and law enforcement agencies operating in an emergency situation in which normal communications are unavailable. As such, the system is capable of providing a satellite capable specific or general purpose mobile digital device for receiving and/or sending information to law enforcement officers operating in areas, or during natural disasters, that render cellular, radio, network, or land-line based communication unavailable.

In yet another preferred embodiment of the invention, the CDMS of the system is provided with an information sharing feature designed to more effectively utilize the capabilities of license plate reader technology. This feature, utilizing commercially available license plate reader products and services or law enforcement implemented license plate reader cameras and networks, collectively referred to License Plate Reader Systems (LPRSs), enables the CDMS to receive descriptive data (i.e. a license plate number and state of registration), along with the location, date, time, photograph, and video data, collected by these LPRSs, and to query that descriptive data against the DRMS for specific license plates. Subsequent query matches in the DRMS generate real-time notifications which are delivered by the CDMS directly to the desktop computer, laptop computer, or mobile digital device, appropriately programmed and configured, of any designated system user. By enabling the querying of license plate numbers observed by LPRS through the CDMS against license plate data contained in the DRMS, this system is capable of creating a national, integratable, automated system for locating and tracking specific license plates and for providing QLEAs and SLEAs with real-time notifications (e.g. Subject Queried Notifications and Confirmation Responses) for license plates observed by any LPRSs connected to the CDMS.

In another preferred embodiment of the invention, the CDMS system (the "system") is provided with a feature to improve the effectiveness of a network of radio or digital or GPS transmitters, receivers, and/or sensors or motion sensors (the "surveillance network") used to locate and track items to include, but not be limited to vehicles, equipment, and moveable property. Signals received by this surveillance network of transmitters, receivers, and sensors provide that network's system with a location, identity, and date and time, of its observation or "sensing" of the item, e.g., the vehicle, piece of equipment, or moveable property. If connected or otherwise integrated with the CMDS, this surveillance network or its authorized users (such as, e.g., On-Star customer service monitoring representatives, ADT customer service monitoring representatives, security services company representatives) can submit subject queries of the DRMS, either manually or automatically (i.e., programmatically scheduled or triggered), using descriptive data for these located or sensed vehicles, equipment, and property to search for subject packets contained in the DRMS including, Confirmed—Stolen Vehicle, Confirmed—Vehicle, Confirmed—Stolen Equipment, Confirmed—Equipment, Confirmed—Stolen Property, or Confirmed—Property and Suspected—Stolen Vehicle, Suspected—Vehicle, Suspected—Stolen Equipment, Suspected—Equipment, Suspected—Stolen Property, or Suspected—Property. Upon receipt of a subject query from this surveillance network, if a subject packet match occurs in the DRMS for the descriptive data provided, the CDMS can generate and send a real-time notification (e.g. a Subject Queried Notification or Confirmation Response) to designated system users, whether those designated users be specific law enforcement agencies, specific operational units or groups, or individual officers, as well as authorized commercial or private entities or persons. CDMS notifications provide notification recipient(s) with the information typically contained in a subject packet, such as make, model, year, license plate information, serial number, visual description, any photographs, and contact information for the SLEA, unless the recipient's system role programmatically restricts receipt of certain information. The CDMS notifications can be supplemented with data provided by the surveillance network, such as the location, identity, and date and time of an item's observation or "sensing." In cases in which a QLEA submits a manual subject query that results in a match with a subject packet(s) contained in the DRMS, the CDMS can also generate and send a real-time notification (i.e. a Confirmation Response) to that QLEA. The notification capabilities of the CDMS system dramatically enhance the effectiveness of such surveillance networks and, in so doing, also increase their commercial value. If a surveillance network includes cameras (still or video), facial recognition technology, or object recognition software, such technology could be used to enhance the location, monitoring, and tracking capabilities of such a surveillance network to include persons or items for whom facial recognition data or object description data (distinctive shapes, patterns, marks, etc.) has been entered into the DRMS as descriptive data in associated subject packets.

In still another preferred embodiment of the invention, the CDMS 16 of the system is provided with a feature for monitoring of video and surveillance camera systems. With this feature, utilizing the available connectivity of the CDMS and commercially available digital video camera systems, video feeds or digital photographs can be remotely monitored/viewed using the special version of the smart phone or mobile digital device, appropriately programmed and configured, described above as a mobile platform. As one such exemplary application of this feature, commercially available digital video and photographs generated from a digital video surveillance system being used by a bank can be instantly or rapidly transmitted to responding law enforcement units as they respond to a robbery alarm at that bank. Using this feature, banks and other frequently robbed businesses employing a digital video surveillance system in their facilities compatible with the CDMS could greatly enhance effectiveness and safety operations in which law enforcement units are called to their facilities in response to a robbery. Specifically, law enforcement units and investigators could either (1) receive a live or recorded video feed, via the CDMS, from the bank or (2) quickly upload photos or video of a robbery in an Investigative Alert for expedited distribution to responding and investigating personnel. Consequently, the system provides an automated means for monitoring video and surveillance camera systems of a third party by a law enforcement agency user when requested or directed to do so by the third-party camera system owner.

In yet another preferred embodiment of the invention, the CDMS 16 of the system is provided with a feature for monitoring mobile tracking devices. With this feature, by employing a plurality of commercially available mobile tracking devices, the mobile tracking devices can be monitored from either a fixed position, local digital computer or a mobile digital device. Mobile tracking devices compatible with the CDMS 16 could be monitored by system users across the CDMS system 16 as long as access and connectivity to the CDMS exists. By employing mobile tracking devices compatible with the CDMS, this feature would solve the problem presented by current disparate systems, which require tracker specific software to be installed on any monitoring device to enable it to monitor a given mobile tracking device. Furthermore, in another embodiment of the invention, CDMS compatible mobile tracking devices could be monitored seamlessly throughout the CDMS system with an access code provided by the SLEA to designated system users via an Investigative Alert.

In still another preferred embodiment of the invention, the CDMS of the system 16 is provided with a fingerprint analysis feature. By utilizing this feature, a subject's fingerprints are scanned and queried, using commercially available, portable scanning hardware, against the DRMS 20, the Integrated Automated Fingerprint Identification System ("IAFIS"), and the National Crime Information Center ("NCIC"), to facilitate subject identifications. As such, the system provides an automated mobile platform and/or process by which a subject or potential subject could have their fingerprints verified or recorded by front-line law enforcement officers or SLEAs and transmitted back to the CDMS for storage or, as a QLEA, as a query against the national DRMS 20.

In still another preferred embodiment of the invention, the CDMS of the system 16 is provided with a retinal scanning feature. By utilizing this feature, a scan of a subject's retina is queried, using commercially available, portable scanning hardware, against the DRMS 20 to facilitate subject identifications. Thus, the system provides an automated platform and/or process by which a subject or potential subject could have their retina-print scanned, verified or recorded by front-line law enforcement officers or SLEAs and transmitted back to the CMDS for storage or, as a QLEAs, as a query against the national DRMS 20.

In yet another preferred embodiment of the invention, using commercially available CDMS compatible software, the CDMS of the system provides for an automated process for facilitating the execution of law enforcement duties with a feature for writing police reports. This feature comprises a software program that is compatible with the CDMS, which is designed to enable the drafting and submission of police reports from mobile digital devices such as smart phones, tablets, or laptops. In particular, law enforcement officers or agents can utilize a docking station installed in a patrol unit or an office to dock their mobile digital device. Then, the report writing software enables officers to access data files saved in the mobile digital device, such as pictures, audio recordings, data files, and GPS fixes, and digitally attach those files to the report file. Files for photos taken during investigations, criminal histories (data files), vehicle registrations (data files), wanted persons notices (data files), etc. are capable of being loaded in the report from the mobile digital device. As such, the system provides an automated platform and/or process by which information obtained by a law enforcement or government agency can be used to produce any nature of law enforcement presentation or report.

As one particular example, the system facilitates the automated exchange of relevant reports and related subject information necessary to successfully prosecute civil forfeiture proceedings. Using the CDMS 16, agencies could electronically transmit reports and other related subject information.

In yet another preferred embodiment of the invention, the CDMS 16 of the system for facilitating the execution of law enforcement duties includes mobile digital devices with administrative management features. This feature, which utilizes commercially available software, would enable mobile digital devices compatible with the CDMS to provide e-mail, calendar, and text messaging capabilities to officers and their managers. As such, the system provides an automated platform and/or process containing administration management functions.

In one embodiment, by employing the Subject Packet and Status Classification concepts to summarize a second system user's criminal intelligence on a given subject, the system and method does not require that law enforcement reports be stored in its database or be transmitted to a first system user in response to a query. Consequently, when compared to a reports-based database, the Subject Packet-based system and method results in dramatically reduced data storage space requirements. Furthermore, given the significantly reduced size of the data files afforded by the use of the Subject Packet concept, the system and method is capable of transmitting effectively the same actionable intelligence to system users with greater speed (i.e. Subject Packet vs. one or more law enforcement reports/documents).

In another embodiment, the system and method does not limit the users of the system to law enforcement users. Although the information contained in the system's database is law enforcement sensitive, the Subject Packet concept allows the system to make relevant law enforcement sensitive information contained within the database available to non-law enforcement users by limiting the types of Subject Packets to which a specific user has access. For example, fire department and emergency medical personnel have a need to know information contained in law enforcement sensitive files (e.g. inmate records) that identify health hazards and violent/dangerous behavioral tendencies of a subject not only for their safety, but also for the safety of the subject. Accordingly, fire department and emergency medical personnel's user accounts could be limited to view just the health hazards and behavioral warnings contained in a Subject Packet. In contrast, a reports-based system would necessitate these types of users be given access to the law enforcement sensitive reports (i.e. inmate medical files/reports) in order to obtain the health hazard and behavioral warnings they need to protect themselves and their victim/patient.

Similarly, with respect to law enforcement users, their access to relevant sensitive health related information contained in a given Subject Packet could be limited to a general notification of the existence of a "health hazard" posed by a subject. Law enforcement officers do not need to know that a subject has AIDS, or hepatitis C, or tuberculosis. Instead, they simply need to know that a health hazard exists and can then strategically employ tactics to handle the subject accordingly to avoid exposure to the hazard. Use of the Subject Packet concept enables law enforcement agencies, specifically jails, to make the medically sensitive health hazard information contained in their inmate medical records available in a useable form to law enforcement users without significantly compromising the inmates' health privacy or violating government health information privacy regulations. Such health information made available to law enforcement can also serve to better protect the subjects themselves. For instance, a subject who suffers from severe asthma who is confronted by law enforcement in relation to a drunk and disorderly or a domestic violence incident would be safer in such an encounter if the responding law enforcement agency received a health hazard warning notifying them of the subject's condition. Armed with such information, an officer would know not to utilize pepper spray to subdue such a subject and could employ an alternative strategy to handle the circumstance.

In yet another embodiment, use of the Subject Packet concept to store law enforcement criminal intelligence and inmate records does not preclude the use of the system by non-law enforcement government entities such as local and state government administrative agencies (e.g. social security services, child support, and court systems). Again, by restricting user access to specific classifications of subject packets or the information they contain, users other than law enforcement agencies can derive benefit from the law enforcement sensitive information the database contains, as well as the national scope of the database. For example, a state agency which is responsible for the distribution of social security benefits can be given limited access to the system to query its recipients' names in an effort to determine if any are incarcerated. A Confirmation Response received by such an agency concerning a subject, indicating that subject is a Confirmed—Inmate, would (1) delay the distribution of social security benefits to a possibly ineligible beneficiary and (2) immediately provide that agency the contact information to the jail facility to verify the subject's inmate status before denial of any benefits. Use of the system's information in this manner would dramatically increase the administrative efficiency and effective capability to more expeditiously detect and prevent fraud in such programs as Medicare, Medicaid, supplemental security income, supplemental nutrition assistance program, child's health insurance program, temporary assistance for needy families, housing assistance, and earned income tax credit.

In another embodiment, the system does not restrict the broadened use of the law enforcement sensitive information contained in its database of Subject Packets by non-government, private entities. For example, a pawn shop private business could submit queries to the national database for Subject Packets identifying stolen property. A Confirmation Response to the pawn shop could prevent the pawn shop from conducting a transaction involving Suspected or Confirmed—Stolen Property thereby preventing a financial loss by the business. Additionally, the system would instantaneously provide a Subject Queried Notification to the second system user (Source Law Enforcement Agency) providing it with the contact information for the pawn shop in support of its effort to locate the stolen property and a possible suspect or witness. Similar uses of the system by other private entities with government reporting obligations could be applied to background checks (e.g. for firearms, employment, large equipment sales/purchases, real estate, securities, etc.).

In yet another embodiment, the system would not restrict submissions of data and information to the database to those made only by law enforcement agencies or to only information contained in law enforcement reports. Such an expanded use of a law enforcement-focused information sharing system, leveraging the subject packet format for information classification and presentation, would enable a sponsoring entity, whether that entity be an individual person, a government organization (e.g. a law enforcement agency, a government agency, a school district, etc.), a health care provider (e.g. an insurance company, hospital, or physician), or a commercial business, to provide and/or utilize a health care-related service facilitated by a Medical Subject Packet. These Medical Subject Packets could contain personal medical information essential for use by medical personnel, emergency medical personnel (e.g. fire departments, emergency medical technicians, emergency room personnel, physicians, and pharmacists), and other first responders in the performance of their duties and responsibilities to provide first aid, emergency care, pharmacy, or other medical services to individual persons and to utilize a non-criminal Status Classification such as "Confirmed—Medical Subject Packet" or "Confirmed—Personal Medical Subject Packet" to identify the individual. Once again, by programmatically controlling access to the system, to specific status classifications of subject packets, and the specific information they contain, medical personnel, first responders, pharmacists, and other health care providers could have access to view certain classifications of subject packets, or authorized portions thereof, consisting of personal emergency and/or general medical information for a patient or victim they are treating or for a person they are processing for which such medical information is relevant (e.g., jail personnel in processing an arrestee, a school nurse evaluating a student patient); information such as identification information (e.g., photographs, fingerprints, voice signatures, or other biometric data utilized for confirming identification), emergency contact information, health conditions (e.g., a heart condition, diabetes, or known allergies), current medications and prescriptions, and medical insurance policy information. Law enforcement officers, who also serve a first responder role when making calls for service or when responding to a traffic accident, could be granted access to such subject packets, with the information they contain visible to officers being programmatically limited or restricted based on a need-to-know, job-related need or by other regulatory or agency policy otherwise authorizing their access to specific sensitive personal and medical information. Individual persons, health care providers, or government agencies who sponsor the use of Medical Subject Packets could be programmatically granted restricted access to the system to enable them to regularly update the data contained in their client's or patient's or employee's Medical Subject Packet to reflect results of annual physicals, medical examinations, treatments, or other relevant changes in medical condition or treatment. These Medical Subject Packets would also be particularly useful for workers in high-risk professions such as law enforcement, military, emergency first responders, construction, oil and gas, offshore/maritime, sports, health care, and other such industries. Employers of such high-risk professions could sponsor and place these types of non-law enforcement sensitive Medical Subject Packets into the database so that, in the event such an employee is injured and/or incapacitated on the job, that employee's emergency medical information is readily accessible to responding medical personnel, wherever the incident were to occur. Commercial businesses could also sponsor and offer the use of Medical Subject Packets to their employees or customers who are traveling for their jobs or for leisure. In the case of international persons or travelers, the Medical Subject Packets could programmatically offer language translation of the medical information they contain into the applicable language of the country or facility where the subject packet was queried or where the patient is seeking treatment. The notification feature of the subject packet-based system would also enable a sponsoring entity to receive a real-time notification when one of their Medical Subject Packets were queried and to thereafter provide support, as needed, to their person, customer, employee, or to the law enforcement agency or medical facility who conducted the query. This expanded utilization of a law enforcement-focused, subject packet-based information sharing system to include medical information submitted, updated, and maintained not only by law enforcement or government agencies but also by non-government, commercial, and/or private entities, will fulfill a significantly useful public safety need and dramatically improve the effectiveness of the necessary working relationship and ongoing collaboration existing between law enforcement, government, non-government, commercial, and private entities in the protection of the public well-being.

In yet another embodiment, useful information not contained in law enforcement reports but which could be includable in the DRMS database is information on the identity and employment of government and military personnel populated in subject packets which identify said personnel as being employed by government and military agencies. Such subject packets, for example "Confirmed—Military Member," and "Confirmed—Law Enforcement Personnel," and "Confirmed—Government Personnel," would provide very useful information both to the Querying Law Enforcement Agency (QLEA) who has encountered the government or military employee, as well as government or military employer of the person encountered. Many government and military agencies, particularly those whose personnel require security clearances or agency standards of conduct, require their employees to report encounters with law enforcement to that employer. If a government or military person is encountered by law enforcement in an official law enforcement action (e.g. a traffic stop, call for service, investigative detention, arrest, etc.) and that encounter results in the employee's descriptive data being queried in this database, a Confirmation Response delivered to the QLEA for a Confirmed—Military Member, Confirmed—Law Enforcement Personnel, or Confirmed—Government Personnel would provide the QLEA with a valuable perspective on the person being encountered and would also provide the officer with direct contact information for the employee's agency, should such information be needed. The Confirmation Response would also result in the generation and sending, using an appropriately configured, programmatically imposed format and protocol, of a Subject Queried Notification to the employee's agency designated contact, making that agency timely aware of the law enforcement encounter. For encounters with armed personnel, this type of subject packet Confirmation Response would provide valuable officer safety information for both the employee and the QLEA officer conducting the encounter. Similar subject packets could be utilized for government vehicles, such as Confirmed—Government Vehicle and Confirmed—Law Enforcement Vehicle, with the same officer safety and agency notification benefits resulting as for those subject packets utilized for tracking of personnel. In another embodiment of the government and military personnel application of the subject packet, restricted access query-response-notification functionality, a.k.a. one-sided functionality, could be programmatically established to protect undercover and sensitive investigative operations. This restricted access functionality would result in a queries of the information sharing network for these subject packets for government vehicles (for example government surveillance vehicles or bait vehicles) and surveillance or other undercover personnel returning either a negative response or an undercover, covert, specifically designed Confirmation Response which would not disclose to the QLEA the true identity of the subject of their query as a government vehicle or employee. Due to the potential for misuse, this restricted access functionality should also require a higher level of accountability and supervisory oversight for the associated Subject Queried Notifications. For example, SQNs of restricted access subject packets such as those discussed could require at least two responsible parties at the SLEA be notified of any restricted access queries. For example, in the case of a surveillance or undercover employee, one of the notified parties could be the employee, but the second responsible party could be required to be an agency employee with supervisory authority and responsibility with the SLEA and supervisory access to the information sharing system. Similar system safeguards can be utilized for vehicles, as long as one of the SLEA's notified parties has designated supervisory responsibility at the SLEA and within the information sharing system. Another alternative safeguard which could be potentially implemented to enhance the credibility, auditability, and transparency of such restricted access functionality are delayed notifications to the QLEA which either disclose information regarding the original subject query or provide compulsory documentation within the information sharing system regarding the justification for any failure to notify the QLEA concerning the original query.

In yet another embodiment, useful information not typically contained in law enforcement reports but which could be includable in the DRMS database are property records. Property owned by individuals, private entities/organizations, or government entities/organizations, or property insured by insurance companies or self-insured, including but not limited to vehicles, recreational vehicles, equipment, tools, weapons, jewelry, currency, electronics, art, collectibles, and other valuables, which can be specifically described, could be placed into the DRMS as Confirmed—Property or Confirmed—Insured Property. If these items are encountered by law enforcement and queried in the DRMS, the QLEA would receive the current owner's name and contact information and the property owner, insurer, or insurance company could receive a notification (e.g. a Subject Queried Notification) from the CMDS alerting them of the law enforcement encounter with their property. As an example (Example #1), a law enforcement officer encounters suspicious activity in a neighborhood he is patrolling and conducts a traffic stop of a vehicle containing numerous items of lawn equipment, an ATV, and some power tools. After the driver of the vehicle provides some suspicious responses to the officer's initial questions, the officer obtains permission to examine the items in the vehicle. A subsequent query of the CMDS identifies numerous items of Confirmed—Property and provides the officer with the contact information for the current owner. The officer's query of the CMDS can also generate a notification to the property owner, insurer, or insurance company, which includes the QLEA's contact information. After contacting the property owner, the officer learns that the property owner lives in a nearby neighborhood but is currently away on vacation and confirms for the investigating officer that their property should not be in the possession of the person who currently has it. In this situation, the property owner hadn't yet learned their property had been stolen, so that property would not have been reported to law enforcement and listed in NCIC as stolen property. But the real-time notification capabilities of the CDMS enabled the QLEA in the example provided to identify stolen property before it was even identified as and reported as stolen. A second example (Example #2) of this use of property information contained in the DRMS database applies specifically to insured vehicles. An insured vehicle can be placed into the DRMS as a Confirmed—Insured Vehicle. A query of the CDMS made by a law enforcement officer during the investigation of a traffic accident involving any vehicle, the descriptive data for which a property subject packet exists in the DRMS, would result in the QLEA receiving the insurer or insurance company's name, the applicable insurance policy number or letter confirming self-insurance, the contact information for the insurer, and any other information the insurance company or insurer deemed useful or relevant to include in the subject packet such as photographs. Such a QLEA query would also generate a notification (e.g., a Subject Queried Notification—SQN) from the CDMS to the insurance company or insurer alerting them of the law enforcement encounter with their insured vehicle, and the nature of that encounter, that is to say in this example, a traffic accident. In the case of an insured vehicle, this SQN could provide the insurance company with the QLEA's contact information and any available, relevant or useful details such as an accident report number, the name(s) of the driver and any passengers, photographs of the accident/accident scene, the name and contact information for any towing or storage company engaged to handle the vehicle, and even an initial accident report form, sometimes referred to as a Driver and Insurance Exchange Form. In an alternative configuration, such a QLEA query of the DRMS could also generate a notification from the CDMS to the property owner which includes some, or all, of the information provided to the insurance company in its SQN. In yet another alternative configuration, the availability of such property subject packets, and the specific information to be made available to the QLEA therein, could be programmatically limited according to the dictates of the insurance company, insurer policy, or governing contract terms or statutes. In the examples discussed, such property subject packets might be limited to specific events or investigative actions such as traffic stops, investigative detentions, or traffic accidents; such limitations can be tailored to the needs and preferences of the insurance company, insurer, and/or the property owner. This real-time application of information sharing, involving law enforcement users, commercial entities (e.g., insurance companies), government organizations, and private citizens enhances the ability of law enforcement to identify and recover stolen property (refer to Example #1 above) and to investigate and resolve traffic accidents (refer to Example #2 above); in so doing, such information sharing also improves the efficiency and effectiveness of loss prevention efforts and vehicle accident claim resolution for insurance companies, saving them and their customers valuable time and money.

In yet another embodiment, useful information not contained in law enforcement reports, but which could be includable in, or accessible by, the DRMS database is information confirming the identity of persons as registered voters. Local, state, and federal voter records are most typically maintained in disparate, often siloed databases, by the local, state, or federal agencies responsible for their creation, maintenance, and deletion. The descriptive data contained in these voter records, which often include name, SSN, date of birth, address, signatures, and current contact information (e.g., email, telephone numbers, mailing address), but can also include photographs, fingerprints, other biometric data, could be stored in a subject packet format as a Confirmed—Voter. As dictated by the applicable local, state, or federal regulations governing the collection, maintenance, accessibility, and distribution of this information, these Voter Subject Packets could be made available to authorized system users as a verified form of identification and in support of any verification process utilized in support of local, state, or federal elections. One example of how such voter registration information can be used to the benefit of the respective maintaining agency and the individual voters themselves, when stored in the subject packet format in the DRMS or in a database accessible by it, is the significant improvements to the security and integrity of the election process it provides. Whenever a vote is cast, with the submission of that vote, a query of the DRMS database occurs either manually or programmatically through the vote casting process. This query of the DRMS could generate two types notifications from the CDMS—a Confirmation Response to the organization administering the voting process for that election and to the local, state, or federal agency responsible for creating and maintaining the voter records, and a Subject Queried Notification (SQN) to the individual voters themselves. This real-time notification process of the casting of a vote adds a significant level of security and integrity to the voting process, and, most significantly, provides real-time confirmation to the voter themselves of the casting of their vote. In the case in which an identity thief attempted to illegally cast a vote in someone else's name, with the described Confirmed—Voter system in use, the voter's receipt of the real-time notification of the casting of that vote would enable that voter to immediately report it to election administration authorities as being a fraudulent or contested vote, citing the credible and trackable information contained in the SQN in support of their complaint (i.e., a complaint not based solely on speculation, suspicion, or conjecture). In one embodiment of this process, the SQN is programmed to enable the voter to automatically respond electronically in real-time to the SQN, via a Subject Queried Response Packet (SQRP), either confirming or contesting a vote. Such SQRP voter responses could also be directed to the administering agency as an added security measure against voter fraud.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A computer-based system for facilitating the execution of law enforcement duties, said computer-based system comprising:
    a data processing and records management system including one or more computers with one or more processors and one or more data storage means operatively coupled to said one or more processors, said data processing and records management system being configured and arranged to:
    receive a subject query from a first system user that contains information identifying a subject;
    conduct a search for a subject packet containing information that matches said information identifying said subject by accessing a database of subject packets stored on said one or more data storage means;
    determine whether a match exists between said subject and any one of said subject packets in said database;
    when said match is found not to exist between said subject and any of said subject packets, generate and send a negative response to a local digital computer or mobile digital device of said first system user; and when said match is found to exist between said subject and at least one of said subject packets, determine a status classification of said at least one of said subject packets, and generate and send a confirmation response to said first system user based upon said status classification;

wherein at least one of said subject packets comprises a property subject packet containing information regarding property owned by an individual or entity and/or insured by an insurance company; and wherein, when said match is found to exist between said subject queried by said first system user and said property subject packet, said data processing and records management system is further configured and arranged to:

generate and send a real-time notification to a second system user that is interested in receiving information regarding said property, the real-time notification notifying said second system user that said first system user encountered said property in an investigation.

2. The computer-based system according to claim 1, wherein said second system user is one of: (i) an owner of said property, (ii) an insurance company insuring said property, and (iii) any other party having a property interest in said property.

3. The computer-based system according to claim 1, wherein at least another one of said subject packets comprises an insured vehicle subject packet containing information regarding an insured vehicle insured by an insurance company or self-insured by a company or organization.

4. The computer-based system according to claim 3, wherein, when said match is found to exist between said subject queried by said first system user and said insured vehicle subject packet, said data processing and records management system is further configured and arranged to:

generate and send a real-time notification to a second system user that is interested in receiving information regarding said insured vehicle, the real-time notification notifying said second system user that said first system user encountered said insured vehicle responding to a traffic accident and/or in an investigation.

5. The computer-based system according to claim 4, wherein said second system user is one of: (i) an owner of said insured vehicle, (ii) an insurance company insuring said insured vehicle, and (iii) any other party having a property interest in said insured vehicle.

6. The computer-based system according to claim 1, wherein at least another one of said subject packets comprises a registered voter subject packet containing local, state, and and/or federal information regarding a registered voter.

7. The computer-based system according to claim 6, wherein, when said match is found to exist between said subject queried by said first system user and said registered voter subject packet, said data processing and records management system is further configured and arranged to:

generate and send a real-time notification to said registered voter, the real-time notification notifying said registered voter that said first system user encountered said registered voter participating in an election or otherwise involved in a voting process.

8. The computer-based system according to claim 7, wherein, when said match is found to exist between said subject queried by said first system user and said registered voter subject packet, said data processing and records management system is further configured and arranged to:

generate and send said confirmation response containing information regarding said registered voter to said first system user.

9. The computer-based system according to claim 8, wherein said first system user is one of: (i) a local voting agency, (ii) a state voting agency, and (iii) a federal voting agency.

10. A computer-based system for facilitating the execution of law enforcement duties, said computer-based system comprising:

a data processing and records management system including one or more computers with one or more processors and one or more data storage means operatively coupled to said one or more processors, said data processing and records management system being configured and arranged to:

receive a subject query from a first system user that contains information identifying a subject;

conduct a search for a subject packet containing information that matches said information identifying said subject by accessing a database of subject packets stored on said one or more data storage means;

determine whether a match exists between said subject and any one of said subject packets in said database;

when said match is found not to exist between said subject and any of said subject packets, generate and send a negative response to a local digital computer or mobile digital device of said first system user; and when said match is found to exist between said subject and at least one of said subject packets, determine a status classification of said at least one of said subject packets, and generate and send a confirmation response to said first system user based upon said status classification;

wherein at least one of said subject packets comprises an insured vehicle subject packet containing information regarding an insured vehicle insured by an insurance company or self-insured by a company or organization; and wherein, when said match is found to exist between said subject queried by said first system user and said insured vehicle subject packet, said data processing and records management system is further configured and arranged to:

generate and send a real-time notification to a second system user that is interested in receiving information regarding said insured vehicle, the real-time notification notifying said second system user that said first system user encountered said insured vehicle responding to a traffic accident and/or in an investigation.

11. The computer-based system according to claim 10, wherein said second system user is one of: (i) an owner of said insured vehicle, (ii) an insurance company insuring said insured vehicle, and (iii) any other party having a property interest in said insured vehicle.

12. A computer-based system for facilitating the execution of law enforcement duties, said computer-based system comprising:

a data processing and records management system including one or more computers with one or more processors and one or more data storage means operatively coupled to said one or more processors, said data processing and records management system being configured and arranged to:

receive a subject query from a first system user that contains information identifying a subject;

conduct a search for a subject packet containing information that matches said information identifying said subject by accessing a database of subject packets stored on said one or more data storage means;

determine whether a match exists between said subject and any one of said subject packets in said database;

when said match is found not to exist between said subject and any of said subject packets, generate and send a negative response to a local digital computer or mobile digital device of said first system user; and when said match is found to exist between said subject and at least one of said subject packets, determine a status classification of said at least one of said subject packets, and generate and send a confirmation response to said first system user based upon said status classification;

wherein at least one of said subject packets comprises a registered voter subject packet containing local, state, and and/or federal information regarding a registered voter; and wherein, when said match is found to exist between said subject queried by said first system user and said registered voter subject packet, said data processing and records management system is further configured and arranged to:

generate and send a real-time notification to said registered voter, the real-time notification notifying said registered voter that said first system user encountered said registered voter participating in an election or otherwise involved in a voting process.

13. The computer-based system according to claim 12, wherein, when said match is found to exist between said subject queried by said first system user and said registered voter subject packet, said data processing and records management system is further configured and arranged to:

generate and send said confirmation response containing information regarding said registered voter to said first system user.

14. The computer-based system according to claim 13, wherein said first system user is one of: (i) a local voting agency, (ii) a state voting agency, and (iii) a federal voting agency.

* * * * *